(12) United States Patent
Deering

(10) Patent No.: US 6,950,109 B2
(45) Date of Patent: Sep. 27, 2005

(54) MULTI-SPECTRAL COLOR CORRECTION

(75) Inventor: Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 317 days.

(21) Appl. No.: 09/952,379

(22) Filed: Sep. 12, 2001

(65) Prior Publication Data

US 2002/0122044 A1 Sep. 5, 2002

Related U.S. Application Data

(60) Provisional application No. 60/242,640, filed on Oct. 23, 2000.

(51) Int. Cl.$^7$ .................................................. G09G 5/02
(52) U.S. Cl. ........................ 345/589; 345/597; 348/191; 358/518; 358/523; 382/162; 382/167
(58) Field of Search ................................. 345/589, 597, 345/904; 348/189, 191, 658; 358/518, 523; 382/162, 167

(56) References Cited

U.S. PATENT DOCUMENTS

| | | | | |
|---|---|---|---|---|
| 4,254,432 A | * | 3/1981 | Nakahata | 348/191 |
| 5,272,518 A | * | 12/1993 | Vincent | 356/405 |
| 5,363,318 A | | 11/1994 | McCauley | |
| 5,510,851 A | * | 4/1996 | Foley et al. | 348/658 |
| 5,625,378 A | * | 4/1997 | Wan et al. | 345/600 |
| 5,793,344 A | * | 8/1998 | Koyama | 345/87 |
| 5,809,213 A | * | 9/1998 | Bhattacharjya | 358/1.6 |
| 5,867,286 A | * | 2/1999 | Lee et al. | 358/523 |
| 5,897,239 A | | 4/1999 | Caruthers, Jr. et al. | |
| 5,917,541 A | * | 6/1999 | Nakagome et al. | 348/93 |
| 6,081,254 A | * | 6/2000 | Tanaka et al. | 382/167 |
| 6,571,010 B1 | * | 5/2003 | Inoue | 382/162 |
| 6,594,387 B1 | * | 7/2003 | Pettitt et al. | 382/167 |
| 6,690,383 B1 | * | 2/2004 | Braudaway et al. | 345/600 |

OTHER PUBLICATIONS

R. Fisher, S. Perkins, A. Walker and E. Wolfart, "Spatial Filters—Laplacian/Laplacian of Gaussian," 2003. http://homepages.inf.ed.ac.uk/rbf/HIPR2/log.htm, date accessed Jul. 13, 2004.*

* cited by examiner

*Primary Examiner*—Matthew C. Bella
*Assistant Examiner*—Antonio Caschera
(74) *Attorney, Agent, or Firm*—Meyertons Hood Kivlin Kowert & Goetzel, P.C.; Jeffrey C. Hood; Mark K. Brightwell

(57) ABSTRACT

A system and method for performing color correction based on physical measurements (or estimations) of color component spectra (e.g. red, green, blue color component spectra). A color correction system may comprise a spectrum sensing device, a color calibration processor, and a calculation unit. The spectrum sensing device may be configured to measure color component power spectra for pixels generated by one or more display devices on a display surface. The color calibration processor may receive power spectra for a given pixel from the spectrum sensing device and compute a set of transformation parameters in response to the power spectra. The transformation parameters characterize a color correction transformation for the given pixel. The color calibration processor may compute such a transformation parameter set for selected pixels in the pixel array. The calculation unit may be configured to (a) compute initial color values for an arbitrary pixel in the pixel array, (b) compute modified color values in response to the initial color values and one or more of the transformation parameter sets corresponding to one or more of the selected pixels, and (d) transmit the modified color values to the display device.

40 Claims, 24 Drawing Sheets

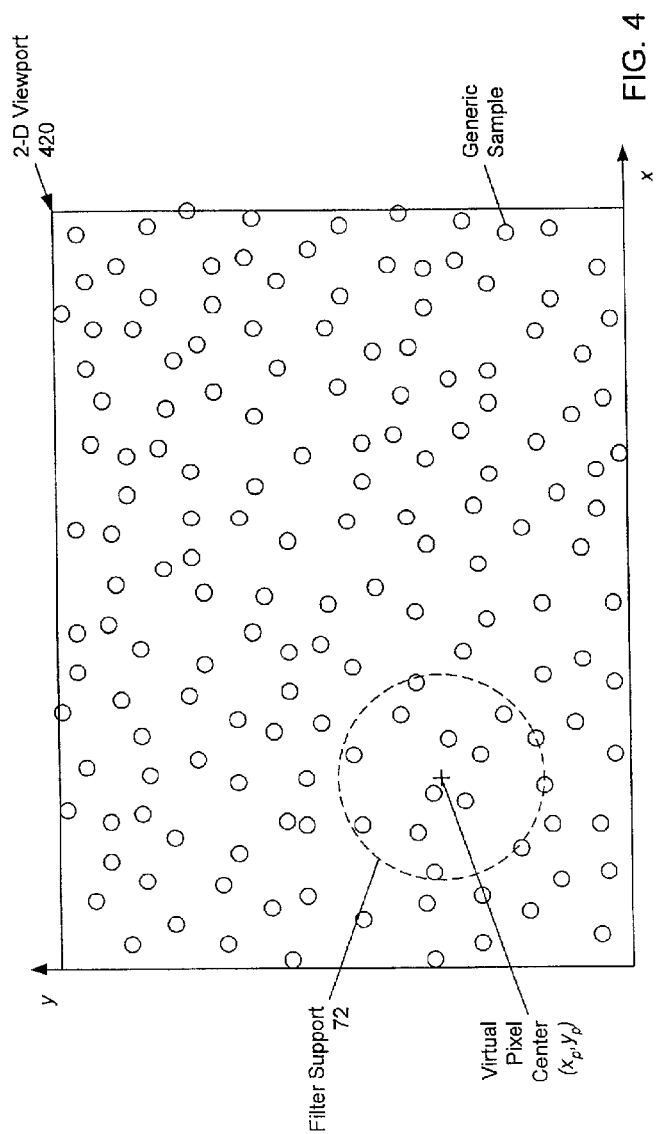

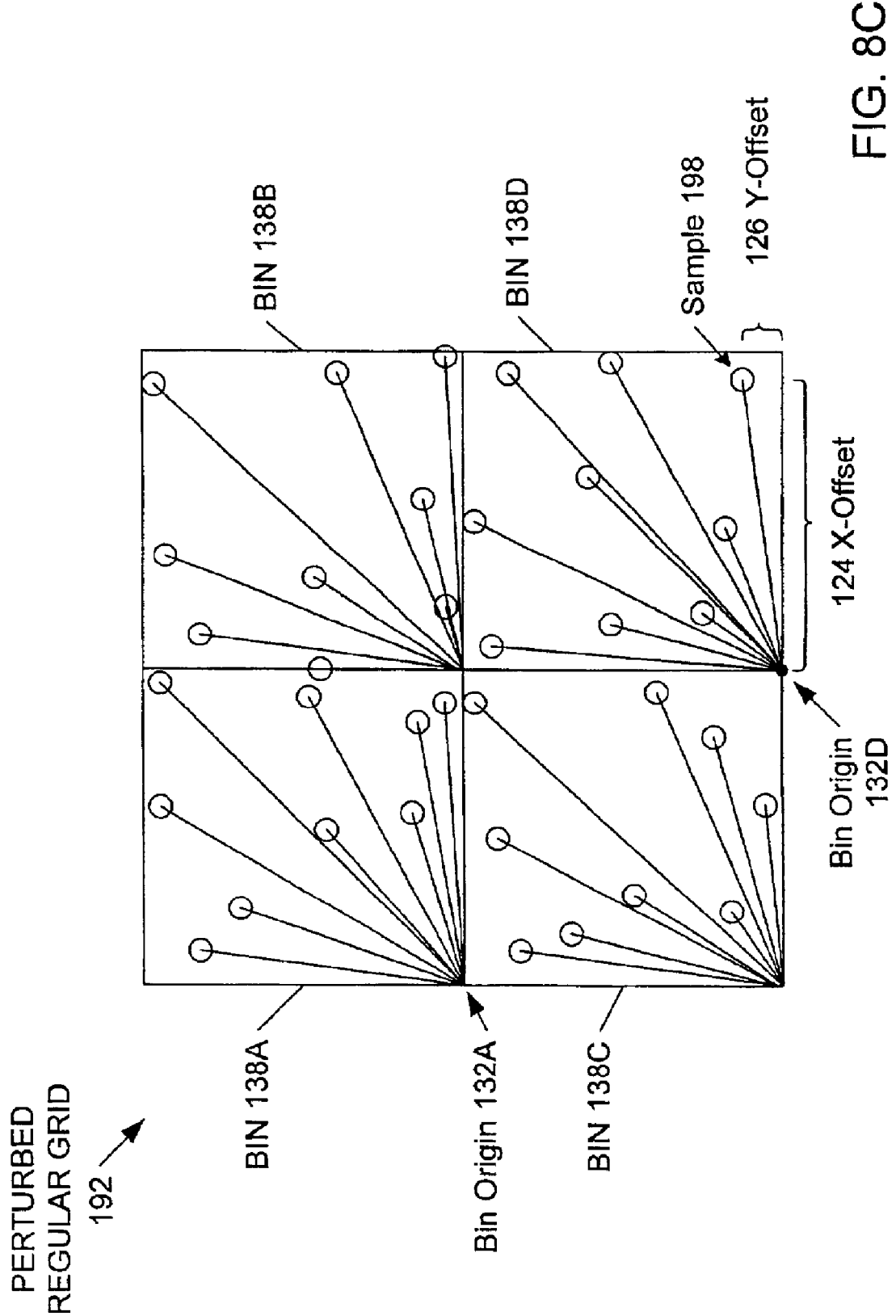

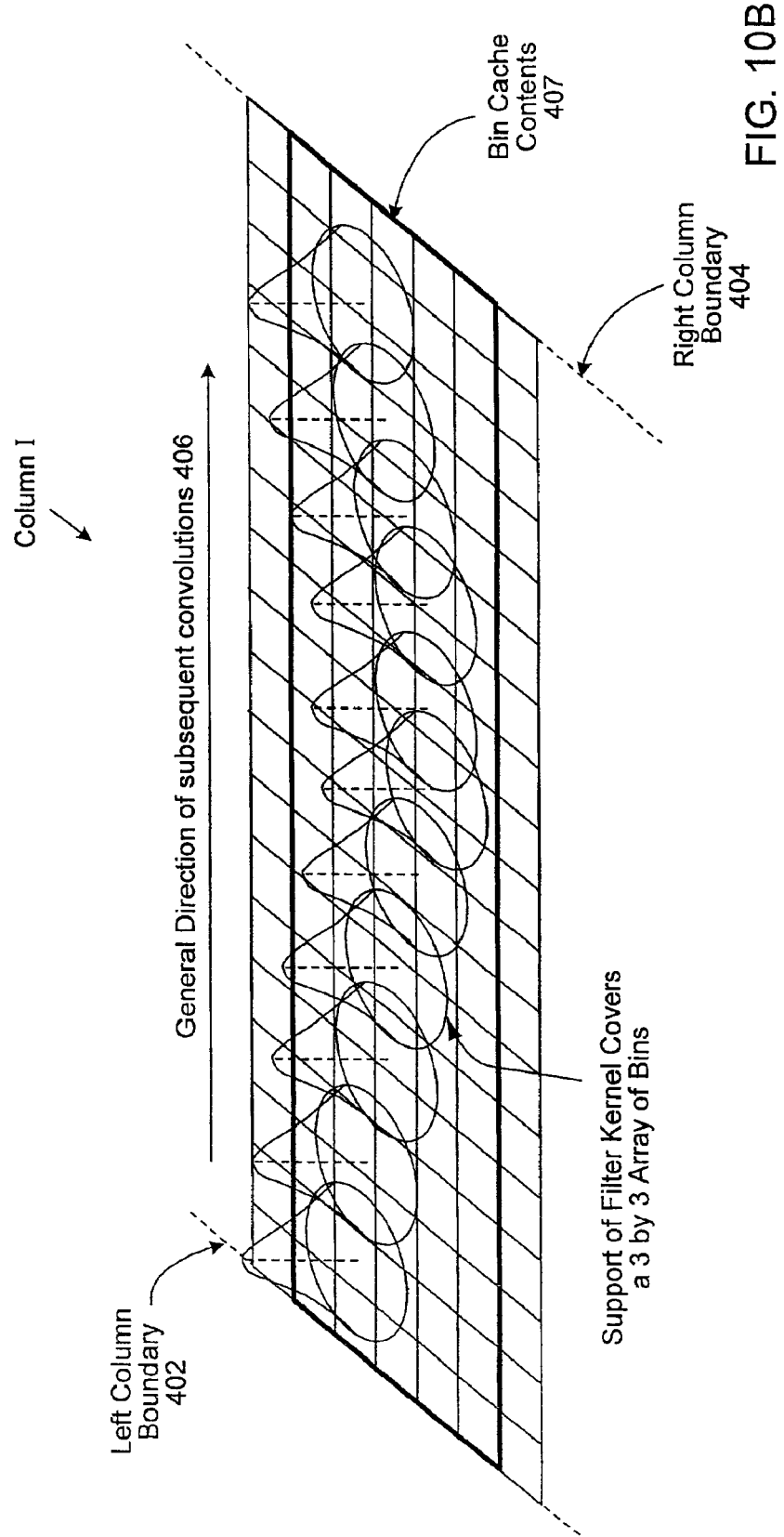

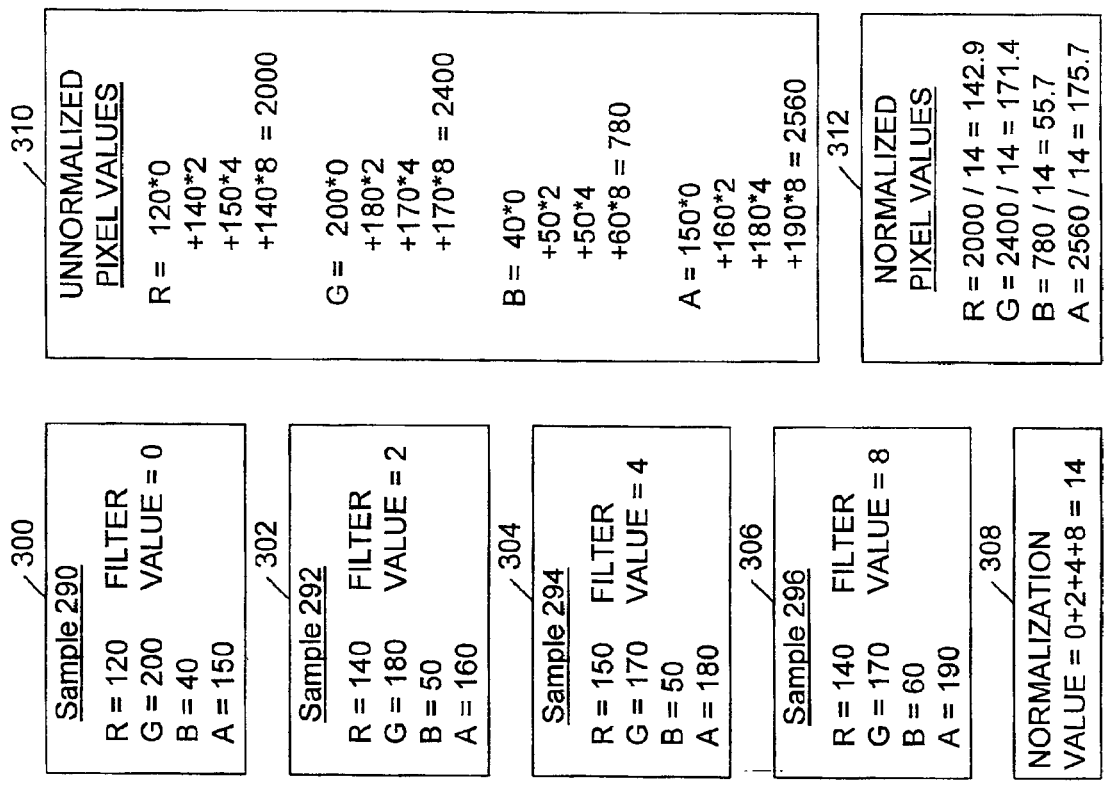
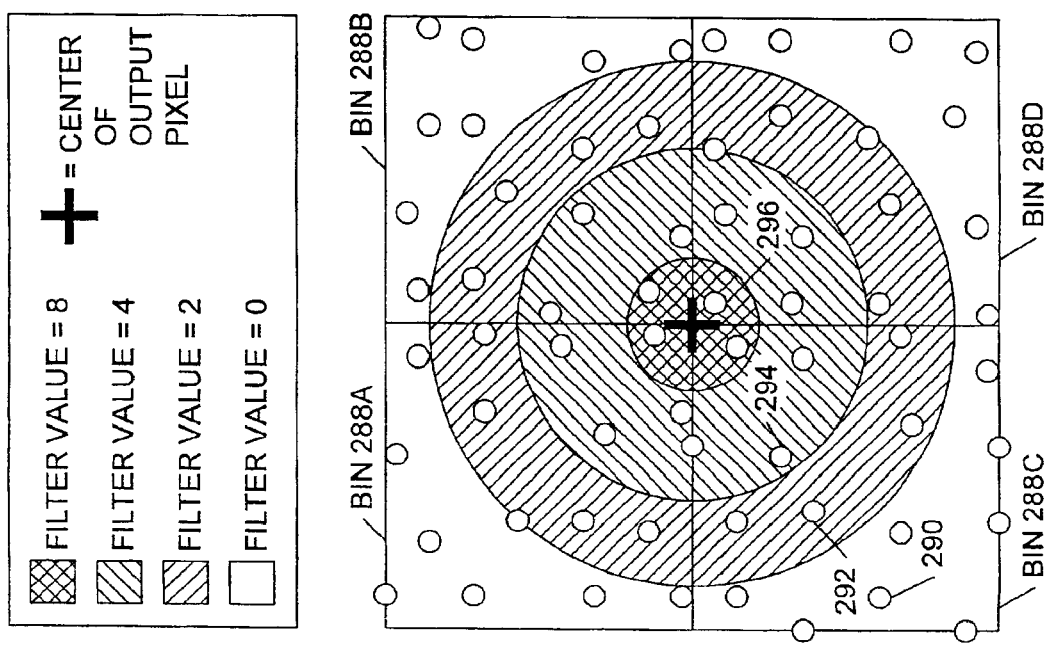
FIG. 13

MULTI-SPECTRAL COLOR CORRECTION

CROSS REFERENCE TO RELATED APPLICATIONS

This application claims the benefit of priority to U.S. Provisional Application No. 60/242,640 filed on Oct. 23, 2000 entitled "MULTI-SPECTRAL COLOR CORRECTION".

BACKGROUND OF THE INVENTION

1. Field of the Invention

This invention relates generally to the field of computer graphics and, more particularly, to a system and method for correcting the presentation of color by one or more display devices (e.g. projection devices).

2. Description of the Related Art

A light beam may be described as a superposition of beams having a continuum of wavelengths. The amount of power concentrated at each wavelength $\lambda$ of the continuum is given by a function $F(\lambda)$ known as the power spectrum. The power spectrum may be measured by a spectrum sensing device such as a spectroradiometer. The power spectrum determines the perceived color of the light beam for a given observer. The space of possible power spectra is infinite dimensional. However, because the human eye has only three types of color sensitive cells, the space of perceived colors is generally considered to be three dimensional. Thus, the mapping between the power spectra and perceived colors is many to one. In other words, an infinite collection of power spectra may induce the same color perception for a given observer. Two power spectra that give the same color perception are said to be "metamers".

An image on a display screen (or projection screen) comprises an array of physical pixels. Each physical pixel radiates a light beam to the observer's eye(s). Each pixel light beam has a power spectrum that determines the perceived color of the corresponding physical pixel.

Display devices generate color by mixing varying amounts of Q fundamental colors, where Q is an integer representing the number of fundamental colors. Typically, Q equals three and the fundamental colors are red, green and blue. Thus, each pixel light beam may comprise a red component beam, a green component beam and a blue component beam having power spectra $f_1(\lambda)$, $f_2(\lambda)$ and $f_3(\lambda)$ respectively. Therefore, the pixel power spectrum $F_\gamma(\lambda)$ is a linear combination of the three component spectra:

$$F_\gamma(\lambda) = \sum_{i=1}^{3} \gamma_i \cdot f_i(\lambda),$$

where the scalar values $\gamma_1$, $\gamma_2$ and $\gamma_3$ control the relative amounts of red, green and blue respectively which are combined in the pixel light beam. Let $\gamma$ denote the vector whose components are the scalar values $\gamma_1$, $\gamma_2$ and $\gamma_3$, i.e.

$$\gamma = [\gamma_1, \gamma_2, \gamma_3]^t.$$

The vector $\gamma$ may be referred to herein as the color intensity vector. The display device receives a video signal that determines the vector $\gamma$ for each pixel in the pixel array. The video signal may be an analog or digital video signal. The red, green and blue beams comprising the pixel beam are referred to herein as color component beams, and their corresponding spectra are referred to herein as color component spectra.

For various reasons, the color component spectra $f_1(\lambda)$, $f_2(\lambda)$ and $f_3(\lambda)$ of a pixel beam may change with the passage of time. Thus, the perceived color C(t) of the pixel beam may vary in time even though the color intensity vector $\gamma$ is held constant. For example, in certain types of projection devices, the color component beams are generated by passing beams of white light through red, green and blue color filters respectively. The color filters experience thermal stresses due to the absorption of light energy. The thermal stresses may, over time, induce changes in the absorption properties of the color filters. Also, the absorbing materials in the color filters may change their filtering characteristics over time as they age. Thus, there exists a need for a system and method which can correct and stabilize the color generated by displayed pixels in spite of time variation in their color component output spectra.

Suppose the pixel array is parameterized by a horizontal pixel index I and a vertical pixel index J. In addition to variations with respect to time, the color component output spectra $f_1(\lambda)$, $f_2(\lambda)$ and $f_3(\lambda)$ may vary spatially, i.e. with respect to indices I and J. For example, a color filter used in the projector may have non-uniform absorption properties across its surface. Thus, the perceived color C(I,J) observed on a display (or projection screen) may vary spatially even when all pixels of the pixel array are driven by the same color intensity vector $\gamma$. Thus, there exists a need for a system and method which can correct and uniformize the spatial distribution of color generated by a display device (e.g. a projection device) to compensate for these spatial variations.

Suppose multiple units of a given model of display device (e.g. projection device) are generated in a manufacturing batch. Because of the difficulty of exactly reproducing all manufacturing conditions from unit to unit, the color component output spectra $f_1(\lambda)$, $f_2(\lambda)$ and $f_3(\lambda)$ generated by pixels of a first unit may not agree with the corresponding spectra of a second unit. Thus, the color C(1) generated by the first unit may not agree with the color C(2) generated by the second unit even when both units are driven by the same color intensity vector $\gamma$. In particular, the color C(I,J,1) generated by pixel (I,J) in the first unit may not agree with the color C(I,J,2) generated by the corresponding pixel (I,J) in the second unit, even when both units are driven by the same color vector $\gamma$. This problem may be especially noticeable when the multiple units are used in a single display system. For example, multiple units of a given model of projector may be used to project an integrated image onto a common projection screen. The non-repeatability of color between the units may be especially offensive in areas of the projection screen where projected images overlap. Thus, there exists a need for a system and method which could correct and uniformize the presentation of color between multiple units of a given display device, especially where the multiple units are employed in a single display system.

The problem of non-repeatable color is exacerbated when a display system uses display devices (a) from different manufacturers, (b) from the same manufacturer but conforming to different models, and/or (c) based on differing technologies. For example, a first display device may use LCD technology while a second display device uses digital micro-mirror technology (e.g., Texas Instruments DLP™ technology). In another example, a first projection device and second projection device may use different light sources and/or color filter materials. Thus, the color C(A) generated by a first display device A may not agree with the color C(B)

generated by a second display device B even when the two display devices are driven with the same color intensity vector γ. Therefore, there exists a need for a system and method which can correct and uniformize the presentation of color between multiple display devices from potentially different manufacturers and/or based on different underlying technologies, etc.

SUMMARY OF THE INVENTION

The present invention contemplates a system and method for performing color correction based on physical measurements of color component spectra (e.g. red, green, blue color component spectra). In one embodiment, a color correction system may comprise a spectrum sensing device, a color calibration processor, and a calculation unit. The spectrum sensing device may be configured to measure a plurality of power spectra for one or more pixels generated by a display device. The color calibration processor may receive the power spectra from the spectrum sensing device and may compute a set of transformation parameters in response to the power spectra. The calculation unit may be configured to (a) compute initial color values for a given pixel, (b) compute modified color values based on the initial color values and the set of transformation parameters, and (c) transmit the modified color values to the display device. The given pixel may be inside or outside the group of one or more pixels for which the transformation parameter set was computed.

In one embodiment, the set of transformation parameters may comprise a lookup table which characterizes a color correction transformation. In this case, the calculation unit may generate a read address for the lookup table using the initial color values, and may read the modified color values from the lookup table using the read address. Alternatively, the lookup table may store color correction difference values. In this case, the calculation unit may add the difference values obtained from the lookup table to the initial color values respectively to determine the modified color values.

The power spectra may include, for example, a red power spectrum, a green power spectrum and a blue power spectrum. The spectrum sensing device may measure the red power spectrum in response to (or in synchronization with) the calculation unit driving the one or more pixels with a maximal red intensity value, a zero green intensity value and a zero blue intensity value. The spectrum sensing device may measure the green power spectrum in response to (or in synchronization with) the calculation unit driving the pixel with a maximal green intensity value, a zero red intensity value, and a zero blue intensity value. Similarly, the spectrum sensing device may measure the blue power spectrum in response to (or in synchronization with) the calculation unit driving the pixel with a maximal blue intensity value, a zero red intensity value and a zero green intensity value.

The spectrum sensing device may be a spectroradiometer, a charge coupled device (CCD) array, or other type of spectrum sensor. In one embodiment, the spectrum sensing device comprises a lens and an array of light-sensitive electronic detectors. Each power spectrum may comprise a sequence of N spectral power measurements at N corresponding wavelengths, wherein N is an integer. In the preferred embodiment, N is greater than three. In one alternative embodiment, the spectrum sensing device presents the power spectra to the color calibration processor as analog signals.

In one embodiment, the calculation unit is configured to receive samples from a sample buffer and compute the initial color values for the pixel by filtering sample color values belonging to the samples.

The color calibration unit may multiply each of the power spectra by each of three response curves respectively, and integrate the resulting product functions (i.e. sequences) in order to compute the first set of transformation parameters. In one embodiment, the three response curves may comprise three color sensitivity curves (e.g. cone sensitivity curves) for a human eye.

The color correction system may be configured to perform color correction on one or more pixel arrays generated on a display surface (e.g. a projection screen) by one or more display devices. A subset of the pixels in each pixel array may be selected for spectral calibration. The spectrum sensing device may measure a plurality of power spectra for each pixel in a first subset of a first pixel array generated by a first display device. The color calibration processor may compute a transformation parameter set (e.g. a color correction matrix, a lookup table, etc.) for each pixel in the first subset in response to the corresponding plurality of power spectra. The calculation unit may (a) compute initial color values for a first pixel of the first pixel array, (b) compute modified color values for the first pixel based on the initial color values and one or more of the transformation parameter sets corresponding to one or more of pixels in the first subset, and (c) transmit the modified color values to the first display device.

In one embodiment, the transformation parameter set for each pixel in the first subset comprises a lookup table which characterizes a color correction transformation for the pixel. Each lookup table may contain modified color values indexed by initial color values (or high order bits thereof) for a particular pixel of the first subset. In this embodiment, the calculation unit may determine one or more of nearest pixels in the first subset to the first pixel, and may read a table entry from each of the lookup tables corresponding to the nearest pixels. The read addresses into the lookup tables are generated from the initial color values. The calculation unit may perform an interpolation on the one or more table entries to determine the modified color values for the first pixel.

In a second embodiment, the lookup tables store color correction difference values, i.e. differences between the modified color values and the corresponding initial color values for a particular pixel of the first subset. In this second embodiment, each of the interpolated correction values resulting from the interpolation of table entries may be added to a corresponding one of the initial color values to generate the modified color values.

In one embodiment, the transformation parameter set for each pixel of the first subset may comprise a brief characterization (such as a matrix) of a color correction transformation for the pixel. The calculation unit may be configured to interpolate a first parameter set for the first pixel based on the transformation parameter sets of the one or more nearest neighbor pixels in the first subset. The calculation unit may generate the modified color values by applying the color correction transformation to the initial color values using the first parameter set.

The plurality of power spectra for each pixel in the first subset may comprise a first power spectrum, a second power spectrum and a third power spectrum. The spectrum sensing device may measure the first power spectrum for each pixel of the first subset in response to the calculation unit driving the pixel with a red calibration pattern comprising a maximum red intensity value, a zero green intensity value and a zero blue intensity value. The spectrum sensing device may measure the second power spectrum for each pixel of the first subset in response to the calculation unit driving the pixel with a green calibration pattern comprising a maximum green intensity value, a zero red intensity value and a zero blue intensity value. The spectrum sensing device may measure the third power spectrum for each pixel of the first subset in response to the calculation unit driving the pixel with a blue calibration pattern comprising a maximum blue intensity value, a zero red intensity value and a zero green intensity value.

The calculation unit may be configured to drive one or more pixels (through the first display device) with the red calibration pattern in response to a first control signal asserted by the color calibration processor. In addition, the spectrum sensing device may be configured to measure the first power spectrum for the one or more pixels in response to a second control signal asserted by the color calibration processor. Thus, the color calibration processor may control the synchronization of the calibration pattern display and the power spectrum measurements.

The first subset of the first pixel array may comprise a rectangular grid. The density of the rectangular grid in the pixel array may assume any desired value. The first subset of the first pixel array may also comprise a non-uniform grid.

Each of the power spectra for each pixel in the first subset may comprise N spectral power measurements at N corresponding wavelengths in the visible region, where N is a positive integer. The integer N is preferably greater than three. Large values of N may serve to characterize the power spectra more precisely than small values of N, and allow more effective color correction. However, large values of N also increase memory storage and processing bandwidth requirements.

In the preferred embodiment, the color correction system is further configured to provide calibration for a second pixel array generated on the display surface by a second display device. The spectrum sensing device measures a plurality of power spectra for each pixel in a second subset of a second pixel array. The color calibration processor computes a transformation parameter set for each pixel in the second subset in response to the corresponding plurality of power spectra. The second calculation unit may additionally (e) compute initial color values for a second pixel of the second pixel array, (f) compute modified color values for the second pixel based on the initial color values and one or more transformation parameter sets corresponding to one or more of the pixels of the second subset, and (g) transmit the modified color values to the second display device.

In some embodiments, the second calculation unit may be configured to turn off all pixels of the second pixel array while the spectrum sensing device measures the plurality of power spectra for the first subset of the first pixel array.

In one embodiment, a graphics system comprising a processor and memory may be configured to perform color correction for one or more display devices. The memory may store program instructions executable by the processor. In response to execution of the program instructions, the processor is operable to perform color correction on computed color values of a pixel by performing a color correction transformation. The color correction transformation may be implemented by one or more table lookup operations. Lookup tables may be generated for a subset of grid pixels in a pixel array in response to measurements of color component power spectra at the subset of grid pixels. The corrected color values for a given pixel may be determined by accessing lookup tables corresponding to one or more grid pixels which are neighbors to the given pixel.

Alternatively, the color correction transformation for each pixel in the subset of grid pixels may be more succinctly characterized by a limited set of parameters such as a matrix. For a non-grid pixel in the pixel array, the calculation unit may interpolate an instantaneous parameter set appropriate for the non-grid pixel based on the parameter sets of nearest neighbor pixels in the pixel grid. The calculation unit may use the instantaneous parameter set to apply the color correction transformation on the initial color values to determine the corrected color values. For example, the instantaneous parameter set may control a combination of arithmetic operations (e.g. additions, subtractions, multiplications, etc.) which determine the corrected color values.

BRIEF DESCRIPTION OF THE DRAWINGS

The foregoing, as well as other objects, features, and advantages of this invention may be more completely understood by reference to the following detailed description when read together with the accompanying drawings in which:

FIG. 4 illustrates a collection of samples representing a virtual image and populating a two-dimensional viewport 420;

FIG. 8C illustrates further details of the perturbed-regular sample positioning scheme;

FIG. 10B illustrates a distorted traversal of filter kernel 400 across a generic Column I of FIG. 9;

FIG. 13 illustrates a convolution computation for an example set of samples at a virtual pixel center in the 2-D viewport 420;

Figure 1:
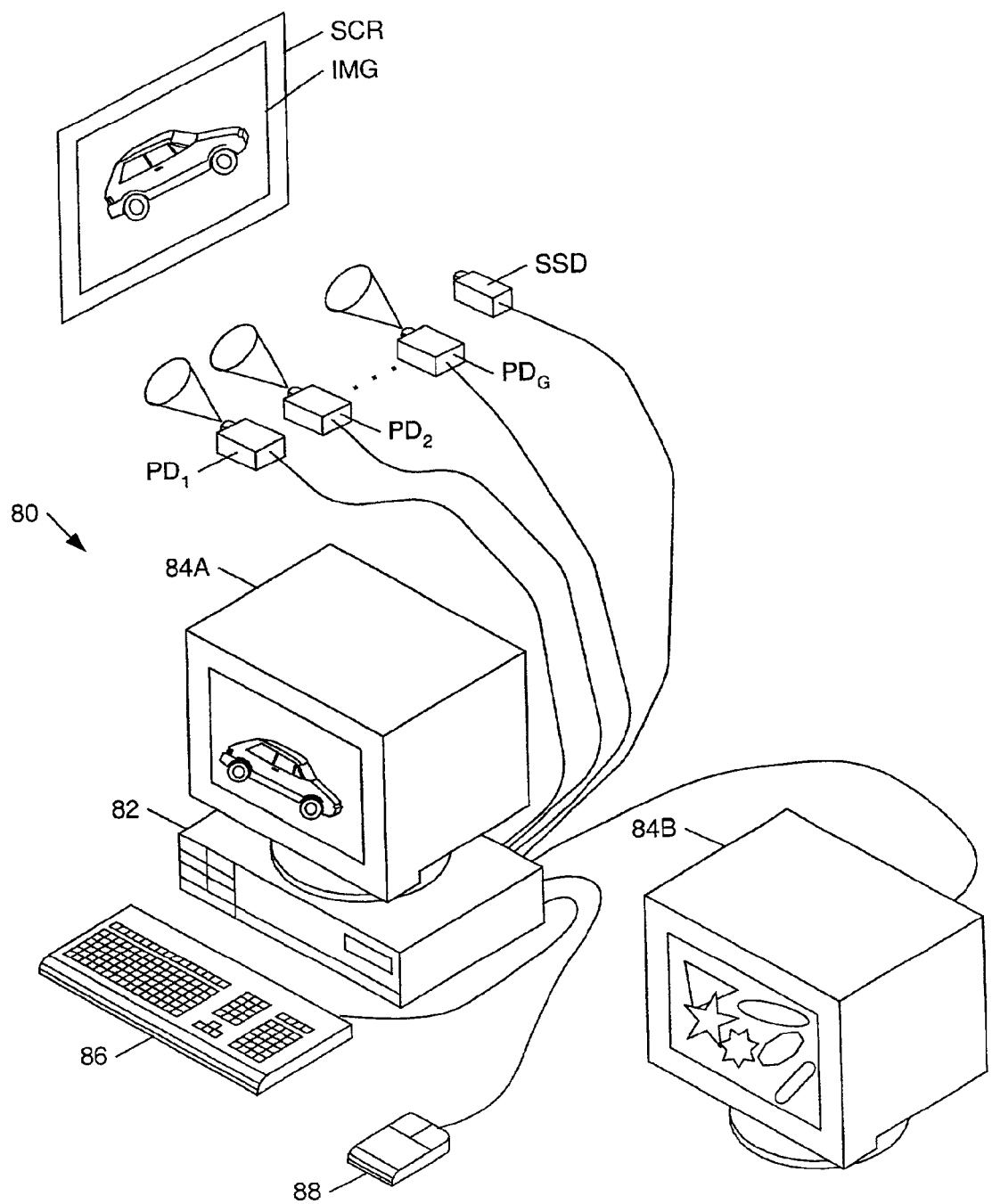
FIG. 1 illustrates one embodiment of a computer system 80 which includes a graphics system 112 for driving one or more display devices (e.g. projection devices $PD_1$ through $PD_G$ and/or monitor devices 84A and 84B)

While the invention is susceptible to various modifications and alternative forms, specific embodiments thereof are shown by way of example in the drawings and will herein be described in detail. It should be understood, however, that the drawings and detailed description thereto are not intended to limit the invention to the particular forms disclosed, but on the contrary, the intention is to cover all modifications, equivalents, and alternatives falling within the spirit and scope of the present invention as defined by the appended claims. Note the headings used herein are for organizational purposes only and are not meant to limit the description provided herein or the claims attached hereto.

DETAILED DESCRIPTION OF THE PREFERRED EMBODIMENTS

FIG. 1 illustrates one embodiment of a computer system 80 which performs three-dimensional (3-D) and/or two-dimensional (2D) graphics according to the present invention. Computer system 80 comprises a system unit 82 which may couple to display devices such as monitors 84A and 84B and/or projection devices $P_1$ through $PD_G$. The display devices may be realized by any of a variety of display technologies. For example, the projection devices $PD_1$ through $PD_G$ may be CRT-based projectors, LCD projectors, gas-plasma projectors, digital micromirror projectors, liquid crystal on silicon (LCOS) projectors, etc., or any combination thereof. System unit 82 may couple to an arbitrary number of display devices.

System unit 82 may also couple to various input devices such as a keyboard 86, a mouse 88, a spectrum sensing device SSD (e.g. a spectrophotometer), a video camera, a trackball, a digitizing tablet, a six-degree of freedom input device, a head tracker, an eye tracker, a data glove, body sensors, etc. Application software may be executed by computer system 80 to display 3-D graphical objects on the display devices.

As used herein the term "spectrum sensing device" means any device which is capable of measuring the amount of energy radiated from a surface and/or points on a surface at two or more wavelengths in the visible region. Examples of spectrum sensing devices may include a spectroradiometer, a CCD array, and an array of photodiodes with a wavelength-dispersing device such as a lens.

Figure 2A:
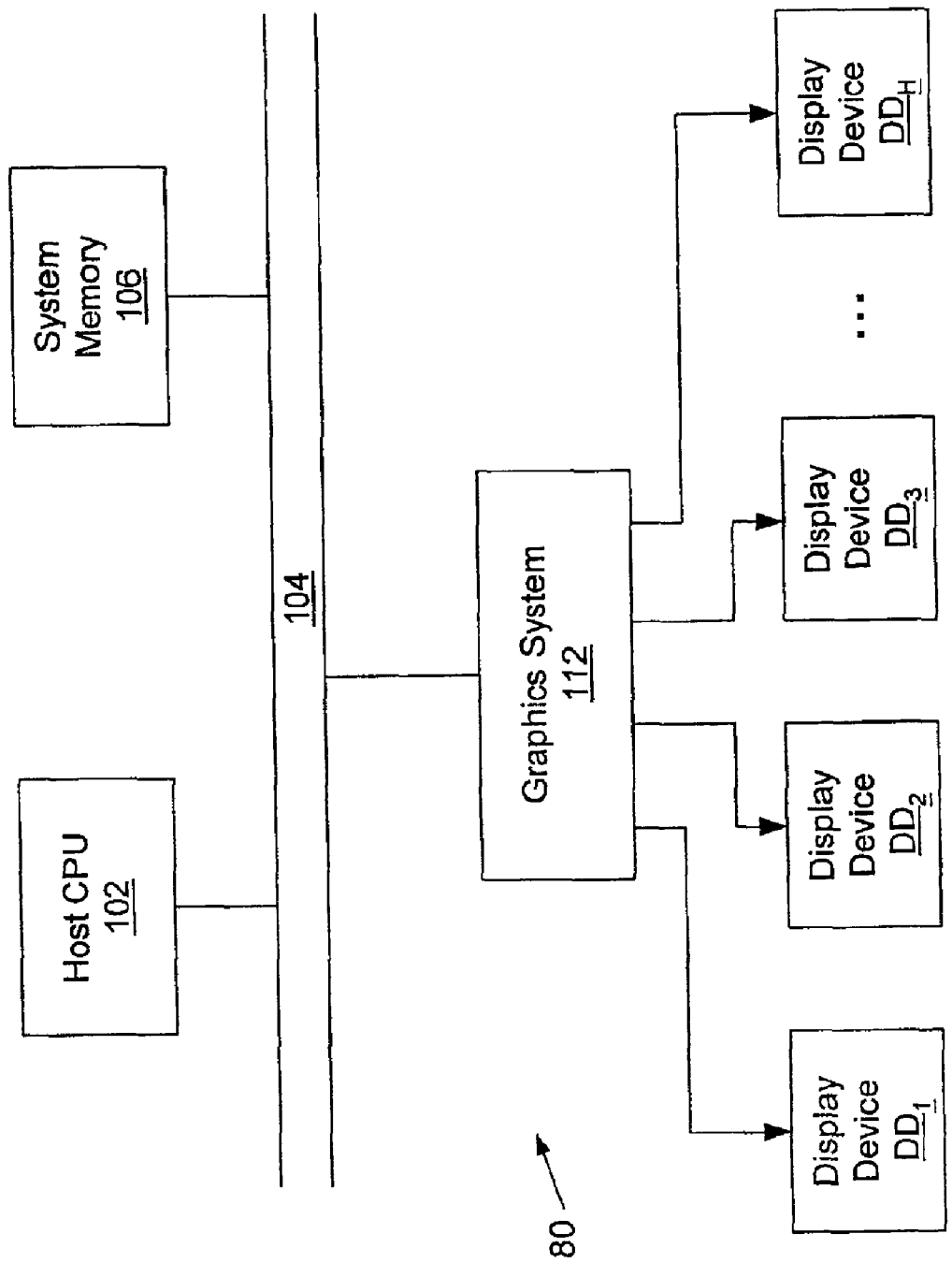
FIG. 2A is a simplified block diagram of one embodiment of computer system 80 of FIG. 1.

FIG. 2A presents a simplified block diagram for computer system 80. Elements of computer system 80 that are not necessary for an understanding of the present invention are suppressed for convenience. Computer system 80 comprises a host central processing unit (CPU) 102 and a 3-D graphics system 112 coupled to system bus 104. A system memory 106 may also be coupled to system bus 104. Other memory media devices such as disk drives, CD-ROM drives, tape drives, etc. may be coupled to system bus 104.

Host CPU 102 may be realized by any of a variety of processor technologies. For example, host CPU 102 may comprise one or more general purpose microprocessors, parallel processors, vector processors, digital signal processors, etc., or any combination thereof. System memory 106 may include one or more memory subsystems representing different types of memory technology. For example, system memory 106 may include read-only memory (ROM) and/or random access memory (RAM)—such as static random access memory (SRAM), synchronous dynamic random access memory (SDRAM) and/or Rambus dynamic access memory (RDRAM).

System bus 104 may comprise one or more communication buses or host computer buses (e.g. for communication between host processors and memory subsystems). In addition, various peripheral devices and peripheral buses may be connected to system bus 104.

Graphics system 112 may comprises one or more graphics boards that generate video signals for display devices $DD_1$ through $DD_H$ in response to graphics data received from host CPU 102 and/or system memory 106. Display devices $DD_1$ through $DD_H$ may include monitors and/or projection devices.

In one embodiment, the graphics boards comprising graphics system 112 may be partitioned into one or more chains with each chain driving one or more display devices. For example, R graphics boards may be coupled together in a linear chain as suggested by FIG. 2B. The R graphics boards may collaborate in the generation of video signals $V_A$ and $V_B$ for display devices $DD_A$ and $DD_B$ respectively. The number R of graphics boards may be chosen to match the combined pixel input bandwidth of display devices $DD_A$ and $DD_B$. The graphics boards may also couple to system bus 104 (e.g. by crossbar switches or any other type of bus connectivity logic). The first graphics board in the linear chain is denoted GB(0), and the generic $K^{th}$ graphics board in the linear chain is denoted GB(K). In one alternative embodiment, some or all of graphics boards comprising graphics system 112 may be optimized for "non-collaborative" operation. Each non-collaborative graphics board may omit logic for interfacing with other graphics boards.

In one embodiment, host CPU 102 may transfer information to/from each graphics board GB(K) according to a programmed input/output (I/O) protocol over system bus

104. In a second embodiment, each graphics board GB(K) may access system memory 106 according to a direct memory access (DMA) protocol or through intelligent busmastering. In yet another embodiment, the graphics boards may be coupled to system memory 106 through a direct port, such as an Advanced Graphics Port (AGP) promulgated by Intel Corporation.

One or more graphics applications conforming to an application programming interface (API) such as OpenGL® or Java® 3D may execute on host CPU 102. The graphics application(s) may construct a scene composed of geometric objects in a world coordinate system, and may decompose the scene into a collection of graphics primitives (e.g. triangles). The graphics application may compress the graphics primitives, and transfer the compressed graphics data to the graphics boards GB(0), GB(1), GB(2), . . . , GB(R-1).

The first graphics board GB(0) may generate digital video streams $X_0$ and $Y_0$. The second graphics board GB(1) may receive digital video streams $X_0$ and $Y_0$ from the first graphics board GB(0), and transmit digital video streams $X_1$ and $Y_1$ to the third graphics board GB(2). In general, graphics board GB(K), for K between 1 and (R-2) inclusive, may receive digital video streams $X_{K-1}$ and $Y_{K-1}$ from a previous graphics board GB(K-1), and transmit digital video streams $X_K$ and $Y_K$ to a next graphics board GB(K+1).

Each graphics board is responsible for filling in a portion of first video signal $V_A$ and/or the second video signal $V_B$. Thus, each digital video stream $X_K$ is no less "filled in" with pixel data than its predecessor $X_{K-1}$. The same observation holds for the digital video streams $Y_0, Y_1, \ldots, Y_{R-1}$. The last graphics board GB(R-1) receives digital video streams $X_{R-2}$ and $Y_{R-2}$ from the next-to-last graphics board GB(R-2), and generates digital video streams $X_{R-1}$ and $Y_{R-1}$. The last graphics board GB(R-1) converts the digital video streams $X_{R-1}$ and $Y_{R-1}$ into analog video signals $V_A$ and $V_B$ respectively for presentation to display devices $DD_A$ and $DD_B$ respectively. Thus, the last graphics board GB(R-1) may include digital-to-analog conversion (DAC) hardware. In one embodiment, the graphics boards are interchangeable, and thus, each of the graphics boards includes DAC hardware. It is noted that display devices $DD_A$ and $DD_B$ may be configured to receive and/or output digital video data, in which case the digital-to-analog conversion may be bypassed.

It is noted that the graphics boards comprising 3-D graphics system 112 may couple to one or more busses of various types in addition to system bus 104. Furthermore, some or all of the graphics boards may couple to a communication port, and thereby, directly receive graphics data from an external source such as the Internet or a local area network. Computer system 80 or system unit 82 may be configured as a server accessible by client computers through a computer network.

Graphics boards may receive graphics data from any of various sources including: host CPU 102, system memory 106 or any other memory, external sources such as a local area network, or a broadcast medium (e.g. television). While graphics system 112 is depicted as part of computer system 80, graphics system 112 may also be configured as a stand-alone device.

Graphics system 112 may be comprised in any of various systems, including a network PC, a gaming play-station, an Internet appliance, a television (including an HDTV system, an interactive television system, etc.), or other devices which display 2D and/or 3D graphics.

Figure 3:
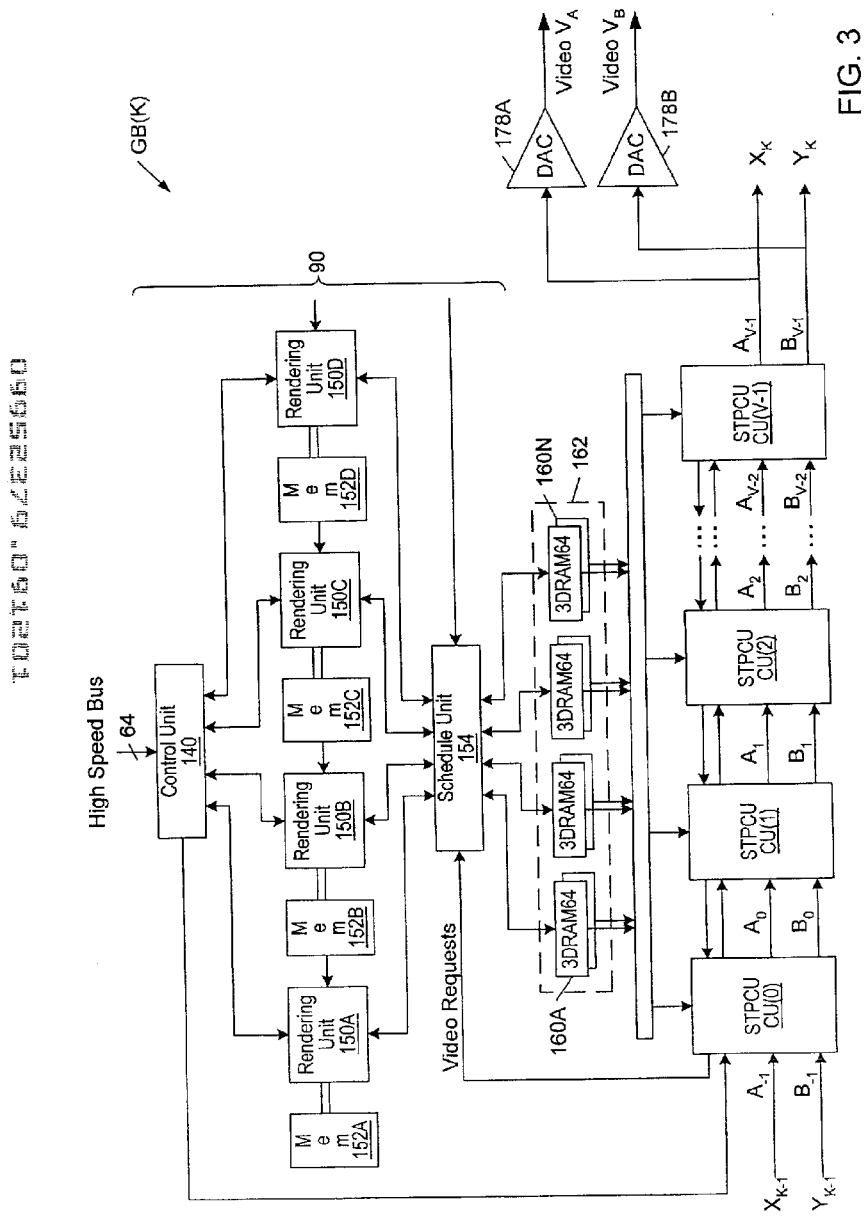
FIG. 3 illustrates one embodiment of a graphics board configured for multi-board collaboration.

FIG. 3: Graphics Board GB(K)

FIG. 3 presents a block diagram for one embodiment of generic graphics board GB(K) for K=0, 1, 2, . . . , R-1. Graphics board GB(K) may comprise a graphics processing unit (GPU) 90, a super-sampled sample buffer 162, and one or more sample-to-pixel calculation units CU(0) through CU(V-1). Graphics board GB(K) may also comprise two digital-to-analog converters (DACs) 178A and 178B. In an alternative embodiment, graphics board GB(K) may include resources for operating on more than two simultaneous video channels, and thus, more than two digital-to-analog converters. In a second alternative embodiment, graphics board GB(K) may be configured to operate on a single video channel, and thus, may include only one digital-to-analog converter.

Graphics processing unit 90 may comprise any combination of processor technologies. For example, graphics processing unit 90 may comprise specialized graphics processors or calculation units, multimedia processors, DSPs, general purpose processors, programmable logic, reconfigurable logic, discrete logic, or any combination thereof. Graphics processing unit 90 may comprise one or more rendering units such as rendering units 150A–D. Graphics processing unit 90 may also comprise one or more control units such as control unit 140, one or more data memories such as data memories 152A–D, and one or more schedule units such as schedule unit 154. Sample buffer 162 may comprise one or more sample memories 160A–160N.

Graphics board GB(K) may include two digital video input ports for receiving digital video streams $X_{K-1}$ and $Y_{K-1}$ from a previous graphics board GB(K-1) in cases where graphics board GB(K) is not the first graphics board in the linear chain of graphics boards. Similarly, graphics board GB(K) may include two digital video output ports for transmitting digital video streams $X_K$ and $Y_K$ to the next graphics board GB(K+1) in cases where graphics board GB(K) is not the last graphics board in the linear chain.

A. Control Unit 140

Control unit 140 operates as the interface between graphics board GB(K) and computer system 80 by controlling the transfer of data between graphics board GB(K) and computer system 80. In embodiments of graphics board GB(K) that comprise two or more rendering units 150A–D, control unit 140 may also partition the stream of data received from computer system 80 into a corresponding number of parallel streams that are routed to the individual rendering units 150A–D. The graphics data may be received from computer system 80 in a compressed form. Graphics data compression may advantageously reduce the required transfer bandwidth between computer system 80 and graphics board GB(K). In one embodiment, control unit 140 may be configured to split and route the received data stream to rendering units 150A–D in compressed form.

The graphics data may comprise one or more graphics primitives. As used herein, the term graphics primitive includes polygons, parametric surfaces, splines, NURBS (non-uniform rational B-splines), sub-division surfaces, fractals, volume primitives, and particle systems. These graphics primitives are described in detail in the text book entitled "Computer Graphics: Principles and Practice" by James D. Foley, et al., published by Addison-Wesley Publishing Co., Inc., 1996.

It is noted that the embodiments and examples presented herein are described in terms of polygons for the sake of simplicity. However, any type of graphics primitive may be used instead of or in addition to polygons in these embodiments and examples.

B. Rendering Units

Rendering units 150A–D (also referred to herein as draw units) are configured to receive graphics instructions and data from control unit 140 and then perform a number of functions which depend on the exact implementation. For example, rendering units 150A–D may be configured to perform decompression (if the received graphics data is presented in compressed form), transformation, clipping, lighting, texturing, depth cueing, transparency processing, set-up, visible object determination, and virtual screen rendering of various graphics primitives occurring within the graphics data. Rendering units 150A–D are intended to represent an arbitrary number of rendering units.

The graphics data received by each rendering unit 150 may be decompressed into one or more graphics "primitives" which may then be rendered. The term primitive refers to components of objects that define the object's shape (e.g., points, lines, triangles, polygons in two or three dimensions, polyhedra, or free-form surfaces in three dimensions). Each of rendering units 150A–D may be any suitable type of high performance processor (e.g., a specialized graphics processor or calculation unit, a multimedia processor, a digital signal processor, or a general purpose processor).

Graphics primitives or portions of primitives which survive a clipping computation may be projected onto a 2-D viewport. Instead of clipping in 3-D, graphics primitives may be projected onto a 2-D view plane (which includes the 2-D viewport) and then clipped with respect to the 2-D viewport.

Virtual screen rendering refers to calculations that are performed to generate samples for projected graphics primitives. For example, the vertices of a triangle in 3-D may be projected onto the 2-D viewport. The projected triangle may be populated with samples, and values (e.g. red, green, blue, z and alpha values) may be assigned to the samples based on the corresponding values already determined for the projected vertices. (For example, the red value for each sample in the projected triangle may be interpolated from the known red values of the vertices.) These sample values for the projected triangle may be stored in sample buffer 162. A virtual image accumulates in sample buffer 162 as successive primitives are rendered. Thus, the 2-D viewport is said to be a virtual screen on which the virtual image is rendered. The sample values comprising the virtual image are stored into sample buffer 162. Points in the 2-D viewport are described in terms of virtual screen coordinates x and y, and are said to reside in "virtual screen space". See FIG. 4 for an illustration of the two-dimensional viewport 420 populated with samples.

When the virtual image is complete, e.g., when all graphics primitives comprising the virtual image have been rendered, sample-to-pixel calculation units CU(0) through CU(V-1) may read the rendered samples from sample buffer 162, and filter the samples to generate pixel values. Each sample-to-pixel calculation unit CU(J) may be assigned a region of the virtual screen space, and may operate on samples corresponding to the assigned region. Sample-to-pixel calculation units CU(0) through CU(V-1) may operate in parallel.

In the embodiment of graphics board GB(K) shown in FIG. 3, rendering units 150A–D calculate sample values instead of pixel values. This allows rendering units 150A–D to perform super-sampling, i.e. to calculate more than one sample per pixel. Super-sampling in the context of the present invention is discussed more thoroughly below. More details on super-sampling are discussed in the following books:

"Principles of Digital Image Synthesis" by Andrew S. Glassner, 1995, Morgan Kaufman Publishing (Volume 1);

The Renderman Companion" by Steve Upstill, 1990, Addison Wesley Publishing; and

"Advanced Renderman: Beyond the Companion" by Anthony A. Apodaca.

Sample buffer 162 may be double-buffered so that rendering units 150A–D may write samples for a first virtual image into a first portion of sample buffer 162, while a second virtual image is simultaneously read from a second portion of sample buffer 162 by sample-to-pixel calculation units CU.

C. Data Memories

Each of rendering units 150A–D may be coupled to a corresponding one of instruction and data memories 152A–D. In one embodiment, each of memories 152A–D may be configured to store both data and instructions for a corresponding one of rendering units 150A–D. While implementations may vary, in one embodiment, each data memory 152A–D may comprise two 8 MByte SDRAMs, providing a total of 16 MBytes of storage for each of rendering units 150A–D. In another embodiment, RDRAMs (Rambus DRAMs) may be used to support the decompression and set-up operations of each rendering unit, while SDRAMs may be used to support the draw functions of each rendering unit. Data memories 152A–D may also be referred to as texture and render memories 152A–D.

D. Schedule Unit

Schedule unit 154 may be coupled between rendering units 150A–D and sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by rendering units 150A–D. As used herein, the term "sample buffer" refers to one or more memories which store samples. As previously noted, samples may be filtered to form each output pixel value. Output pixel values may be provided to display device $DD_A$ and/or display device $DD_B$.

Sample buffer 162 may be configured to support super-sampling, critical sampling, or sub-sampling with respect to pixel resolution. In other words, the average distance between samples $(x_k, y_k)$ may be smaller than, equal to, or larger than the average distance between pixel centers in virtual screen space. Furthermore, because the convolution kernel C(x,y) may take non-zero functional values over a neighborhood which spans several pixel centers, a single sample may contribute to several output pixel values.

Sample memories 160A–160N may comprise any of various types of memories (e.g., SDRAMs, SRAMs, RDRAMs, 3DRAMs, or next-generation 3DRAMs) in varying sizes. In one embodiment, each schedule unit 154 is coupled to four banks of sample memories, where each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel.

3DRAM-64 memories are specialized memories configured to support full internal double buffering with single buffered Z in one chip. The double buffered portion comprises two RGBX buffers, where X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, 32 chips used in combination are sufficient to create a double-buffered 1280×1024 super-sampled sample buffer with eight samples per pixel.

Since the 3DRAM-64 memories are internally double-buffered, the input pins for each of the two frame buffers in the double-buffered system are time multiplexed (using multiplexers within the memories). The output pins may be similarly time multiplexed. This allows reduced pin count while still providing the benefits of double buffering. 3DRAM-64 memories further reduce pin count by not having z output pins. Since z comparison and memory buffer selection are dealt with internally, use of the 3DRAM-64 memories may simplify the configuration of sample buffer 162. For example, sample buffer 162 may require little or no selection logic on the output side of the 3DRAM-64 memories. The 3DRAM-64 memories also reduce memory bandwidth since information may be written into a 3DRAM-64 memory without the traditional process of reading data out, performing a z comparison, and then writing data back in. Instead, the data may be simply written into the 3DRAM-64 memory, with the memory performing the steps described above internally.

Graphics processing unit 90 may be configured to generate a plurality of sample positions according to a particular sample positioning scheme (e.g., a regular grid, a perturbed regular grid, etc.). Alternatively, the sample positions (or offsets that are added to regular grid positions to form the sample positions) may be read from a sample position memory (e.g., a RAM/ROM table). Upon receiving a polygon that is to be rendered, graphics processing unit 90 determines which samples fall within the polygon based upon the sample positions. Graphics processing unit 90 renders the samples that fall within the polygon and stores rendered samples in sample memories 160A–N. Note as used herein the terms render and draw are used interchangeably and refer to calculating color values for samples. Depth values, alpha values, and other per-sample values may also be calculated in the rendering or drawing process.

F. Sample-To-Pixel Calculation Units

Sample-to-pixel calculation units CU(0) through CU(V-1) (collectively referred to as sample-to-pixel calculation units CU) may be coupled together in a linear succession as shown in FIG. 3. The first sample-to-pixel calculation unit CU(0) in the linear succession may be programmed to receive digital video streams $X_{K-1}$ and $Y_{K-1}$ from a previous graphics board GB(K−1), and the last sample-to-pixel calculation unit CU(V-1) in the linear succession may be programmed to transmit digital video streams $X_K$ and $Y_K$ to the next graphics board GB(K+1).

Figure 2B:
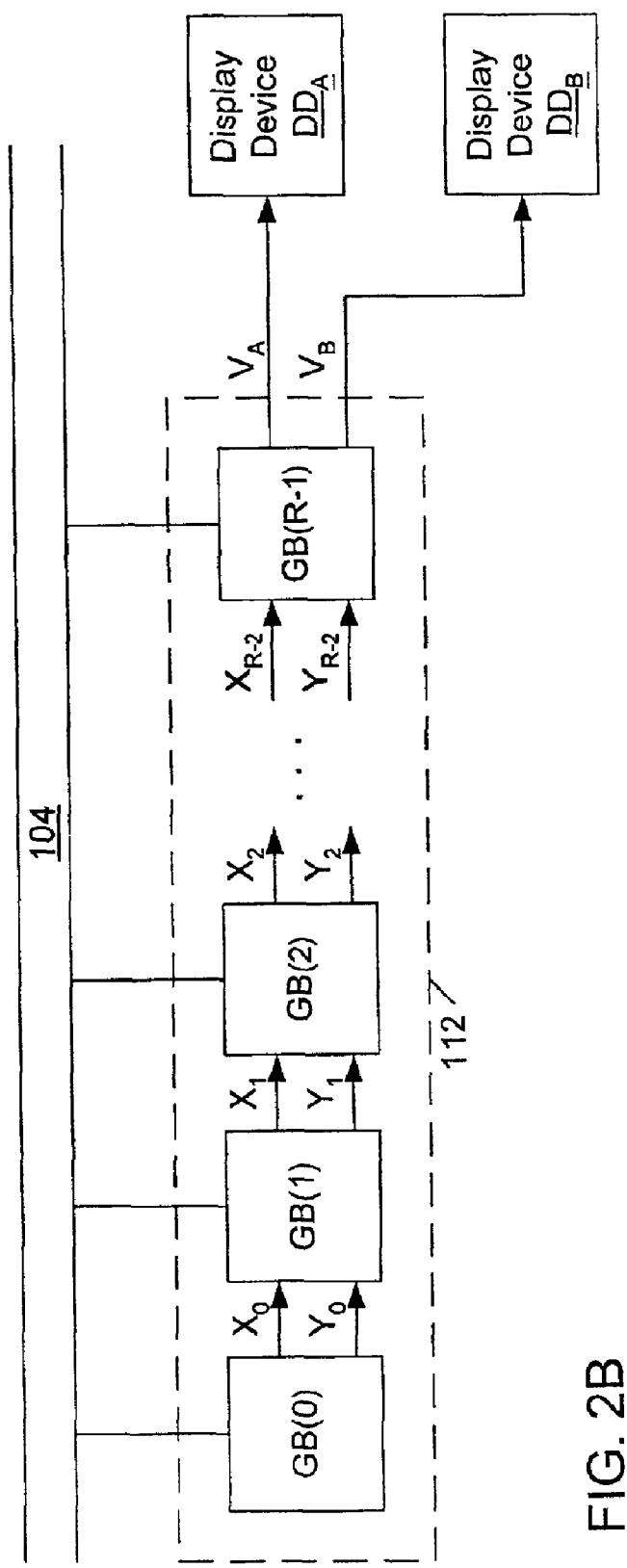
FIG. 2B illustrates one embodiment of graphics system 112 in which multiple graphics boards couple together in a linear chain and cooperatively generate two video streams for two display devices respectively.

If graphics board GB(K) is the first graphics board in the linear chain of graphics boards shown in FIG. 2B, first sample-to-pixel calculation unit CU(0) may be programmed to disable reception of input signals $X_K$ and $Y_K$. If graphics board GB(K) is the last graphics board in the linear chain, the last sample-to-pixel calculation unit CU(V-1) may be programmed to provide the digital video streams $X_K$ and $Y_K$ to digital-to-analog conversion units 178A and 178B respectively.

In cases where J takes a value between 1 and V−2 inclusive, sample-to-pixel calculation unit CU(J) is configured to receive digital video input streams $A_{J-1}$ and $B_{J-1}$ from a previous sample-to-pixel calculation unit CU(J−1), and to transmit digital video output streams $A_J$ and $B_J$ to the next sample-to-pixel calculation unit CU(J+1). The first sample-to-pixel calculation unit CU(0) is configured to receive digital video streams $X_{K-1}$ and $Y_{K-1}$ from a previous graphics board GB(K−1), and to transmit digital video stream $A_0$ and $B_0$ to the second sample-to-pixel calculation unit CU(1). For notational uniformity, digital video streams $X_{K-1}$ and $Y_{K-1}$ are also referred to as digital video streams $A_{-1}$ and $B_{-1}$. The last sample-to-pixel calculation unit CU(V-1) receives digital video streams $A_{V-2}$ and $B_{V-2}$ from the previous sample-to-pixel calculation unit CU(V-2), and generates digital video streams $X_K$ and $Y_K$ (which are also referred to herein as video streams $A_{V-1}$ and $B_{V-1}$). Sample-to-pixel calculation unit CU(V-1) may be programmed to supply the digital video streams $X_K$ and $Y_K$ to a next graphics board GB(K+1) or to DAC units 178A/178B.

Video streams $X_0, X_1, \ldots, X_{R-1}$ generated by the linear chain of graphics boards, and video streams $A_0, A_1, \ldots, A_{V-1}$ generated by the sample-to-pixel calculation units in each of the graphics boards are said to belong to video stream A. Similarly, video streams $Y_0, Y_1, \ldots, Y_{R-1}$ generated by the linear chain of graphics boards, and video streams $B_0, B_1, \ldots, B_{V-1}$ generated by the sample-to-pixel calculation units in each of the graphics boards are said to belong to video stream B.

As described above, rendering units 150A–D are configured to generate samples for graphics primitives, and to store the samples into sample buffer 162. As successive graphics primitives are rendered, a sampled virtual image accumulates in sample buffer 162. When the sampled virtual image is complete, i.e., when all graphics primitives comprising the virtual image have been rendered, each sample-to-pixel calculation unit CU(J) may access samples of the virtual image from sample buffer 162, and may filter the samples to generate pixel values. Each sample-to-pixel calculation unit CU(J) operates on samples residing in a corresponding region of the virtual screen space. The region assigned to each sample-to-pixel calculation unit CU(J) is programmed at system initialization time. Thus, the sample-to-pixel calculation units may partition the labor of transforming sample values into pixel values.

Sample-to-pixel calculation unit CU(J) may perform a spatial convolution of a portion of the sampled virtual image with respect to a convolution kernel K(x,y) to generate pixel values. For example, a red value $R_{pix}$ for a pixel may be computed at a location $(x_p, y_p)$ in virtual screen space based on the relation $$R_{pix} = \frac{1}{E} \sum K(x_k - x_p, y_k - y_p) R(x_k, y_k),$$

where the summation is evaluated at samples $(x_k, y_k)$ in the vicinity of location $(x_p, y_p)$. Since convolution kernel K(x,y) is non-zero only in a neighborhood of the origin, the displaced kernel $K(x-x_p, y-y_p)$ may take non-zero values only in a neighborhood of location $(x_p, y_p)$.

The value E is a normalization value that may be computed according to the relation $$E = \sum K(x_k - x_p, y_k - y_p),$$

where the summation is evaluated for the same samples $(x_k, y_k)$ as in the red pixel value summation above. The summation for the normalization value E may be performed in parallel with the red pixel value summation. The location $(x_p, y_p)$ may be referred to herein as a virtual pixel center or virtual pixel origin. FIG. 4 shows the support 72 (i.e. footprint) of a circularly symmetric convolution kernel. In this case, the virtual pixel center $(x_p, y_p)$ corresponds to the center of the support disk 72.

Similar summations to compute green, blue and alpha pixel values in terms of the green, blue and alpha sample values respectively may be performed in parallel with the red pixel value summation and the normalization constant summation.

At system initialization time, sample-to-pixel calculation unit CU(J) will have been programmed to mix (or inject) its computed pixel values into either video stream A or video stream B. For example, if sample-to-pixel calculation unit CU(J) has been assigned to video stream A, sample-to-pixel calculation unit CU(J) may mix (or inject) its computed pixel values into video stream A, and pass video stream B unmodified to the next sample-to-pixel calculation unit CU(J+1), or next graphics board. In other words, sample-to-pixel calculation unit CU(J) may mix (or replace) at least a subset of the dummy pixel values present in video stream $A_{J-1}$ with its locally computed pixel values. The resultant video stream $A_J$ is transmitted to the next sample-to-pixel calculation unit or graphics board.

In one embodiment, sample-to-pixel calculation units CU(J) may implement a super-sampled reconstruction band-pass filter to compute pixel values from samples stored in sample buffer 162. The support of the band-pass filter may cover a rectangular area in virtual screen space which is $M_p$ pixels high and $N_p$ pixels wide. Thus, the number of samples covered by the band-pass filter is approximately equal to $M_p N_p R_{s/p}$, where $R_{s/p}$ is the number of samples per pixel region. A variety of values for $M_p$, $N_p$ and $R_{s/p}$ are contemplated. For example, in one embodiment of the band-pass filter $M_p = N_p = 5$. It is noted that with certain sample positioning schemes (see the discussion attending FIGS. 5A, 5B and 5C), the number of samples that fall within the filter support may vary as the filter center (i.e. the virtual pixel center) is moved in the virtual screen space.

In other embodiments, sample-to-pixel calculation units CU(J) may filter a selected number of samples to calculate an output pixel value. The selected samples may be multiplied by a spatial weighting function that gives weights to samples based on their position with respect to the filter center (i.e. the virtual pixel center).

The filtering operations performed by sample-to-pixel calculation unit CU(J) may use any of a variety of filters, either alone or in combination. For example, the filtering operations may comprise convolution with a box filter, a tent filter, a cylindrical filter, a cone filter, a Gaussian filter, a Catmull-Rom filter, a Mitchell-Netravali filter, a windowed sinc filter, etc. Furthermore, the support of the filters used by sample-to-pixel calculation unit CU(J) may be circular, elliptical, rectangular (e.g. square), triangular, hexagonal, etc.

Sample-to-pixel calculation unit CU(J) may also be configured with one or more of the following features: per-pixel color correction based on spectral measurements, color look-up using pseudo color tables, direct color, inverse gamma correction, and conversion of pixels to non-linear light space. Other features of sample-to-pixel calculation unit CU(J) may include programmable video timing generators, programmable pixel clock synthesizers, cursor generators, and crossbar functions.

G. Digital-to-Analog Converters

Digital-to-analog converter (DAC) 178A may receive digital video stream $X_K$ from last sample-to-pixel calculation unit CU(V-1), and convert digital video stream $X_K$ into an analog video signal $V_A$ for transmission to display device $DD_A$. Similarly, DAC 178B may receive digital video stream $Y_K$ from last sample-to-pixel calculation unit CU(V-1), and convert digital video stream $Y_K$ into an analog video signal $V_A$ for transmission to display device $DD_B$. Digital-to-Analog Converters (DACs) 178A and 178B are collectively referred to herein as DACs 178. It is noted that DACs 178 may be disabled in all graphics boards except for the last graphics board GB(R-1) which is physically coupled to display devices $DD_A$ and $DD_B$. See FIG. 2B.

In the preferred embodiment, last sample-to-pixel calculation unit CU(V-1) provides digital video stream $X_K$ to DAC 178A without an intervening frame buffer. Similarly, last sample-to-pixel calculation unit CU(V-1) provides digital video stream $Y_K$ to DAC 178B without an intervening frame buffer. However, in one alternative embodiment, one or more frame buffers intervene between last sample-to-pixel calculation unit CU(V-1) and DAC 178A and/or DAC 178B.

DAC 178A and/or DAC 178B may be bypassed or omitted completely in order to output digital pixel data in lieu of analog video signals. This may be useful where display devices $DD_A$ and/or $DD_B$ are based on a digital technology (e.g., an LCD projector, an LCOS projector, or a digital micro-mirror projector).

It is noted that various embodiment of graphics board GB(K) are contemplated with varying numbers of render units 150, varying numbers of sample-to-pixel calculation units CU. Furthermore, alternative embodiments of graphics board GB(K) are contemplated for generating more than (or less than) two simultaneous video streams.

Figure 5A:
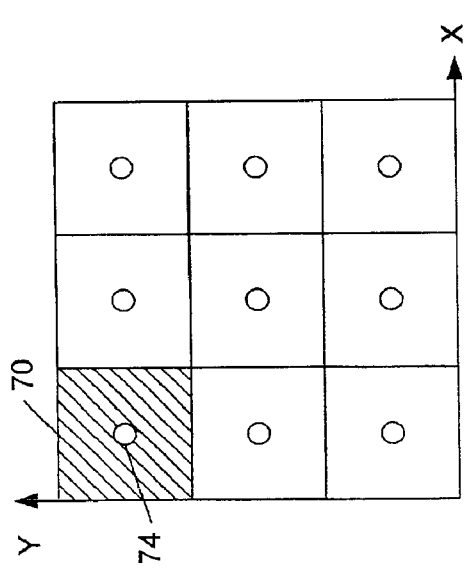
FIG. 5A illustrates an embodiment of critical sampling, i.e. where one sample is assigned per unit pixel area in virtual screen space x/y.
Figure 5B:
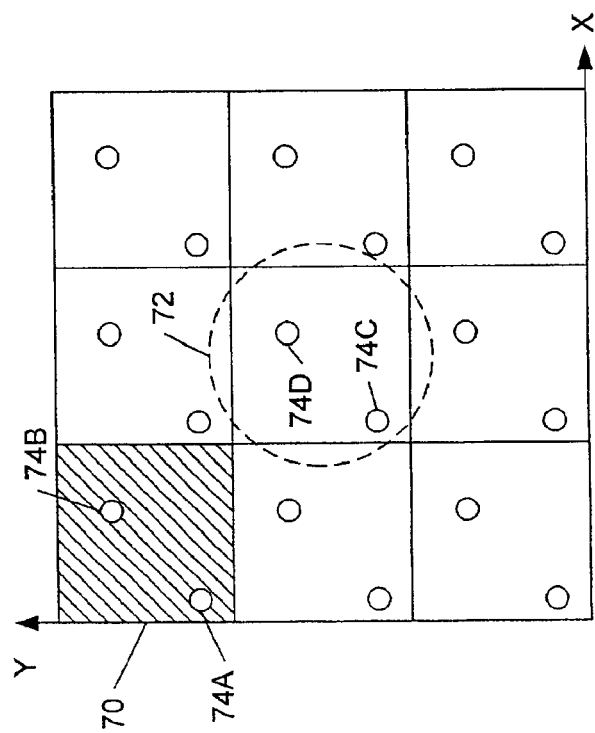
FIG. 5B illustrates an embodiment of regular supersampling, where two samples are assigned per unit pixel area in virtual screen space x/y.
Figure 5C:
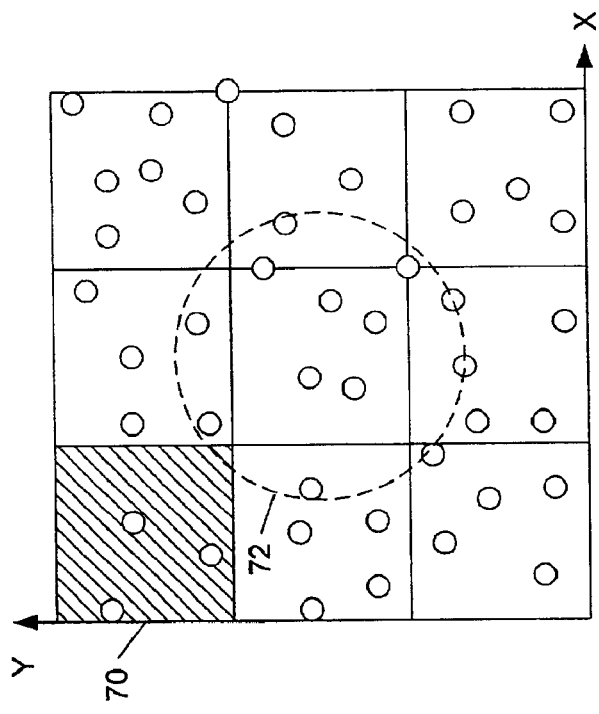
FIG. 5C illustrates a random distribution of samples in virtual screen space x/y.

FIGS. 5A–C: Super-Sampling

FIG. 5A illustrates a portion of virtual screen space in a non-super-sampled example. The small circles denote sample locations. The rectangular regions superimposed on virtual screen space indicate the average horizontal and vertical distance between virtual pixel centers (i.e. points at which pixel values are computed). A virtual pixel center may be located at the center of each rectangular region. In addition, one sample is located in each rectangular region, e.g., at the center of each rectangular region. Sample 74 is located in region 70 (denoted in cross hatch). Rendering units 150 compute values such as red, green, blue, and alpha for each sample. Sample-to-pixel calculation units CU may compute output pixel values (e.g. red, green, blue, and alpha) based on multiple samples, e.g. by using a convolution filter whose support spans several of the rectangular regions.

Turning now to FIG. 5B, an example of one embodiment of super-sampling is illustrated. In this embodiment, two samples are computed per rectangular region. For example, samples 74A and 74B are located in region 70 (denoted in cross hatch). The samples are distributed according to a regular grid. Even though the spatial density of samples is twice the spatial density of pixels, output pixel values could be computed using one sample per pixel, e.g. by throwing out all but the sample nearest to the center of each pixel. However, a number of advantages arise from computing pixel values based on multiple samples.

A support region 72 is superimposed over the center pixel (corresponding to the center region) of FIG. 5B, and illustrates the support of a convolution filter. The support of a filter is the set of locations over which the filter (i.e. the filter kernel) takes non-zero values. In this example, the support region 72 is a circular disc. The output pixel values (e.g. red, green, blue and z values) for the corresponding pixel center are determined only by samples 74C and 74D, because these are the only samples which fall within support region 72. This filtering operation may advantageously improve the realism of a displayed image by smoothing abrupt edges in the displayed image (i.e., by performing anti-aliasing). The filtering operation may simply average the values of samples 74C and 74D to form the corresponding output values for the center pixel. More generally, the filtering operation may generate a weighted sum of the values of samples 74C and 74D, where the contribution of each sample is weighted according to some function of the sample's position (or distance) with respect to the center of support region 72. The filter, and thus support region 72, may be repositioned for each output pixel being calculated. For example, the filter center may visit the center of each rectangular region for which pixel values are to be computed. Other filters and filter positioning schemes are also possible and contemplated.

In the example of FIG. 5B, there are two samples per pixel. In general, however, there is no requirement that the number of samples be related to the number of pixels. The number of samples may be completely independent of the number of pixels. For example, the number of samples may be smaller than the number of pixels. (This is the condition that defines sub-sampling).

Turning now to FIG. 5C, another embodiment of super-sampling is illustrated. In this embodiment, the samples are positioned randomly (i.e. stochastically). Thus, the number of samples used to calculate output pixel values may vary from pixel to pixel. Render units 150A–D calculate color information at each sample position.

FIGS. 6–13: Super-Sampled Sample Buffer with Real-Time Convolution

Figure 6:
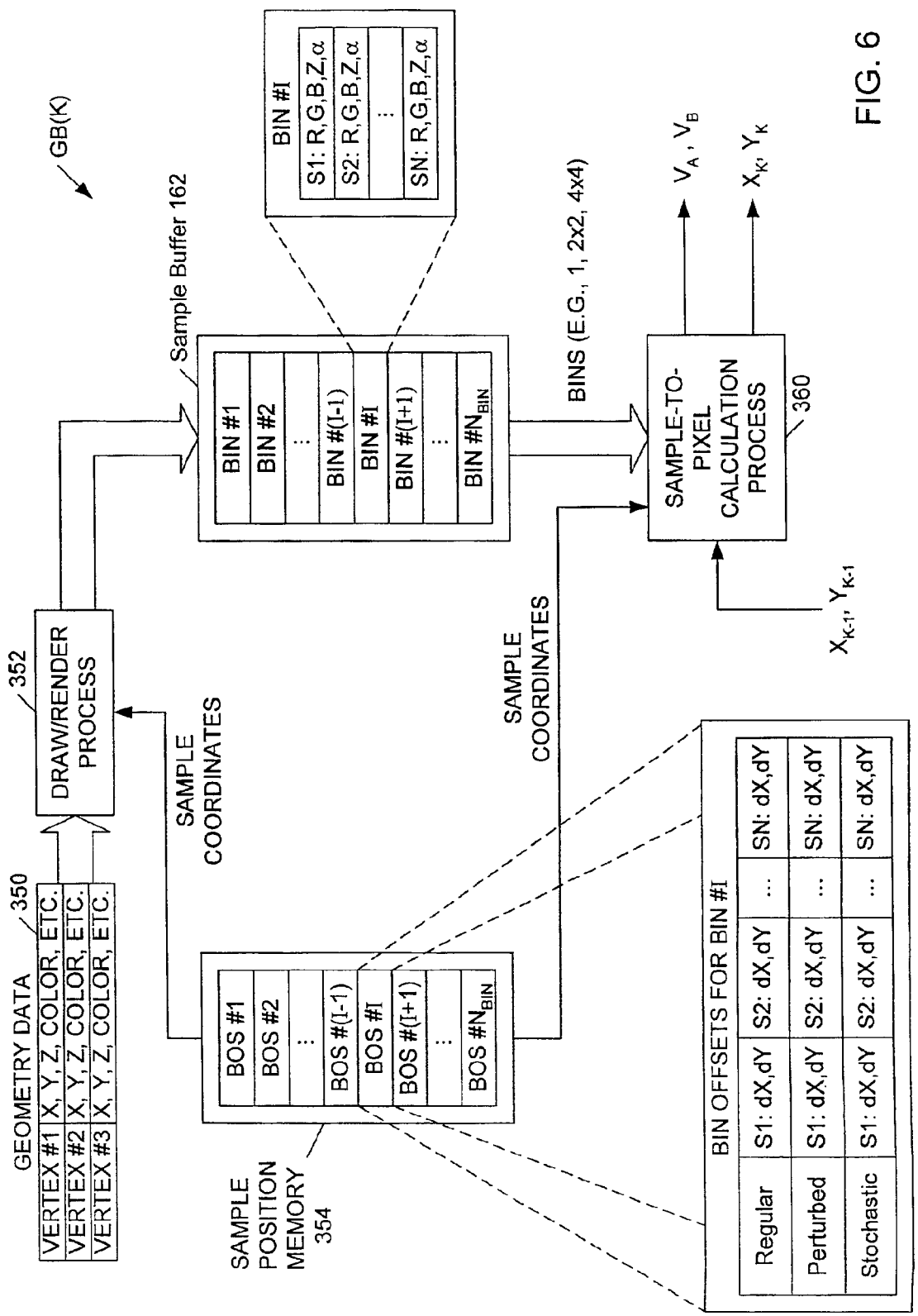
FIG. 6 illustrates one embodiment for the flow of data through generic graphics board GB(K)

FIG. 6 illustrates one possible configuration for the flow of data through one embodiment of graphics board GB(K). As the figure shows, geometry data 350 is received by graphics board GB(K) and used to perform draw process 352. The draw process 352 is implemented by one or more of control unit 140, rendering units 150, data memories 152, and schedule unit 154. Geometry data 350 comprises data for one or more polygons. Each polygon comprises a plurality of vertices (e.g., three vertices in the case of a triangle), some of which may be shared among multiple polygons. Data such as spatial coordinates, color data, lighting data and texture map information may be included for each vertex.

In addition to the vertex data, draw process 352 (which may be performed by rendering units 150A–D) also receives sample position information from a sample position memory 354. The sample position information defines the location of samples in virtual screen space, i.e. in the 2-D viewport. Draw process 352 selects the samples that fall within the polygon currently being rendered, calculates a set of values (e.g. red, green, blue, z, alpha, and/or depth of field information) for each of these samples based on their respective positions within the polygon. For example, the z value of a sample that falls within a triangle may be interpolated from the known z values of the three vertices. Each set of computed sample values are stored into sample buffer 162.

In one embodiment, sample position memory 354 is embodied within rendering units 150A–D. In another embodiment, sample position memory 354 may be realized as part of data memories 152A–152D, or as a separate memory.

Sample position memory 354 may store sample positions in terms of their virtual screen coordinates (x,y). Alternatively, sample position memory 354 may be configured to store only offsets dx and dy for the samples with respect to positions on a regular grid. Storing only the offsets may use less storage space than storing the entire coordinates (x,y) for each sample. The sample position information stored in sample position memory 354 may be read by a dedicated sample position calculation unit (not shown) and processed to calculate sample positions for graphics processing unit 90. More detailed information on the computation of sample positions is included below.

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, sample position memory 354 may be programmable to access or "unfold" the random number table in a number of different ways, and thus, may deliver more apparent randomness for a given length of the random number table. Thus, a smaller table may be used without generating the visual artifacts caused by simple repetition of sample position offsets.

Sample-to-pixel calculation process 360 uses the same sample positions as draw process 352. Thus, in one embodiment, sample position memory 354 may generate a sequence of random offsets to compute sample positions for draw process 352, and may subsequently regenerate the same sequence of random offsets to compute the same sample positions for sample-to-pixel calculation process 360. In other words, the unfolding of the random number table may be repeatable. Thus, it may not be necessary to store sample positions at the time of their generation for draw process 352.

As shown in FIG. 6, sample position memory 354 may be configured to store sample offsets generated according to a number of different schemes such as a regular grid (e.g. a rectangular grid, hexagonal grid, etc.), a perturbed regular grid, or a random (stochastic) distribution. Graphics board GB(K) may receive an indication from the operating system, device driver, or the geometry data 350 that indicates which type of sample positioning scheme is to be used. Thus, sample position memory 354 may be configurable or programmable to generate position information according to one or more different schemes.

In one embodiment, sample position memory 354 may comprise a RAM/ROM that contains stochastically determined sample points or sample offsets. Thus, the density of samples in virtual screen space may not be uniform when observed at small scale. Two bins (i.e. regions) with equal area centered at different locations in virtual screen space may contain different numbers of samples.

An array of bins may be superimposed over the 2-D viewport 420 of FIG. 4, and the storage of samples in sample buffer 162 may be organized in terms of bins. Sample buffer 162 may comprise an array of memory blocks which correspond to the bins. Each memory block may store the sample values (e.g. red, green, blue, z, alpha, etc.) for the samples that fall within the corresponding bin. (See the exploded view of Bin #I in FIG. 6.) The approximate location of a sample is given by the bin in which it resides. The memory blocks may have addresses which are easily computable from the corresponding bin locations in virtual screen space, and vice versa. Thus, the use of bins may simplify the storage and access of sample values in sample buffer 162.

Suppose (for the sake of discussion) that the 2-D viewport 420 ranges from (0000,0000) to (FFFF,FFFF) in hexadecimal virtual screen coordinates. Also suppose that 2-D viewport 420 is overlaid with a rectangular array of bins whose lower-left corners reside at the locations (XX00,YY00) where XX and YY independently run from 0x00 to 0xFF. Thus, there are 256 bins in each of the vertical and horizontal directions with each bin spanning a square in virtual screen space with side length of 256. Suppose that each memory block is configured to store sample values for up to 16 samples, and that the set of sample values for each sample comprises 4 bytes. In this case, the address of the memory block corresponding to the bin located at (XX00,YY00) may be simply computed by the relation BinAddr=(XX+YY*256)*16*4. For example, the sample SMP=(1C3B, 23A7) resides in the bin located at (1C00,2300). The sample value set for sample SMP is then stored in the memory block residing at address 0x8C700=(0x231C)(0x40) in sample buffer 162.

The bins may tile the 2-D viewport in a regular array, e.g. in a square array, rectangular array, triangular array, hexagonal array, etc., or in an irregular array. Bins may occur in a variety of sizes and shapes. The sizes and shapes may be programmable. The maximum number of samples that may populate a bin is determined by the storage space allocated to the corresponding memory block. This maximum number of samples is referred to herein as the bin sample capacity, or simply, the bin capacity. The bin capacity may take any of a variety of values. The bin capacity value may be programmable. Henceforth, the memory blocks in sample buffer 162 which correspond to the bins in virtual screen space will be referred to as memory bins.

The specific position of each sample within a bin may be determined by looking up the sample's offset in the RAM/ROM table, i.e., the sample's offset with respect to the bin position (e.g. the lower-left corner or center of the bin, etc.). However, depending upon the implementation, not all choices for the bin capacity may have a unique set of offsets stored in the RAM/ROM table. Offsets for a first bin capacity value may be determined by accessing a subset of the offsets stored for a second larger bin capacity value. In one embodiment, each bin capacity value supports at least four different sample positioning schemes. The use of different sample positioning schemes may reduce final image artifacts that would arise in a scheme of naively repeating sample positions.

In one embodiment, sample position memory 354 may store pairs of 8-bit numbers, each pair comprising an x-offset and a y-offset. (Other offsets are also possible, e.g., a time offset, a z-offset, etc. In addition, bit lengths other an eight are contemplated.) When added to a bin position, each pair defines a particular position in virtual screen space, i.e. in 2-D viewport 420. To improve read access times, sample position memory 354 may be constructed in a wide/parallel manner so as to allow the memory to output more than one sample location per read cycle.

Once the sample positions have been read from sample position memory 354, draw process 352 selects the samples that fall within the polygon currently being rendered. Draw process 352 then calculates the z and color information (which may include alpha or other depth of field information values) for each of these samples and stores the data into sample buffer 162. In one embodiment, sample buffer 162 may only single-buffer z values (and perhaps alpha values) while double-buffering other sample components such as color. Unlike prior art systems, graphics system 112 may use double-buffering for all samples (although not all components of samples may be double-buffered, i.e., the samples may have some components that are not double-buffered). In one embodiment, the samples are stored into sample buffer 162 in bins. In some embodiments, the bin capacity may vary from frame to frame. In addition, the bin capacity may vary spatially for bins within a single frame rendered into sample buffer 162. For example, bins on the edge of 2-D viewport 420 may have a smaller bin capacity than bins corresponding to the center of 2-D viewport 420. Since viewers are likely to focus their attention mostly on the center of a displayed image, more processing bandwidth may be dedicated to providing enhanced image quality in the center of 2-D viewport 420. Note that the size and shape of bins may also vary from region to region, or from frame to frame. The use of bins will be described in greater detail below in connection with FIG. 9.

Filter process 360 represents the action of sample-to-pixel calculation units CU in generating digital video streams $X_K$ and $Y_K$ which are transmitted to the next graphics board GB(K+1), or converted into video signals $V_A$ and $V_B$ for presentation to display devices $DD_A$ and $DD_B$. Thus, any description of sample-to-pixel calculation units CU may be interpreted as a description of filter process 360. Filter process 360 operates in parallel with draw process 352.

Generic sample-to-pixel calculation unit CU(J) may be configured to (a) read sample positions from sample position memory 354, (b) read corresponding sample values from sample buffer 162, (c) filter the sample values, and (d) mix (or inject) the resulting pixel values into video stream A or B. Sample-to-pixel calculation unit CU(J) may generate the red, green, blue and alpha values for an output pixel based on a spatial filtering of the corresponding data for a selected plurality of samples, e.g. samples falling in a neighborhood of a pixel center. In one embodiment, sample-to-pixel calculation unit CU(J) may be configured to: (i) determine the distance of each sample from the pixel center; (ii) multiply each sample's attribute values (e.g., red, green, blue, alpha) by a filter weight that is a specific (programmable) function of the sample's distance; (iii) generate sums of the weighted attribute values, one sum per attribute (e.g. a sum for red, a sum for green, . . . ), and (iv) normalize the sums to generate the corresponding pixel attribute values.

In the embodiment just described, the filter kernel is a function of distance from the pixel center. However, in alternative embodiments, the filter kernel may be a more general function of x and y displacements from the pixel center. Also, the support of the filter, i.e. the 2-D neighborhood over which the filter kernel takes non-zero values, may not be a circular disk. Any sample falling within the support of the filter kernel may affect the output pixel value being computed.

Figure 7:
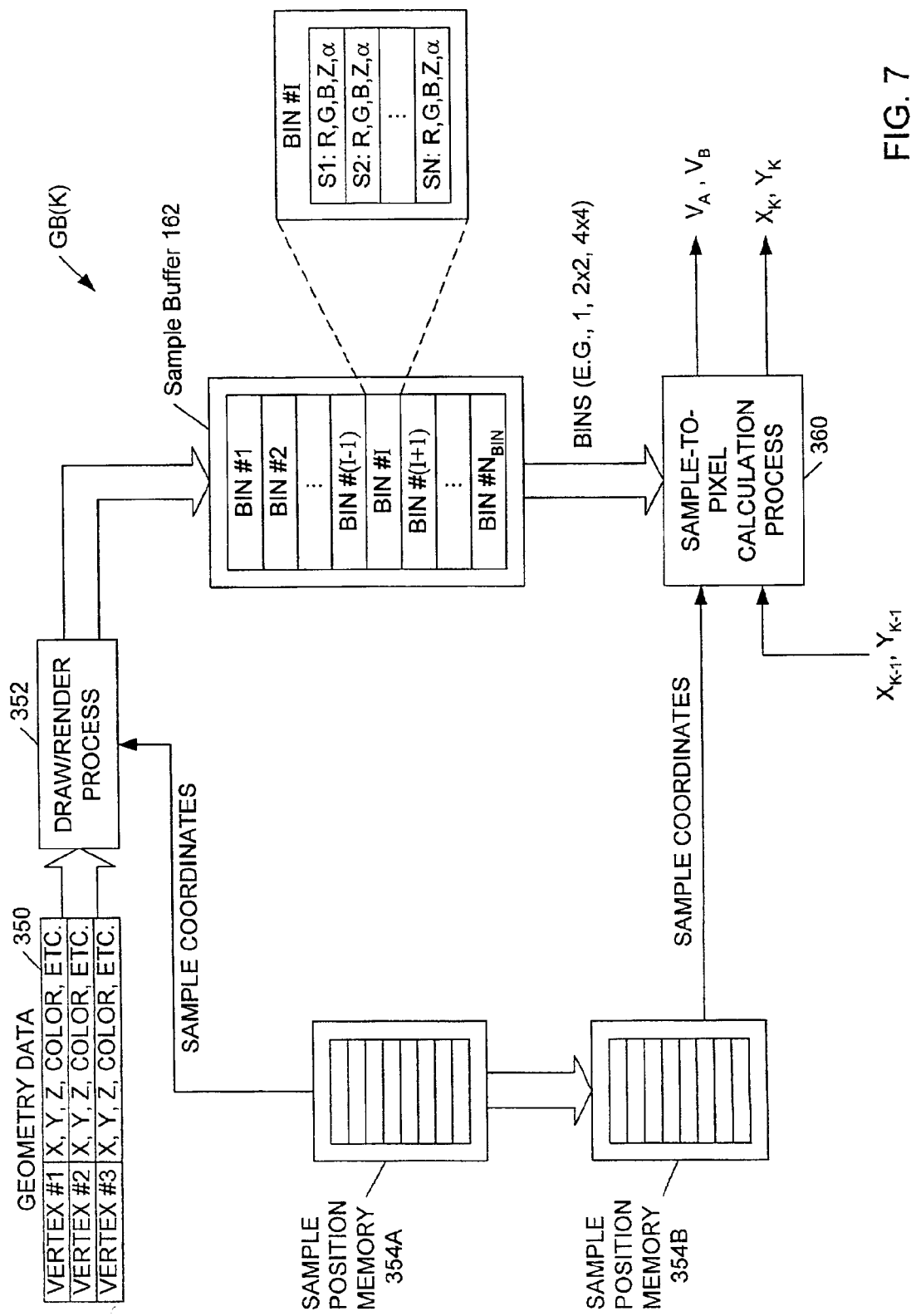
FIG. 7 illustrates a second embodiment for the flow of data through generic graphics board GB(K)

FIG. 7 illustrates an alternate embodiment of data flow through graphics board GB(K). In this embodiment, two or more sample position memories 354A and 354B are utilized. Sample position memories 354A–B may be used to implement double-buffering of sample position data. If the sample positions remain the same from frame to frame, the sample positions may be single-buffered. However, if the sample positions vary from frame to frame, then graphics board GB(K) may be advantageously configured to double-buffer the sample positions. The sample positions may be double-buffered on the rendering side (i.e., memory 354A may be double-buffered) and/or the filter side (i.e., memory 354B may be double-buffered). Other combinations are also possible. For example, memory 354A may be single-buffered, while memory 354B is doubled-buffered. This configuration may allow one side of memory 354B to be updated by draw process 352 while the other side of memory 354B is accessed by filter process 360. In this configuration, graphics board GB(K) may change sample positioning schemes on a per-frame basis by transferring the sample positions (or offsets) from memory 354A to double-buffered memory 354B as each frame is rendered. Thus, the sample positions which are stored in memory 354A and used by draw process 352 to render sample values may be copied to memory 354B for use by filter process 360. Once the sample position information has been copied to memory 354B, position memory 354A may then be loaded with new sample positions (or offsets) to be used for a second frame to be rendered. In this way the sample position information follows the sample values from the draw 352 process to the filter process 360.

Yet another alternative embodiment may store tags with the sample values in super-sampled sample buffer 162. These tags may be used to look-up the offsets (i.e. perturbations) dx and dy associated with each particular sample.

Figure 8A:
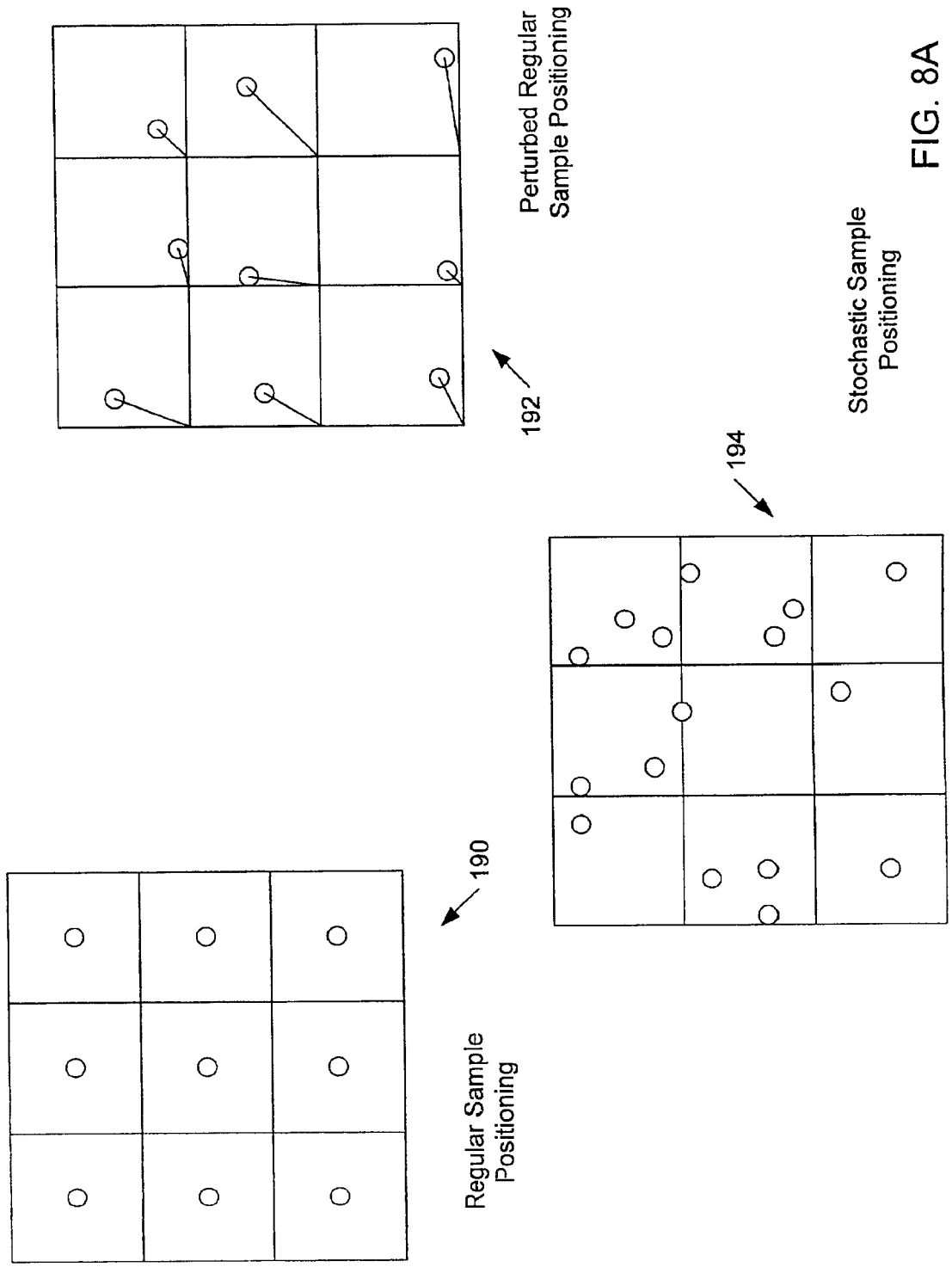
FIG. 8A illustrates a regular sample positioning scheme, a perturbed-regular sample positioning scheme, and a stochastic sample positioning scheme.
Figure 8B:
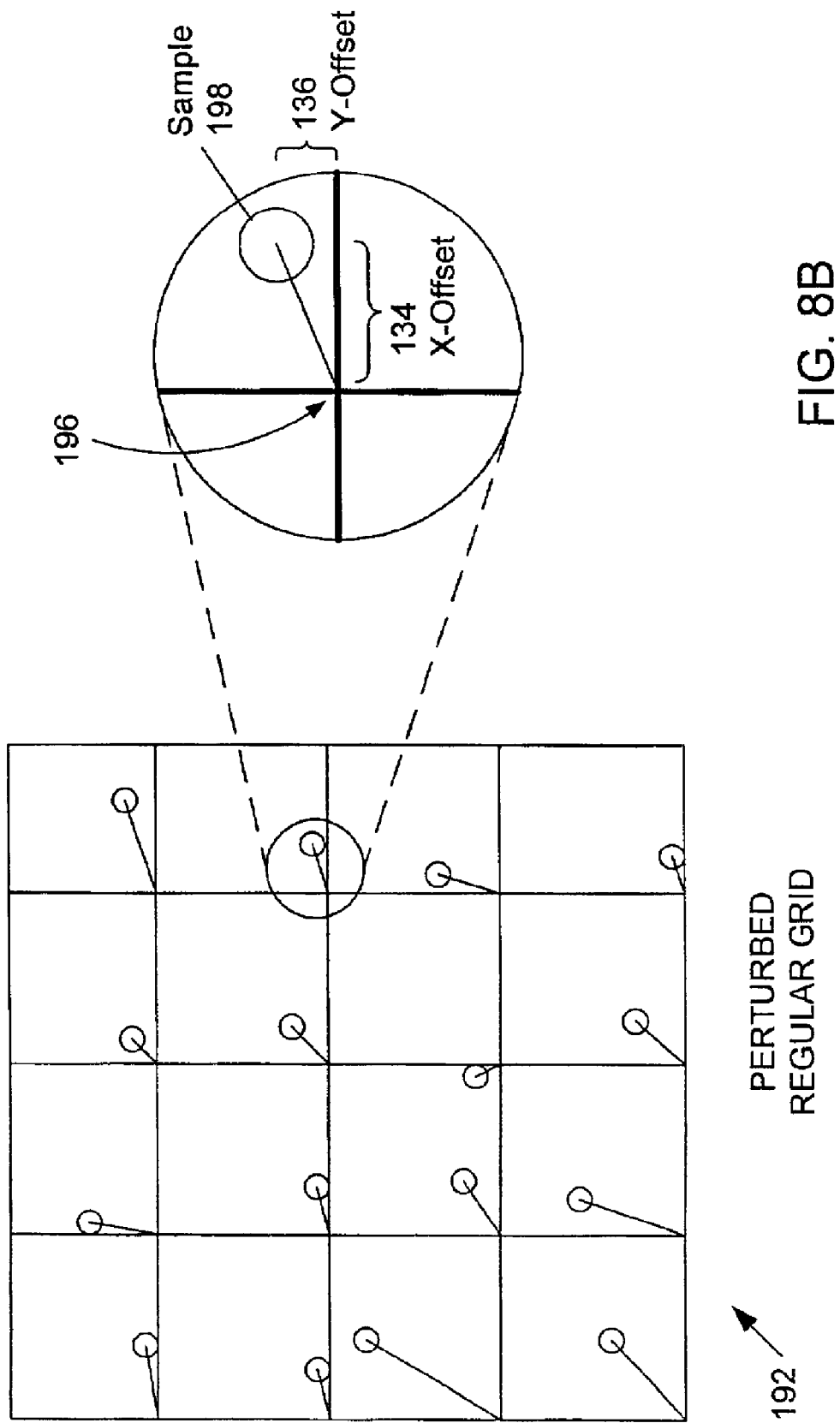
FIG. 8B illustrates details of one embodiment of a perturbed-regular sample positioning scheme.

FIGS. 8A, 8B and 8C: Sample Positioning Schemes

FIG. 8A illustrates a number of different sample positioning schemes. In the regular positioning scheme 190, samples are positioned at fixed positions with respect to a regular grid which is superimposed on the 2-D viewport. For example, samples may be positioned at the center of the rectangles which are generated by the regular grid. More generally, any tiling of the 2-D viewport may generate a regular positioning scheme. For example, the 2-D viewport may be tiled with triangles, and thus, samples may be positioned at the centers (or vertices) of the triangular tiles. Hexagonal tilings, logarithmic tilings, and semi-regular tilings such as Penrose tilings are also contemplated.

In the perturbed regular positioning scheme 192, sample positions are defined in terms of perturbations from a set of fixed positions on a regular grid or tiling. In one embodiment, the samples may be displaced from their corresponding fixed grid positions by random x and y offsets, or by random angles (ranging from 0 to 360 degrees) and random radii (ranging from zero to a maximum radius). The offsets may be generated in a number of ways, e.g. by hardware based upon a small number of seeds, by reading a table of stored offsets, or by using a pseudo-random function. Once again, perturbed regular grid scheme 192 may be based on any type of regular grid or tiling. Samples generated by perturbation with respect to a grid or hexagonal tiling may particularly desirable due to the geometric properties of these configurations.

Stochastic sample positioning scheme 194 represents a third potential type of scheme for positioning samples. Stochastic sample positioning involves randomly distributing the samples across the 2-D viewport. Random positioning of samples may be accomplished through a number of different methods, e.g., using a random number generator such as an internal clock to generate pseudo-random numbers. Random numbers or positions may also be pre-calculated and stored in memory.

Turning now to FIG. 8B, details of one embodiment of perturbed regular positioning scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random x-offset 134 and y-offset 136 may be limited to a particular range of values. For example, the x-offset may be limited to the range from zero to $x_{max}$, where $x_{max}$ is the width of the a grid rectangle. Similarly, the y-offset may be limited to the range from zero to $y_{max}$, where $y_{max}$ is the height of a grid rectangle. The random offset may also be specified by an angle and radius with respect to the grid intersection point 196.

FIG. 8C illustrates details of another embodiment of the perturbed regular grid scheme 192. In this embodiment, the samples are grouped into rectangular bins 138A–D. In this embodiment, each bin comprises nine samples, i.e. has a bin capacity of nine. Different bin capacities may be used in other embodiments (e.g., bins storing four samples, 16 samples, etc.). Each sample's position may be determined by an x-offset and y-offset relative to the origin of the bin in which it resides. The origin of a bin may be chosen to be the lower-left corner of the bin (or any other convenient location within the bin). For example, the position of sample 198 is determined by summing x-offset 124 and y-offset 126 respectively to the x and y coordinates of the origin 132D of bin 138D. As previously noted, this may reduce the size of sample position memory 354 used in some embodiments.

Figure 9:
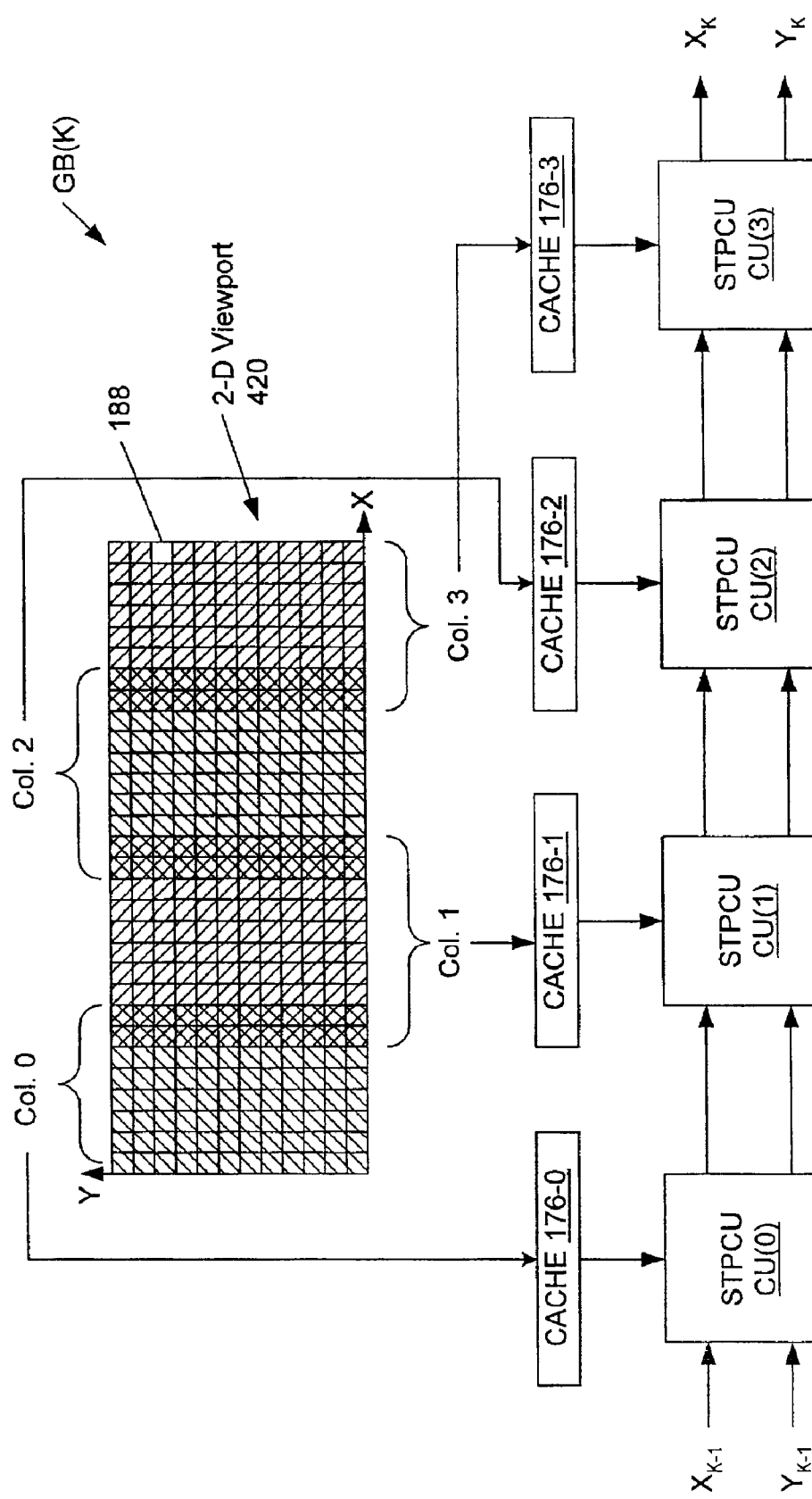
FIG. 9 illustrates one embodiment of a method for filtering sample values to generate pixel values using multiple sample-to-pixel calculation units.

FIG. 9—Converting Samples Into Pixels

As discussed earlier, 2-D viewport 420 may be covered with an array of spatial bins. Each spatial bin may be populated with samples whose positions are determined by sample position memory 354. Each spatial bin corresponds to a memory bin in sample buffer 162. A memory bin stores the sample values (e.g. red, green, blue, z, alpha, etc.) for the samples that reside in the corresponding spatial bin. Sample-to-pixel calculation units CU are configured to read memory bins from sample buffer 162 and to convert sample values contained within the memory bins into pixel values.

FIG. 9 illustrates one embodiment of graphics board GB(K) which provides for rapid computation of pixel values from sample values. The rendering side of graphics board GB(K) is suppressed for simplicity. The spatial bins which cover 2-D viewport 420 may be organized into columns (e.g., Cols. 0, 1, 2, 3). Each column comprises a two-dimensional subarray of spatial bins. The columns may be configured to horizontally overlap (e.g., by one or more spatial bins). Each of sample-to-pixel calculation units CU(0) through CU(3) may be configured to access memory bins corresponding to one of the columns. For example, sample-to-pixel calculation unit CU(1) may be configured to access memory bins that correspond to the spatial bins of Column 1. The data pathways between sample buffer 162 and sample-to-pixel calculations unit CU may be optimized to support this column-wise correspondence.

FIG. 9 shows four sample-to-pixel calculation units for the sake of discussion. However, the inventive principles disclosed in the embodiment of FIG. 9 naturally generalize to any number of sample-to-pixel calculation units.

The amount of the overlap between columns may depend upon the horizontal diameter of the filter support for the filter kernel being used. The example shown in FIG. 9 illustrates an overlap of two bins. Each square (such as square 188) represents a single bin comprising one or more samples. Advantageously, this configuration may allow sample-to-pixel calculation units CU to work independently and in parallel, with each sample-to-pixel calculation units CU(J) receiving and convolving samples residing in the memory bins of the corresponding column. Overlapping the columns will prevent visual bands or other artifacts from appearing at the column boundaries for any operators larger than a pixel in extent.

Furthermore, the embodiment of FIG. 9 may include a plurality of bin caches 176 which couple to sample buffer 162. In addition, each of bin caches 176 couples to a corresponding one of sample-to-pixel calculation units CU. Bin cache 176-I (where I takes any value from zero to three) stores a collection of memory bins from Column I, and serves as a cache for sample-to-pixel calculation unit CU(I). Bin cache 176-I may have an optimized coupling to sample buffer 162 which facilitates access to the memory bins for Column I. Since the convolution calculation for two adjacent convolution centers may involve many of the same memory bins, bin caches 176 may increase the overall access bandwidth to sample buffer 162.

Figure 10A:
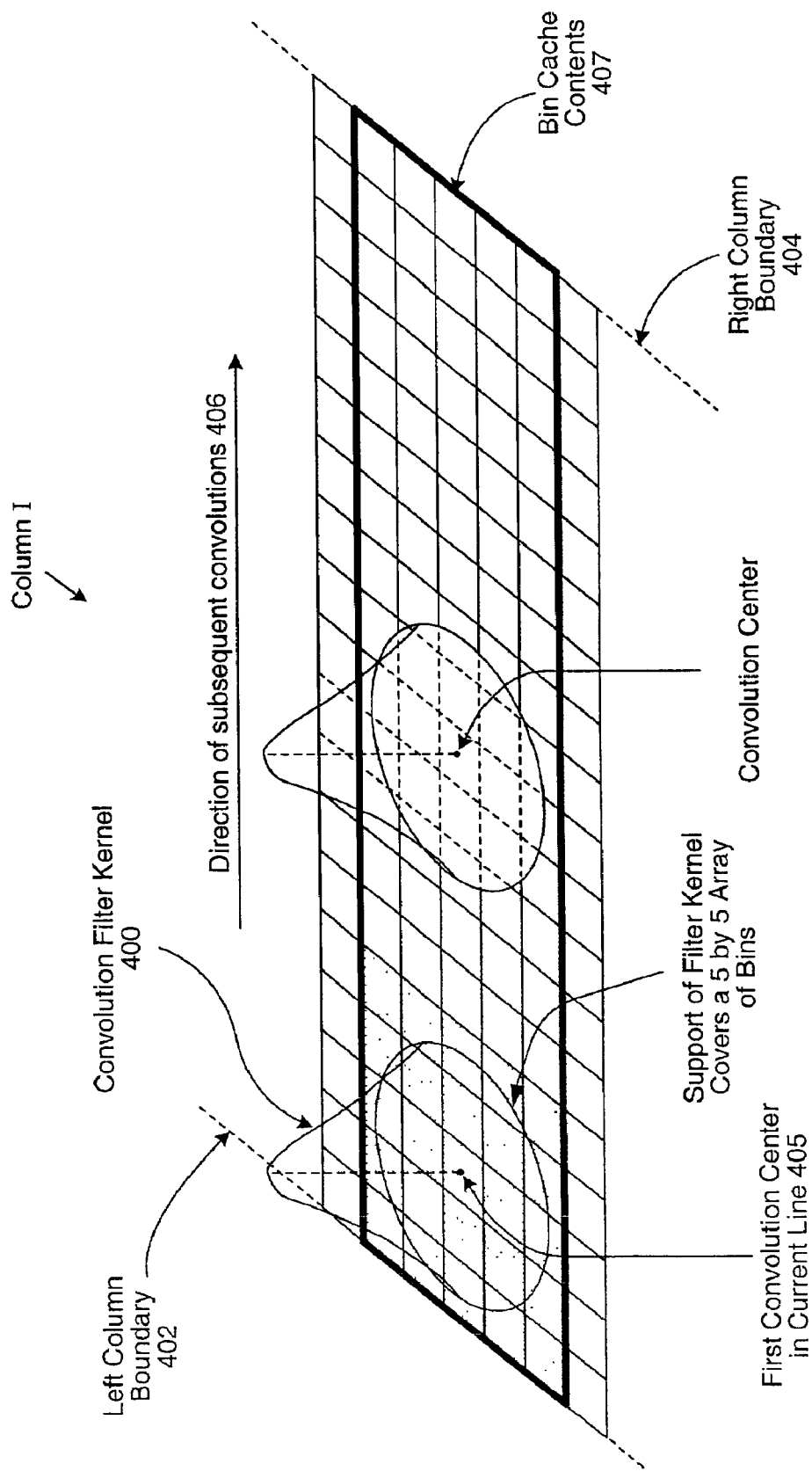
FIG. 10A illustrates one embodiment of the traversal of a filter kernel 400 across a generic Column I of FIG. 9.

FIG. 10A illustrates more details of one embodiment of a method for reading sample values from super-sampled sample buffer 162. As the figure illustrates, the convolution filter kernel 400 travels across Column I (in the direction of arrow 406) to generate output pixel values, where index I takes any value in the range from one to four. Sample-to-pixel calculation unit CU(I) may implement the convolution filter kernel 400. Bin cache 176-I may be used to provide fast access to the memory bins corresponding to Column I. Column I comprises a plurality of bin rows. Each bin row is a horizontal line of spatial bins which stretches from the left column boundary 402 to the right column boundary 404 and spans one bin vertically. In one embodiment, bin cache 176-I has sufficient capacity to store $N_L$ bin rows of memory bins. The cache line-depth parameter $N_L$ may be chosen to accommodate the support of filter kernel 400. If the support of filter kernel 400 is expected to span no more than $N_v$ bins vertically (i.e. in the Y direction), the cache line-depth parameter $N_L$ may be set equal to $N_v$ or larger.

After completing convolution computations at a convolution center, convolution filter kernel 400 shifts to the next convolution center. Kernel 400 may be visualized as proceeding horizontally within Column I in the direction indicated by arrow 406. When kernel 400 reaches the right boundary 404 of Column I, it may shift down one or more bin rows, and then, proceed horizontally starting from the left column boundary 402. Thus the convolution operation proceeds in a scan line fashion, generating successive rows of output pixels for display.

In one embodiment, the cache line-depth parameter $N_L$ is set equal to $N_v+1$. In the example of FIG. 10A, the filter support covers $N_v=5$ bins vertically. Thus, the cache line-depth parameter $N_L=6=5+1$. The additional bin row in bin cache 176-I allows the processing of memory bins (accessed from bin cache 176-I) to be more substantially out of synchronization with the loading of memory bins (into bin cache 176-I) than if the cache line-depth parameter $N_L$ were set at the theoretical minimum value $N_v$.

In one embodiment, sample buffer 162 and bin cache 176-I may be configured for row-oriented burst transfers. If a request for a memory bin misses in bin cache 176-I, the entire bin row containing the requested memory bin may be fetched from sample buffer 162 in a burst transfer. Thus, the first convolution of a scan line may fill the bin cache 176-I with all the memory bins necessary for all subsequent convolutions in the scan line. For example, in performing the first convolution in the current scan line at the first convolution center 405, sample-to-pixel calculation unit CU(I) may assert a series of requests for memory bins, i.e. for the memory bins corresponding to those spatial bins (rendered in shade) which intersect the support of filter kernel 400. Because the filter support 400 intersects five bin rows, in a worst case scenario, five of these memory bin requests will miss bin cache 176-I and induce loading of all five bin rows from sample buffer 162. Thus, after the first convolution of the current scan line is complete, bin cache 176-I may contain the memory bins indicated by the heavily outlined rectangle 407. Memory bin requests asserted by all subsequent convolutions in the current scan line may hit in bin cache 176-I, and thus, may experience significantly decreased bin access time.

In general, the first convolution in a given scan line may experience fewer than the worst case number of misses to bin cache 176-I because bin cache 176-I may already contain some or all of the bin rows necessary for the current scan line. For example, if convolution centers are located at the center of each spatial bin, the vertical distance between successive scan lines (of convolution centers) corresponds to the distance between successive bin rows, and thus, the first convolution of a scan line may induce loading of a single bin row, the remaining four bin rows having already been loaded in bin cache 176-I in response to convolutions in previous scan lines.

If the successive convolution centers in a scan line are expected to depart from a purely horizontal trajectory across Column I, the cache line-depth parameter $N_L$ may be set to accommodate the maximum expected vertical deviation of the convolution centers. For example, in FIG. 10B, the convolution centers follow a curved path across Column I. The curved path deviates from a horizontal path by approximately two bins vertically. Since the support of the filter kernel covers a 3 by 3 array of spatial bins, bin cache 176-I may advantageously have a cache line-depth $N_L$ of at least five (i.e. two plus three).

As mentioned above, Columns 0 through 3 of 2-D viewport 420 may be configured to overlap horizontally. The size of the overlap between adjacent Columns may be configured to accommodate the maximum expected horizontal deviation of convolution centers from nominal convolution centers on a rectangular grid.

Figure 11:
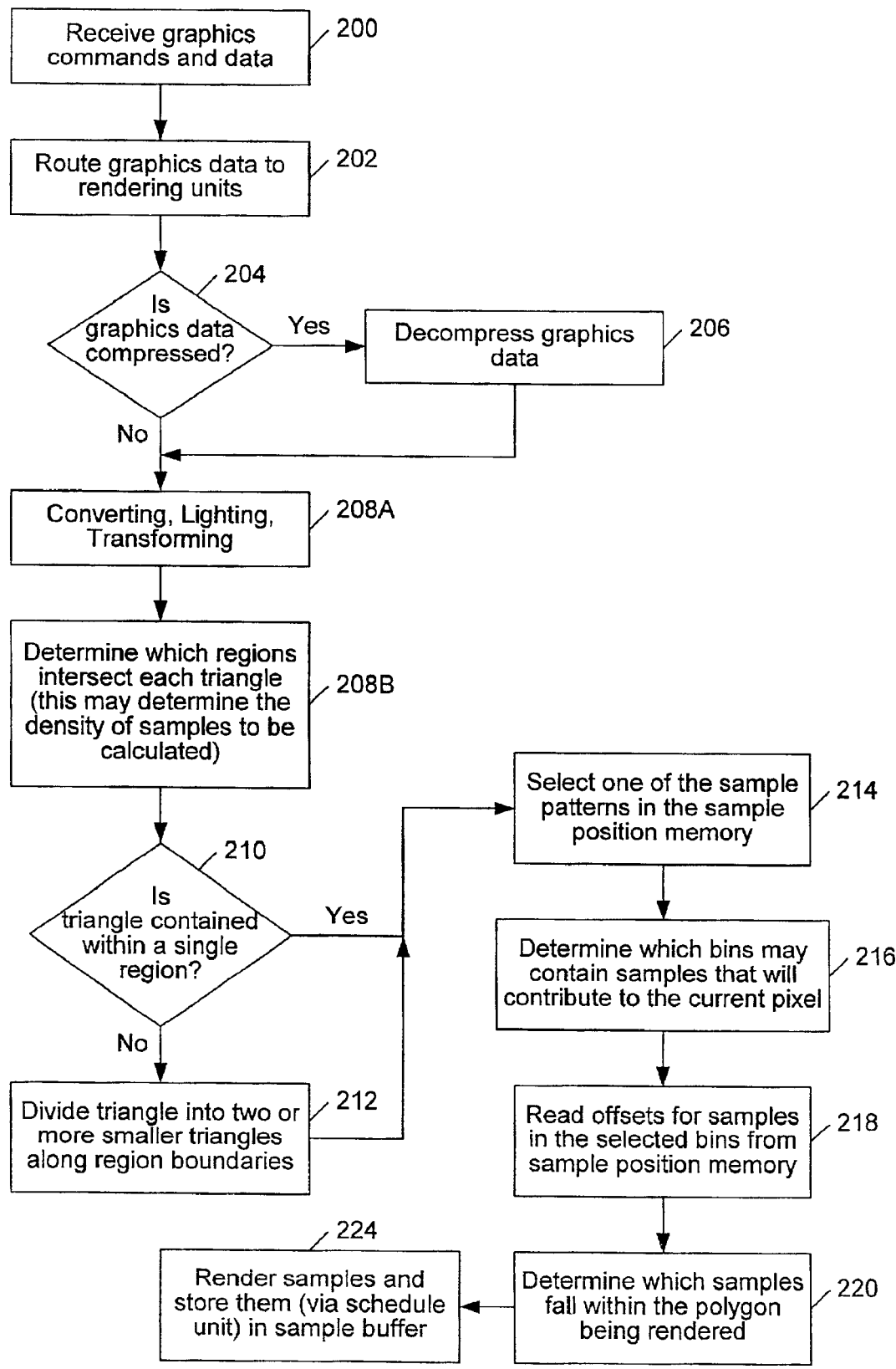
FIG. 11 illustrates one embodiment of a method for drawing samples into a super-sampled sample buffer.

FIG. 11—Rendering Samples Into a Super-Sampled Sample Buffer

FIG. 10 is a flowchart of one embodiment of a method for drawing or rendering samples into a super-sampled sample buffer. Certain of the steps of FIG. 11 may occur concurrently or in different orders. In step 200, graphics board GB(K) receives graphics commands and graphics data from the host CPU 102 or directly from system memory 106. In step 202, the graphics instructions and data are routed to one or more of rendering units 150A–D. In step 204, rendering units 150A–D determine if the graphics data is compressed. If the graphics data is compressed, rendering units 150A–D decompress the graphics data into a useable format, e.g., triangles, as shown in step 206. Next, the triangles are processed and converted to an appropriate space for lighting and clipping prior to the perspective divide and transform to screen space (as indicated in step 208A).

If graphics board GB(K) implements variable resolution super-sampling, then the triangles are compared with a set of sample-density region boundaries (step 208B). In variable-resolution super-sampling, different regions of 2-D viewport 420 may be allocated different sample densities based upon a number of factors (e.g., the center of the attention of an observer as determined by eye or head tracking). If the triangle crosses a sample-density region boundary (step 210), then the triangle may be divided into two smaller polygons along the region boundary (step 212). The polygons may be further subdivided into triangles if necessary (since the generic slicing of a triangle gives a triangle and a quadrilateral). Thus, each newly formed triangle may be assigned a single sample density. In one embodiment, graphics board GB(K) may be configured to render the original triangle twice, i.e. once with each sample density, and then, to clip the two versions to fit into the two respective sample density regions.

In step 214, one of the sample positioning schemes (e.g., regular, perturbed regular, or stochastic) is selected from sample position memory 354. The sample positioning scheme will generally have been pre-programmed into the sample position memory 354, but may also be selected "on the fly". In step 216, rendering units 150A–D may determine which spatial bins contain samples located within the triangle's boundaries, based upon the selected sample positioning scheme and the size and shape of the spatial bins. In step 218, the offsets dx and dy for the samples within these spatial bins are then read from sample position memory 354. In step 220, each sample's position is then calculated using the offsets dx and dy and the coordinates of the corresponding bin origin, and is compared with the triangle's edges to determine if the sample is within the triangle.

For each sample that is determined to be within the triangle, one of rendering unit 150A–D draws the sample by calculating the sample's color, alpha and other attributes. This may involve a lighting calculation and an interpolation based upon the color and texture map information associated with the vertices of the triangle. Once the sample is rendered, it may be forwarded to schedule unit 154, which then stores the sample in sample buffer 162 (as indicated in step 224).

Note the embodiment of the rendering method described above is used for explanatory purposes only and is not meant to be limiting. For example, in some embodiments, the steps shown in FIG. 11 as occurring serially may be implemented in parallel. Furthermore, some steps may be reduced or eliminated in certain embodiments of the graphics system (e.g., steps 204–206 in embodiments that do not implement geometry compression, or steps 210–212 in embodiments that do not implement a variable resolution super-sampled sample buffer).

Figure 12:
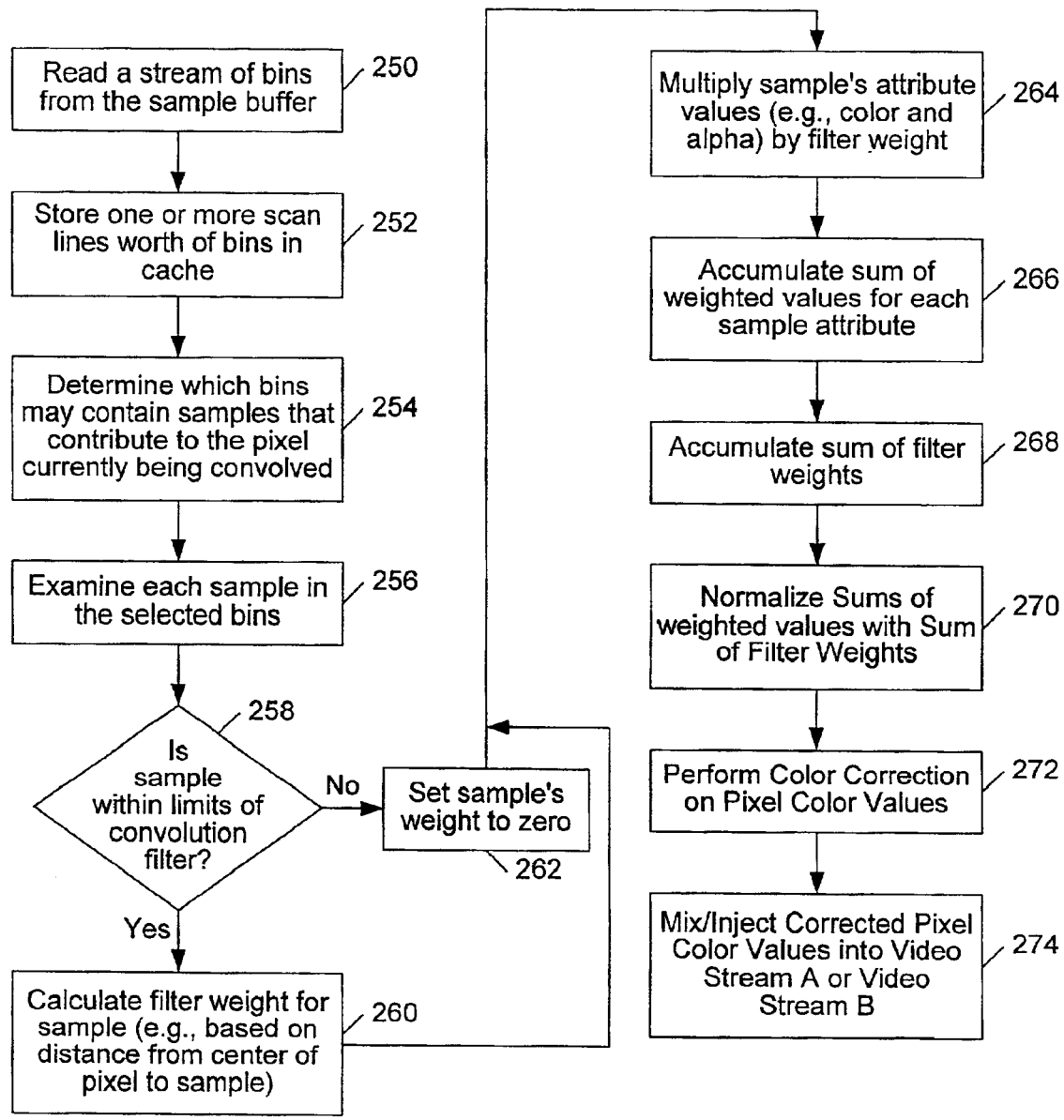
FIG. 12 illustrates one embodiment of a method for calculating pixel values from sample values.

FIG. 12—Generating Output Pixel Values from Sample Values

FIG. 12 is a flowchart of one embodiment of a method for selecting and filtering samples stored in super-sampled sample buffer 162 to generate output pixel values. In step 250, a stream of memory bins are read from the super-sampled sample buffer 162. In step 252, these memory bins may be stored in one or more of bin caches 176 to allow sample-to-pixel calculation units CU easy access to sample values during the convolution operation. In step 254, the memory bins are examined to determine which of the memory bins may contain samples that contribute to the output pixel value currently being generated. The support (i.e. footprint) of the filter kernel 400 (see FIG. 10A) intersects a collection of spatial bins. The memory bins corresponding to these spatial bins may contain sample values that contribute to the current output pixel.

Each sample in the selected bins (i.e. bins that have been identified in step 254) is then individually examined to determine if the sample does indeed contribute (as indicated in steps 256–258) to the current output pixel. This determination may be based upon the distance of the sample from the filter center.

In one embodiment, sample-to-pixel calculation units CU may be configured to calculate this sample distance (i.e., the distance of the sample from the filter center) and then use it to index into a table storing filter weight values (as indicated in step 260). In another embodiment, however, the potentially expensive calculation for determining the distance from the center of the pixel to the sample (which typically involves a square root function) may be avoided by using distance squared to index into the table of filter weights. In one embodiment, this squared-distance indexing scheme may be facilitated by using a floating point format for the distance (e.g., four or five bits of mantissa and three bits of exponent), thereby allowing much of the accuracy to be maintained while compensating for the increased range in values. In one embodiment, the table of filter weights may be implemented in ROM. However, RAM tables may also be used. Advantageously, RAM tables may, in some embodiments, allow sample-to-pixel calculation unit CU(J) to vary the filter coefficients on a per-frame or per-session basis. For example, the filter coefficients may be varied to compensate for known shortcomings of the display devices or for the user's personal preferences.

The filter coefficients may also vary as a function of filter center position within the 2-D viewport 420, or on a per-output pixel basis. In one embodiment, specialized hardware (e.g., multipliers and adders) may be used to compute filter weights for each sample. Samples which fall outside the support of filter kernel 400 may be assigned a filter weight of zero (step 262), or they may be removed from the calculation entirely.

In one alternative embodiment, the filter kernel may not be expressible as a function of distance with respect to the filter center. For example, a pyramidal tent filter is not expressible as a function of distance from the filter center. Thus, filter weights may be tabulated (or computed) in terms of x and y sample-displacements with respect to the filter center.

Once the filter weight for a sample has been determined, the attribute values (e.g. red, green, blue, alpha, etc.) for the sample may then be multiplied by the filter weight (as indicated in step 264). Each of the weighted attribute values may then be added to a corresponding cumulative sum—one cumulative sum for each attribute—as indicated in step 266. The filter weight itself may be added to a cumulative sum of filter weights (as indicated in step 268). Step 268 may be performed in parallel with step 264 and/or 266.

After all samples residing in the support of the filter have been processed, the cumulative sums of the weighted attribute values may be divided by the cumulative sum of filter weights (as indicated in step 270) to generate pixel attributes values including pixel color values. It is noted that the number of samples which fall within the filter support may vary as the filter center moves within the 2-D viewport. The normalization step 270 compensates for the variable gain which is introduced by this nonuniformity in the number of included samples, and thus, prevents the computed pixel color values from appearing too bright or too dark due to the sample number variation.

In step 272, the pixel color values may be modified to compensate for errors in color presentation. For example, the color presented by display devices $DD_A$ and/or $DD_B$ may have an non-uniform appearance because of non-uniformities in (a) the color filters of the display devices, (b) the ambient light illuminating the display/projection screen (s), (c) the color and/or material properties of the display/projection screen(s), etc. In step 274, the corrected pixel color values may be gamma corrected, and mixed (or injected) into video stream A or video stream B.

FIG. 13—Example Output Pixel Convolution

FIG. 13 illustrates a simplified example of an output pixel convolution with a filter kernel which is radially symmetric and piecewise constant. As the figure shows, four bins 288A–D contain samples that may possibly contribute to the output pixel convolution. In this example, the center of the output pixel is located at the shared corner of bins 288A–288D. Each bin comprises sixteen samples, and an array of four bins (2×2) is filtered to generate the attribute values (red, green, blue, alpha) for the output pixel. Since the filter kernel is radially symmetric, the distance of each sample from the pixel center determines the filter value which will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter radius, and thus receives a filter value of 0. Thus, sample 290 will not contribute to the computed attribute values for the output pixel. Because the filter kernel is a decreasing function of distance from the pixel center, samples close to the pixel center contribute more to the computed attribute values than samples farther from the pixel center. This type of filtering may be used to perform image smoothing or anti-aliasing.

Example attribute values for samples 290–296 are illustrated in boxes 300–306. In this example, each sample comprises red, green, blue and alpha values, in addition to the sample's positional data. Block 310 illustrates the calculation of each pixel attribute value prior to normalization. As previously noted, the filter values may be summed to obtain a normalization value 308. Normalization value 308 is used to divide out the unwanted gain arising from the non-constancy of the number of samples captured by the filter support. Block 312 illustrates the normalization process and the final normalized pixel attribute values.

The filter presented in FIG. 13 has been chosen for descriptive purposes only and is not meant to be limiting. A wide variety of filters may be used for pixel value computations depending upon the desired filtering effect(s). It is a well known fact that the sinc filter realizes an ideal band-pass filter. However, the sinc filter takes non-zero values over the whole of the x-y plane. Thus, various windowed approximations of the sinc filter have been developed. Some of these approximations such as the cone filter or Gaussian filter approximate only the central lobe of the sinc filter, and thus, achieve a smoothing effect on the sampled image. Better approximations such as the Mitchell-Netravali filter (including the Catmull-Romm filter as a special case) are obtained by approximating some of the negative lobes and positive lobes which surround the central positive lobe of the sinc filter. The negative lobes allow a filter to more effectively retain spatial frequencies up to the cutoff frequency and reject spatial frequencies beyond the cutoff frequency. A negative lobe is a portion of a filter where the filter values are negative. Thus, some of the samples residing in the support of a filter may be assigned negative filter values (i.e. filter weights).

A wide variety of filters may be used for the pixel value convolutions including filters such as a box filter, a tent filter, a cylinder filter, a cone filter, a Gaussian filter, a Catmull-Rom filter, a Mitchell-Netravali filter, any windowed approximation of a sinc filter, etc. Furthermore, the support of the filters used for the pixel value convolutions may be circular, elliptical, rectangular (e.g. square), triangular, hexagonal, etc.

The piecewise constant filter function shown in FIG. 13 with four constant regions is not meant to be limiting. For example, in one embodiment the convolution filter may have a large number of regions each with an assigned filter value (which may be positive, negative and/or zero). In another embodiment, the convolution filter may be a continuous function that is evaluated for each sample based on the sample's distance (or x and y displacements) from the pixel center. Also note that floating point values may be used for increased precision.

Color Correction System and Method

As described above, display devices generate color by mixing varying amounts of Q fundamental colors. Various sets of fundamental colors are contemplated. However, typically, Q equals three and the fundamental colors are red, green and blue. Thus, a first pixel light beam radiated to an observer's eye may comprise a red component beam, a green component beam and a blue component beam having power spectra $f_1(\lambda)$, $f_2(\lambda)$ and $f_3(\lambda)$ respectively. Therefore, the power spectrum $f_\gamma(\lambda)$ of the first pixel beam may be a linear combination of the three color component spectra:

$$F_\gamma(\lambda) = \sum_{i=1}^{3} \gamma_i \cdot f_i(\lambda), \quad (1)$$

where the scalar values $\gamma_1$, $\gamma_2$ and $\gamma_3$ control the relative amounts of red, green and blue respectively which are combined in the first pixel light beam. Let $\gamma$ denote the vector whose components are the scalar values $\gamma_1$, $\gamma_2$ and $\gamma_3$, i.e.

$$\gamma = [\gamma_1, \gamma_2, \gamma_3]^t.$$

The superscript t denotes vector transpose. The vector $\gamma$ may be referred to herein as the color intensity vector.

Let $g_1(\lambda)$, $g_2(\lambda)$ and $g_3(\lambda)$ represent the red, green and blue spectral response curves for a human eye. According to one model, the human brain perceives a color in response to the pixel power spectrum $F_\gamma(\lambda)$ based on the three numbers $$G_1 = \int g_1(\lambda) \cdot F_\gamma(\lambda) d\lambda, \quad (2A)$$

$$G_2 = \int g_2(\lambda) \cdot F_\gamma(\lambda) d\lambda, \quad (2B)$$

$$G_3 = \int g_3(\lambda) \cdot F_\gamma(\lambda) d\lambda, \quad (2C)$$

where the integrals are evaluated over the range of visible wavelengths. In other words, the vector $G = [G_1, G_2, G_3]^t$ determines the perceived color. The vector G is referred to herein as the first perceptual color vector.=

Suppose that a second pixel light beam radiated to the observer's eye has color component power spectra $\hat{f}_1(\lambda)$, $\hat{f}_2(\lambda)$ and $\hat{f}_3(\lambda)$ respectively. Thus, the power spectrum for the second pixel beam is given by $$\hat{F}_{\hat{\gamma}}(\lambda) = \sum_{i=1}^{3} \hat{\gamma}_i \cdot \hat{f}_i(\lambda), \quad (3)$$

where scalar values $\hat{\gamma}_1$, $\hat{\gamma}_2$ and $\hat{\gamma}_3$ control the amount of red, green and blue which are mixed to form the second pixel light beam. The second pixel light beam induces a second perceptual color vector $\hat{G} = [\hat{G}_1, \hat{G}_2, \hat{G}_3]^t$ given by $$\hat{G}_1 = \int g_1(\lambda) \cdot \hat{F}_{\hat{\gamma}}(\lambda) d\lambda, \quad (4A)$$

$$\hat{G}_2 = \int g_2(\lambda) \cdot \hat{F}_{\hat{\gamma}}(\lambda) d\lambda, \quad (4B)$$

$$\hat{G}_3 = \int g_1(\lambda) \cdot \hat{F}_{\hat{\gamma}}(\lambda) d\lambda, \quad (4C)$$

The first pixel light beam and second pixel light beam may induce the same perceived color in the observer when the first and second perceptual color vectors are equal (or approximately equal), i.e.

$$G_j = \hat{G}_j \quad (5)$$

$$\Leftrightarrow \int g_j \sum_{i=1}^{3} \gamma_i f_i = \int g_j \sum_{i=1}^{3} \hat{\gamma}_i \hat{f}_i \quad (6)$$

$$\Leftrightarrow \sum_{i=1}^{3} \gamma_i \int g_j f_i = \sum_{i=1}^{3} \hat{\gamma}_i \int g_j \hat{f}_i \quad (7)$$

for j=1,2,3. Defining $$L_{i,j} = \int g_j f_i d\lambda \text{ and} \quad (8)$$

$$M_{i,j} = \int g_j \hat{f}_i d\lambda \quad (9)$$

as components of the 3×3 square matrices L and M respectively, linear system (7) may be expressed as a matrix-vector equation:

$$L\gamma = M\hat{\gamma}. \quad (10)$$

Solving for the second color intensity vector in terms of the first color intensity vector gives $$\hat{\gamma} = M^{-1} L \gamma \quad (11)$$

where the superscript −1 denotes matrix inversion. The matrix L may be referred to as the unperturbed perceptual matrix. The matrix M may be referred to as the perturbed perceptual matrix.

The first pixel light beam may represent a theoretical standard, i.e. the color component power spectra $f_1(\lambda)$, $f_2(\lambda)$ and $f_3(\lambda)$ of the first light beam may be interpreted as ideal power spectra generated by an ideal display device. For example, the color component power spectra $f_1(\lambda)$, $f_2(\lambda)$ and $f_3(\lambda)$ may be assumed to be equal to industry standardized spectra for red, green and blue respectively. In contrast, the second pixel light beam may be the energy radiated by a given pixel of an actual display device coupled to graphics system 112. The color component power spectra $\hat{f}_1(\lambda)$, $\hat{f}_2(\lambda)$ and $\hat{f}_3(\lambda)$ of the second light beam may be measured with an appropriate spectrum sensing device such as a spectroradiometer. Thus, equation (11) may be interpreted as an explanation of how to generate a desired color perception with the actual display device. A sample-to-pixel calculation unit in graphics system 112 may compute an initial color, i.e. initial color intensity vector $\gamma = [\gamma_1, \gamma_2, \gamma_3]^T$, for the given pixel, and may apply the correction indicated by equation (11) to compute a corrected color intensity vector $\hat{\gamma}$ which is then provided to the actual display device (e.g. embedded in an analog video signal). In response to the corrected color intensity vector, the actual display device generates the second pixel light beam at the given pixel. Because of the color correction applied by the sample-to-pixel calculation unit, the second pixel light beam radiated from the given pixel induces the same (or approximately the same) color perception as would the first "ideal" pixel light beam generated by an ideal display device driven with the initial color vector γ.

The actual color component power spectra $\hat{f}_1(\lambda)$, $\hat{f}_2(\lambda)$ $\hat{f}_3(\lambda)$ radiated by the given pixel may be measured, and used to compute perturbed perceptual matrix M. The ideal color component power spectra may be used to compute the unperturbed perceptual matrix L. The matrix product $P = M^{-1} L$ may be computed and stored in a memory accessible to the sample-to-pixel calculation unit. The sample-to-pixel calculation unit may compute the corrected color intensity vector $\hat{\gamma}$ by performing the matrix-vector multiplication $P\gamma$ in real-time. The matrix P is referred to herein as the correction matrix. The sample-to-pixel calculation unit may comprise dedicated logic (e.g. a network of multipliers and adders) or a generic programmable processor (e.g. a DSP core) to perform the matrix-vector multiplication.

Alternatively, the first pixel light beam may also be interpreted as the light beam generated by an actual display device. Thus, the color component power spectra $f_1(\lambda)$, $f_2(\lambda)$ and $f_3(\lambda)$ of the first light beam may also be measured spectra. In this case, equation (11) may be interpreted as an explanation of how to generate a consistent color perception between the first light beam and second light beam.

In general, a display device generates a pixel array on a display surface such as projection screen SCR or the display screen of a CRT or LCD display. For the sake of discussion, suppose that the pixel array is parameterized by a horizontal pixel index I and a vertical pixel index J. The sample-to-pixel calculation unit(s) assigned to the display device may apply a per-pixel color correction for the pixel array. For each pixel (I,J) in the pixel array, a corresponding correction matrix P(I,J) may be used to perform color correction. In other words, after computing a color intensity vector γ for pixel (I,J), a sample-to-pixel calculation unit may multiply the color intensity vector γ by the corresponding color correction matrix P(I,J) to determine a corrected color intensity vector $\hat{\gamma}$. The corrected color intensity vector may then be transmitted to the display device. Because of the per-pixel color correction, color images presented through the display device may be more consistent and true to some standardized color.

In one embodiment, the measurement of color component spectra $\hat{f}_1(\lambda)$, $\hat{f}_2(\lambda)$ and $\hat{f}_3(\lambda)$ and computation of correction matrix P may be performed at the four corners of the pixel array. These four corner correction matrices may be transmitted to and stored in the sample-to-pixel calculation unit(s) assigned to the display device. A sample-to-pixel calculation unit may interpolate correction matrix P(I,J) for each pixel (I,J) from the four corner correction matrices. The interpolation may be performed in real-time. Sample-to-pixel calculation units may include dedicated hardware (such as multipliers, adders, etc.) to speed the interpolation computation.

Figure 14:
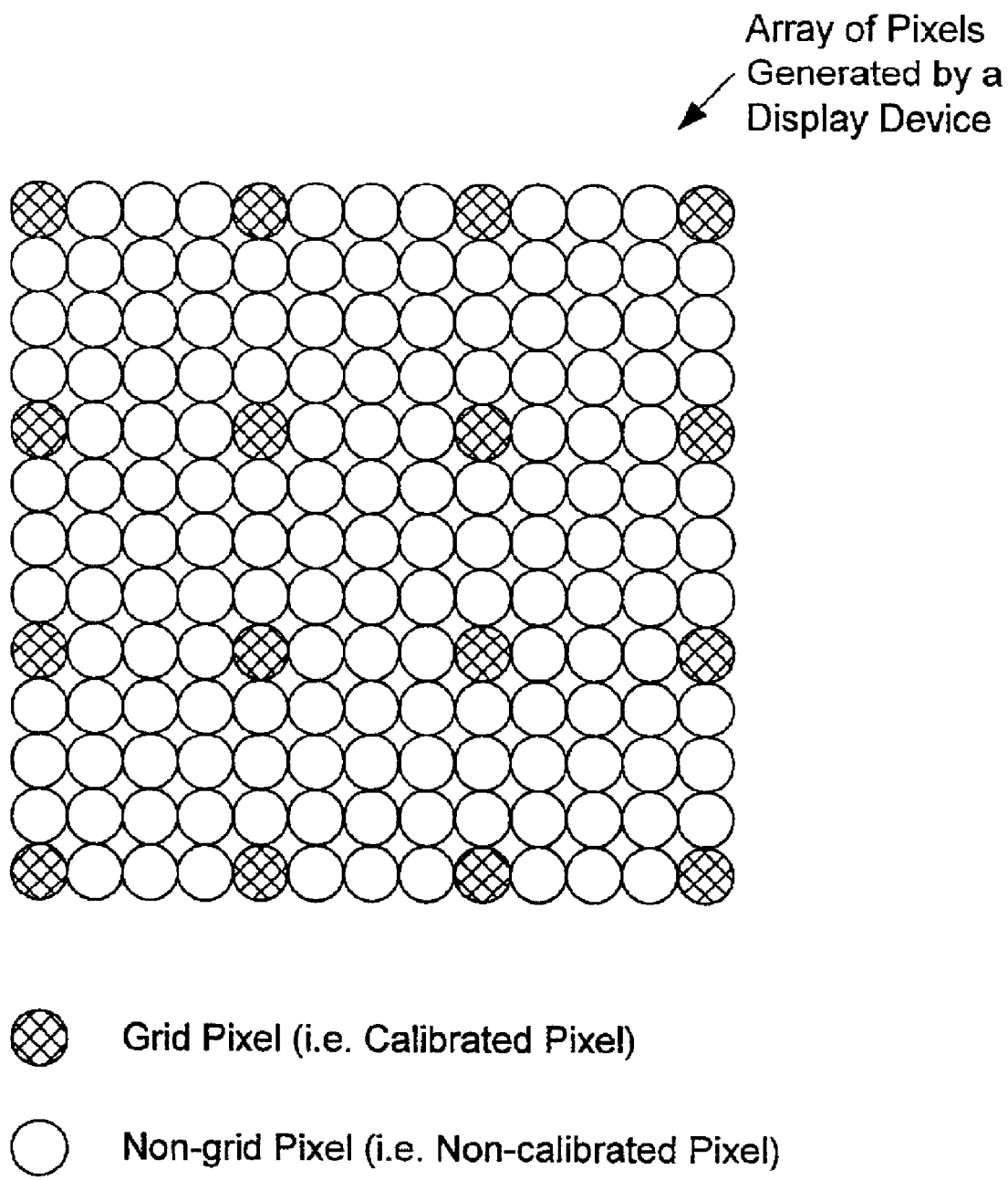
FIG. 14 illustrates a pixel array generated by a display device with a subset of the pixels (referred to herein as grid pixels and denoted in cross hatch) being designated for color component spectrum measurements.

In a second embodiment, the measurement of color component spectra $\hat{f}_1(\lambda)$, $\hat{f}_2(\lambda)$ and $\hat{f}_3(\lambda)$ and computation of correction matrix P may be performed for each pixel in a grid which covers (i.e. spans) the pixel array. For example, FIG. 14 shows a grid of pixels in a pixel array. The grid pixels are shown in cross hatch. Each sample-to-pixel calculation unit assigned to the display device may store the correction matrices P for at least a portion of the grid pixels. For example, each sample-to-pixel calculation unit may be assigned a rectangular section of the pixel array, and thus, may store the correction matrices for that portion of the pixel grid which covers the rectangular section.

A sample-to-pixel calculation unit may interpolate a correction matrix P(I,J) for a pixel (I,J) based on the correction matrices at nearest neighbor grid pixels. The interpolation may be performed in real-time. It is noted that the four-by-four pixel grid size of FIG. 14 is not meant to be limiting. The pixel grid may have any number NR of grid rows and any number NC of grid columns.

In one embodiment, the number NR of grid rows and the number NC of grid columns may be chosen based on the spatial rate of change of the color component spectra $\hat{f}_1(\lambda)$, $\hat{f}_2(\lambda)$ and $\hat{f}_3(\lambda)$ across the pixel array. Large values for NR and/or NC may be required when the spatial rate of change of the color component spectra is large. In one embodiment, NC=NR=16.

If the color component power spectra $\hat{f}_1(\lambda)$, $\hat{f}_2(\lambda)$ and $\hat{f}_3(\lambda)$ of pixels do not change substantially across the pixel array, one set of color component power spectra $\hat{f}_1(\lambda)$, $\hat{f}_2(\lambda)$ and $\hat{f}_3(\lambda)$ may be used to characterize the whole pixel array or any portion thereof. For example, the color component power spectra for one particular pixel (e.g. a pixel centrally located in the pixel array) may be used as the characterizing set. Alternatively, the color component spectra for a collection of pixels may be averaged to obtain a characterizing set. For example, the corresponding color component power spectra for the four corner pixels of the pixel array may be averaged. The correction matrix $P=M^{-1}L$ computed from the characterizing set based on equations (8) and (9) may be used to correct every pixel (I,J) of the pixel array (or pixels in some subset of the pixel array). In other words, the sample-to-pixel calculation unit(s) assigned to the display device may use the same correction matrix P to correct pixel color values for each pixel (I,J) in the pixel array (or some subset of the pixel array).

As mentioned above, graphics system 112 may be used with a plurality of display devices $DD_1$, through $DD_H$. Because there may be noticeable differences in color presentation between distinct display devices (even when they are of the same model and from the same manufacturer), the above process of measuring color component spectra $\hat{f}_1(\lambda)$, $\hat{f}_2(\lambda)$ and $\hat{f}_3(\lambda)$ and computing correction matrices P on a pixel grid may be repeated for each display device to be used with graphics system 112. A group of one or more sample-to-pixel calculation units may be assigned to each of the display devices $DD_1$, through $DD_H$. Each group performs color correction as described above for the corresponding display device.

In order to correct for time variation in color presentation, the above process for estimating a grid of correction matrices for a display device at a particular time (or in a particular time interval) may be repeated periodically or intermittently, or in response to user request.

It is noted that the model of color perception suggested by expressions (2A), (2B) and (2C) may be replaced by or augmented with any desired color perception model. In general, a color perception model may be interpreted as a method for mapping an arbitrary power spectrum for a light beam to a space of perceived colors. Thus, given a color intensity vector γ, the color perception model specifies a perceived color $C(F_\gamma)$ generated by the first pixel spectrum $$F_\gamma(\lambda) = \sum_{i=1}^{3} \gamma_i \cdot f_i(\lambda)$$

of the first light beam. Similarly, the color perception model also specifies the perceived color $C(\hat{F}_v)$ generated by the second pixel spectrum $$\hat{F}_v(\lambda) = \sum_{i=1}^{3} v_i \cdot \hat{f}_i(\lambda)$$

of the second light beam in response to color intensity vector v. For optimal color correction, it is desirable to choose a color intensity vector $v=\hat{\gamma}$ which minimizes the difference between the ideal color $C(F_\gamma)$ and the actual color $C(\hat{F}_v)$. An optimal color correction transformation for a given pixel maps an arbitrary color intensity vector γ to the corresponding minimizing vector $\hat{\gamma}$.

As described above, graphics system 112 may comprise one or more graphics boards which generate video signals for display devices $DD_1$, through $DD_H$ in response to graphics data received from system bus 104. In the preferred embodiment, the sample-to-pixel calculation units CU comprised within the one or more graphics boards are configured to modify pixel color values (e.g. red, green and blue color values) to compensate for errors in the color presented by the display devices.

Figure 15:
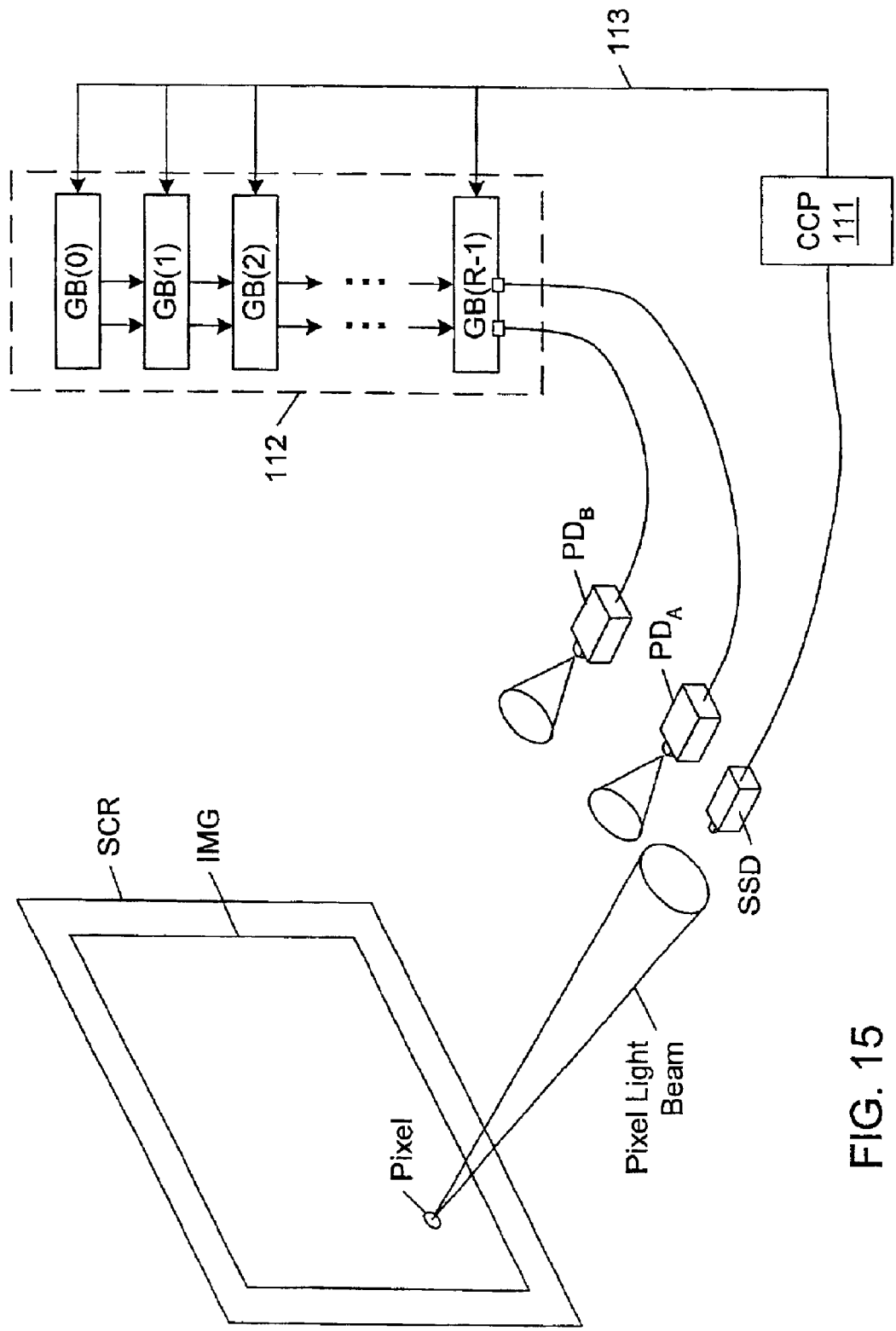
FIG. 15 illustrates one embodiment for a color correction system comprising a spectrum sensing device SSD, a color correction processor 111 and graphics system 112.

A spectrum sensing device SSD may be configured to measure the visible power spectrum of pixels generated by display devices $DD_1$, through $DD_H$ or any subset of the display devices. For example, the spectrum sensing device SSD may measure the color component power spectra of pixels generated on screen SCR by projection devices $PD_A$ and $PD_B$ as shown in FIG. 15. The spectrum sensing device SSD may comprise a spectroradiometer. In one embodiment, the spectrum sensing device SSD comprises a lens to spatially separate wavelength components of an impinging light beam, and an array of phototransistors to measure the power in each wavelength component. A plurality of spectrum sensing devices may be used to measure the color component power spectra for the display devices $DD_1$, through $DD_H$, each spectrum sensing device performing power spectrum measurements for a corresponding subset of the display devices.

The spectrum sensing device SSD may be pointed at and/or focused on a display surface such as projection screen SCR or the screen surface of monitors 84A and/or 84B (as shown in FIG. 1). The spectrum sensing device is configured to measure the radiated power spectrum for pixels or groups of pixels appearing on the display surface. In one alternative embodiment, the spectrum sensing device may be focused at the apparent source of radiated pixels. For example, the spectrum sensing device may "look" into the radiating lens of a projection device.

The spectrum sensing device may measure the color component power spectra $\hat{f}_1(\lambda)$, $\hat{f}_2(\lambda)$ and $\hat{f}_3(\lambda)$ for a given pixel (or group of pixels) radiated from the display surface. Graphics system 112, i.e. one of the sample-to-pixel calculation units in one of the graphics boards, may drive the given pixel with:

(a) color intensity vector [1,0,0], corresponding to full red and no green nor blue stimulation, while spectrum sensing device SSD measures the red color component spectrum $\hat{f}_1(\lambda)$;

(b) color intensity vector [0,1,0], corresponding to full green and no red nor blue stimulation, while spectrum sensing device SSD measures the green color component spectrum $\hat{f}_2(\lambda)$; and (c) color intensity vector [0,0,1], corresponding to full blue and no red nor green stimulation, while spectrum sensing device SSD measures the blue color component spectrum $\hat{f}_3(\lambda)$.

Pixels other than the given pixel may be turned off, i.e. driven with color intensity vector [0,0,0], so that they offer minimal interference to the measurement of color component spectra for the given pixel.

Figure 16:
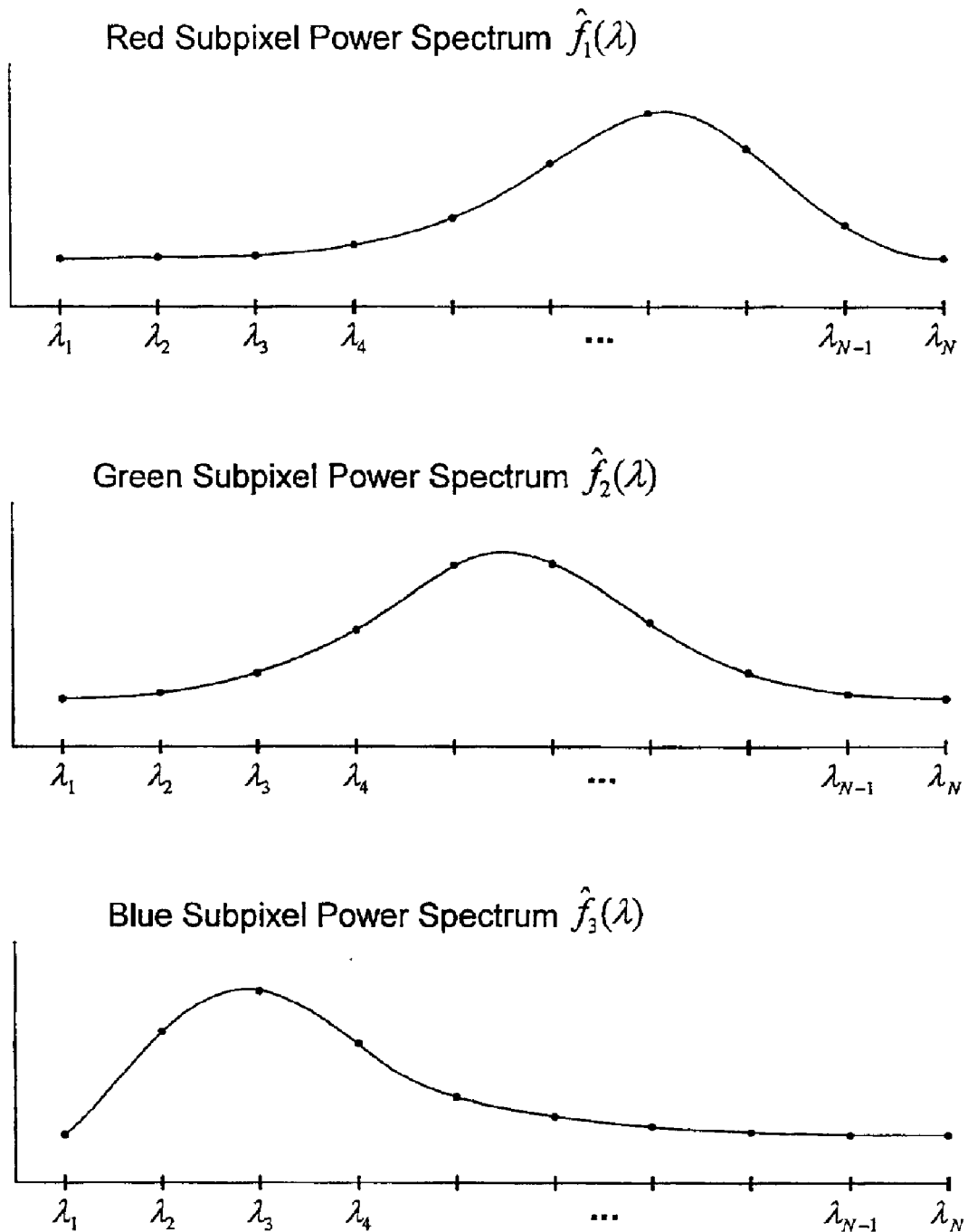
FIG. 16 illustrates red, green and blue color component power spectra measured at N distinct wavelengths.

A color calibration processor 111 may assert control signals which coordinate the display of the red, green and blue intensity patterns and the measurement of color component power spectra $\hat{f}_1(\lambda)$, $\hat{f}_2(\lambda)$ and $\hat{f}_3(\lambda)$ respectively. For each color component i=1,2,3 of the given pixel, the spectrum sensing device SSD may measure the color component power spectrum $\hat{f}_i(\lambda)$ at N distinct wavelengths as suggested by FIG. 16. Thus, spectrum sensing device SSD may generate a vector of length N for each color component power spectrum. Color calibration processor 111 may receive the color component power spectrum vectors, and compute a set of parameters for a color correction transformation. The color correction transformation may approximate the optimal color correction transformation as defined above.

In one embodiment, the set of parameters computed by color calibration processor 111 comprises a lookup table. For example, if the input color vector γ comprises a 24 bit word (i.e. 8 bits each for red, green and blue), a lookup table with $2^{24}$ entries may be used to exhaustively characterize the color correction transformation. The input color vector may be used as an address into the lookup table. The table entry addressed by the input color vector may contain the corresponding corrected color intensity vector $\hat{\gamma}$, or alternatively, the difference $\hat{\gamma}-\gamma$. The difference may have a smaller magnitude on average, and thus, may lead to a smaller table size. It is noted that the word size of 24 bits is given for illustrative purposes only, and a wide of variety of sizes are contemplated.

In a second embodiment, a non-exhaustive lookup table may be used. For example, a lookup table with $2^{18}$ entries may be addressed with the 6 high order bits of R, G and B in the input color intensity vector. Interpolation may be applied to obtain corrected color intensity vectors with higher precision.

In the embodiment shown in FIG. 15, color calibration processor 111 resides outside of graphics system 112. In a second embodiment, color calibration processor is situated within graphics system 112. In a third embodiment, the functions performed by color calibration processor 111 are distributed to some or all of the graphics boards comprising graphics system 112. For example, each graphics board GB(K) may have its own local color calibration processor. In a fourth embodiment, host CPU 102 performs the functions of color calibration processor 111, and thus, color calibration processor 111 may be omitted.

In one embodiment, the set of transformation parameters computed by color calibration processor 111 comprises the correction matrix $P=M^{-1}L$ described above. Thus, color calibration processor 111 may compute the perturbed perceptual matrix M in response to the measured color component power spectrum vectors of the given pixel, and multiply the inverse of matrix M with the unperturbed perceptual matrix L. The components of perturbed perceptual matrix M may be computed according to a discretized form of expression (9), e.g.

$$M_{i,j} = \sum_{k=1}^{N} g_j(\lambda_k) \cdot \hat{f}_i(\lambda_k). \tag{12A}$$

The color calibration processor may similarly compute the components of the unperturbed perceptual matrix L according to the expression $$L_{i,j} = \sum_{k=1}^{N} g_j(\lambda_k) \cdot f_i(\lambda_k). \tag{12B}$$

The values $\hat{f}_i(\lambda_k)$ of the unperturbed color component spectra are known by industry standard definition, or perhaps by measurements obtained with the spectrum sensing device SSD.

In some embodiments, the color correction transformation may be nonlinear, and thus, the set of parameters which characterize the color correction transformation may not be a matrix. A variety of forms for the set of parameters are contemplated.

After computing the set of transformation parameters for a given pixel, color calibration processor 111 may transfer the parameter set to one of the graphics boards comprising graphics system 112. In one embodiment, color calibration processor 111 more specifically targets a sample-to-pixel calculation unit which has been designated to compute pixel color values for the given pixel. The transfer may occur through control/data bus 113. In response to computing pixel color values (e.g. RGB values) for the given pixel, the sample-to-pixel calculation unit applies a color correction transformation to the computed pixel color values based on the set of transformation parameters. The corrected pixel color values are transmitted to the display device which generates the given pixel.

As mentioned above, the set of transformation parameters may comprise a lookup table. In this case, color calibration processor 111 may transfer the lookup table to a memory resident within a graphics board. A sample-to-pixel calculation unit resident within the graphics board may compute pixel color values for the given pixel, and may read the lookup table to generate the corresponding corrected color values. For non-exhaustive lookup table, the sample-to-pixel calculation unit may access the lookup table two or more times and interpolate the corrected color intensity vector corresponding to the input color intensity vector.

In one embodiment, color calibration processor 111 couples to system bus 104, and may transfer parameter set data to the graphics boards comprising graphics system 102 through system bus 104 instead of or in addition to control/data bus 113.

The process of measuring color component power spectra and computing a set of parameters for a color correction transformation is referred to herein as color calibration. The color calibration may be performed for a representative subset of a pixel array generated by a given display device. In one embodiment, the representative subset comprises pixels on a grid as suggested by FIG. 14. (The grid pixels are denoted in crosshatch.) Color calibration processor 111 may calibrate the grid pixels, and thus, may generate a set of transformation parameters for each grid pixel. Color calibration processor 111 may transmit the transformation parameter sets for the pixel grid onto a data bus 113. Each graphics board assigned to the given display device receives the parameter sets for at least a portion of the grid.

A sample-to-pixel calculation unit may generate pixel color values for a pixel (I,J) in the pixel array, and may transform the pixel color values using a corresponding set S(I,J) of transformation parameters. The transformation may be implemented as a combination of arithmetic operations such as additions, subtractions, multiplications and/or divisions, etc. Alternatively, the transformation may implemented by table lookup, or table lookup and addition as in the case of the lookup table which stores difference entries $\hat{\gamma}-\gamma$ as described above. The transformed pixel color values (also referred to as corrected color intensity vector $\hat{\gamma}$) may be transmitted to the display device.

The sample-to-pixel calculation unit may determine the parameter set S(I,J) for a non-grid pixel by interpolating the transformation parameter sets of the grid pixels nearest to the non-grid pixel. Alternatively, in the lookup table embodiments, the sample-to-pixel calculation unit may determine the corrected color intensity vector for a non-grid pixel (I,J) by reading the color intensity vectors of the nearest grid pixels from the corresponding lookup tables, and performing interpolation using these later color intensity vectors.

Figure 17A:
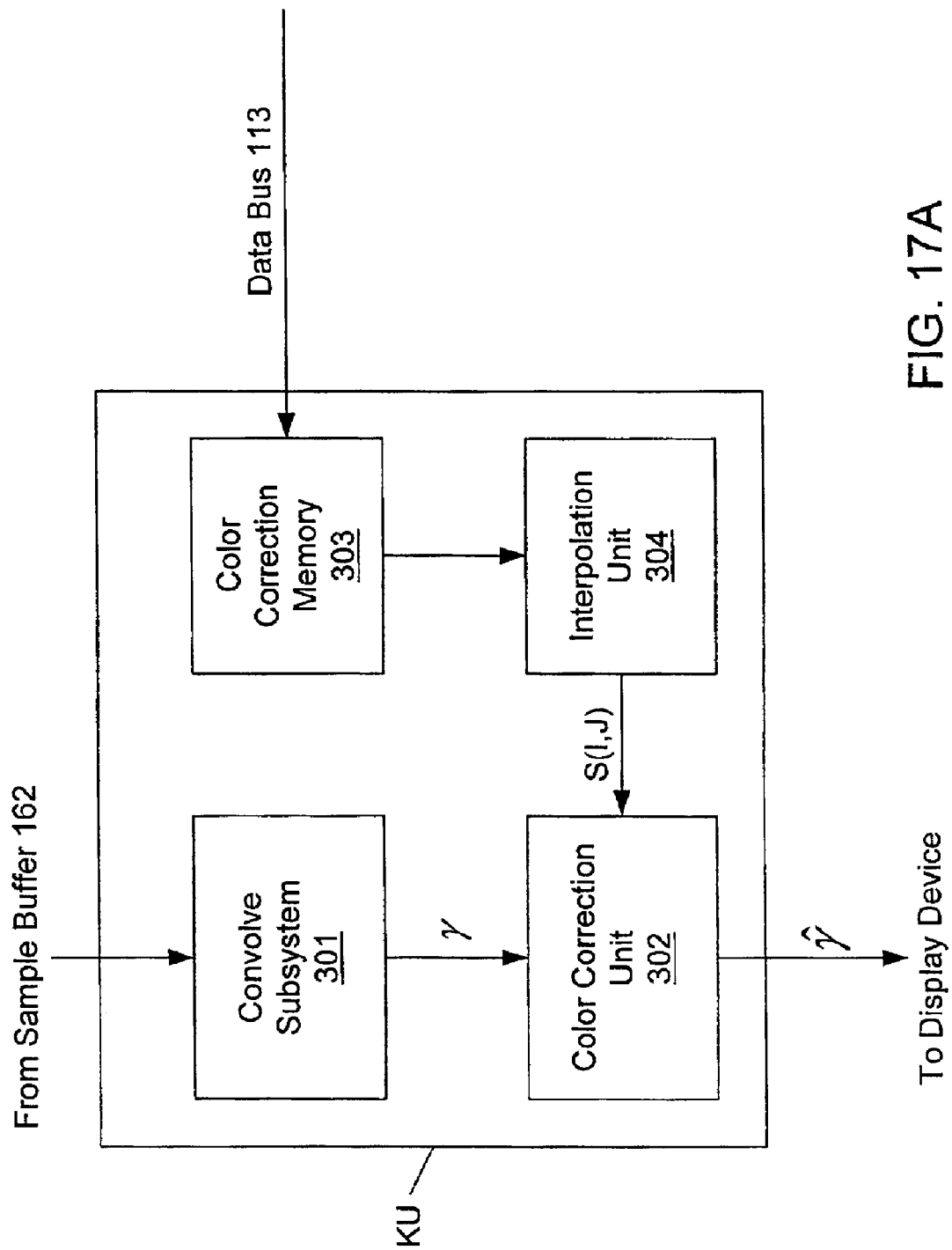
FIG. 17A illustrates one embodiment of a sample-to-pixel calculation unit KU configured to perform color correction on computed color values (e.g. RGB values) by applying a color correction transformation using a set of transformation parameters.

FIG. 17A illustrates one embodiment for a generic sample-to-pixel calculation unit KU. Sample-to-pixel calculation unit KU may include convolve subsystem 301, color correction unit 302, color correction memory 303 and interpolation unit 304. Convolve subsystem 301 may receive samples from sample buffer 162 and filter the samples to generate a color intensity vector $\gamma$ (whose components comprise pixel color values, e.g., RGB values) for a pixel (I,J) in the pixel array as described in steps 250 through 270 of FIG. 12. Color correction memory 303 may store parameter sets for at least a portion of the grid pixels. For example, sample-to-pixel calculation unit KU may be assigned to compute pixel color values for a rectangular section of the pixel array. Thus, sample-to-pixel calculation unit KU may store parameters sets for that portion of the grid which covers the rectangular section. Interpolation unit 304 interpolates a set S(I,J) of transformation parameters appropriate for pixel (I,J) based on the parameters sets of grid pixels stored in color correction memory 303. For example, interpolation unit 304 may use the grid pixels nearest to the pixel (I,J) to determine transformation parameter set S(I,J). Various interpolation schemes are contemplated. Color correction unit 302 receives the color intensity vector $\gamma$ from convolve subsystem 301 and applies a color correction transformation based on the transformation parameter set S(I,J) generated by interpolation unit 304. Color correction unit 302 may transmit the color correction vector $\hat{\gamma}$ to one of display device $DD_1$ through $DD_H$, i.e. the particular display device which generates pixel (I,J).

Color correction unit 302 may comprise dedicated hardware for performing the color correction transformation. Similarly, interpolation unit 304 may comprise dedicated hardware for performing the interpolation function. In one alternative embodiment, some or all of units 301, 302, 303 and 304 may be realized by a processor (e.g. a DSP core) executing under program control (e.g. microcode instructions).

In one embodiment, color calibration processor 111 may perform the interpolation operation instead of interpolation unit 304, and may transmit parameter set S(I,J) to color correction unit 302 through data bus 113. The parameter set S(I,J) may arrive at color correction unit 302 in time to perform the color correction transformation on the color intensity vector $\gamma$. In this embodiment, sample-to-pixel calculation unit KU may omit color correction memory 303 and/or interpolation unit 304.

Interpolation unit 304 may be coupled to the same pixel clock that drives convolve subsystem 301. Thus, interpolation unit 304 may transfer one set of transformation parameters to color correction unit 302 per pixel clock cycle. Similarly, convolve subsystem 301 may transfer one color intensity vector $\gamma$ to color correction unit 302 per pixel clock cycle.

If pixel (I,J) is a grid pixel, interpolation unit 304 may read the corresponding parameter set S(I,J) from color correction memory 303 and pass this parameter set to color correction unit 302 without performing interpolation.

Figure 17B:
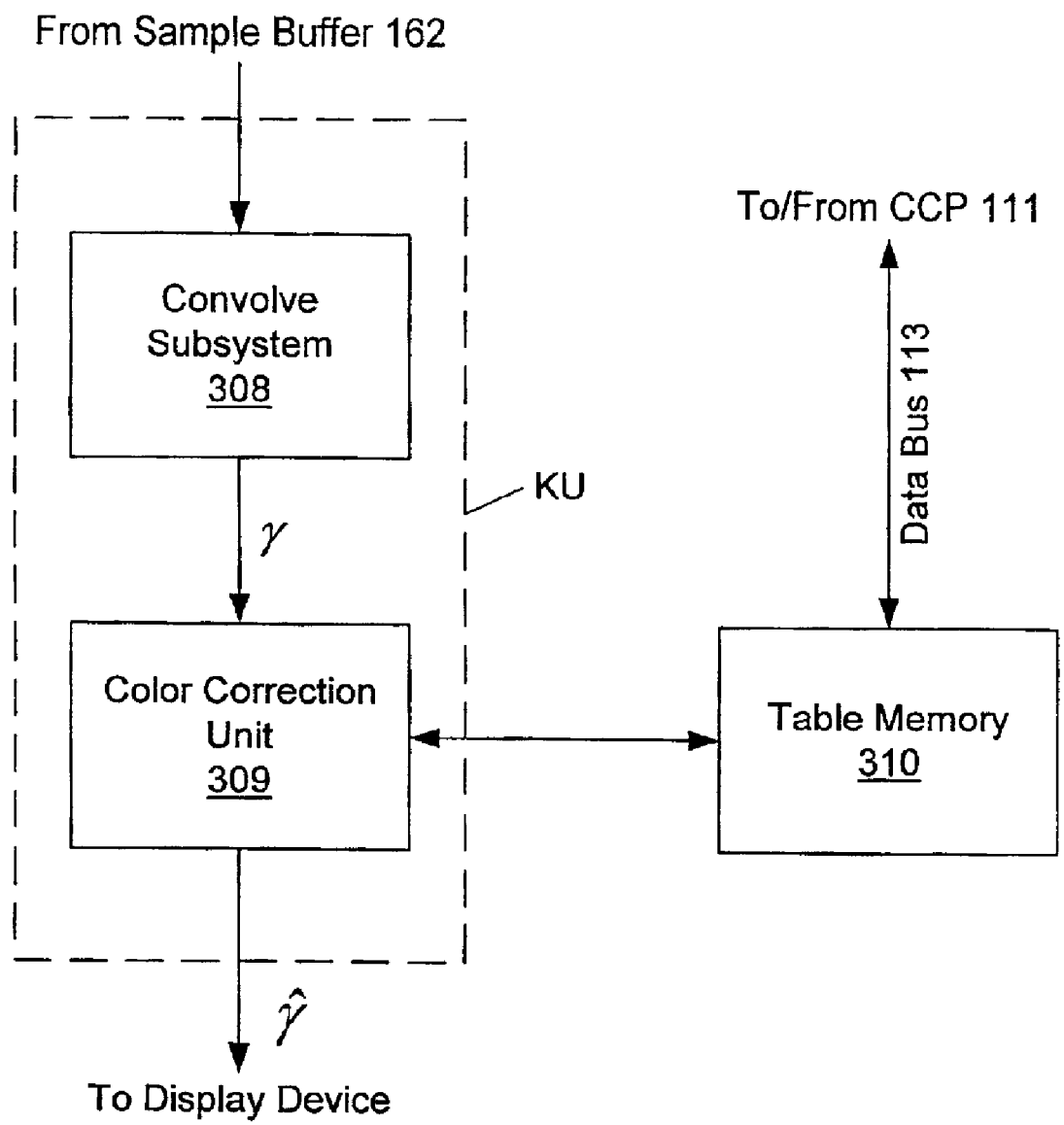
FIG. 17B illustrates another embodiment of a sample-to-pixel calculation unit LU configured to perform color correction on computed color values based on one or more table lookup operations.

FIG. 17B illustrates another embodiment of a sample-to-pixel calculation unit LU configured to perform the color correction transformation by table lookup. Sample-to-pixel calculation unit LU may include convolve subsystem 308 and color correction unit 309. Convolve subsystem 308 may receive samples from sample buffer 162 and filter the samples to generate a color intensity vector $\gamma$ (whose components comprise pixel color values, e.g., RGB values) for a pixel (I,J) in the pixel array as described in steps 250 through 270 of FIG. 12. Color correction unit 309 receives the color intensity vector $\gamma$ from convolve subsystem 308 and determines a corrected color intensity vector $\hat{\gamma}$ by reading one or more lookup table entries from one or more corresponding lookup tables stored in table memory 310. Color correction unit 309 may transmit the corrected color intensity vector $\hat{\gamma}$ to one of display device $DD_1$ through $DD_H$, i.e. the particular display device which generates pixel (I,J).

Color calibration processor 111 may load table memory 310 with one or more lookup tables. Each lookup table characterizes the color transformation for a single pixel (or group of pixels) in the pixel array. For example, the color calibration processor 111 may compute one lookup table for each grid pixel of FIG. 14 as described above.

For a non-grid pixel (I,J), color correction unit 309 may determine grid pixels which are nearest neighbors to the non-grid pixel, and may read a corrected color intensity vector from each of the corresponding lookup tables with corresponding addresses which are derived from the color intensity vector $\gamma$. Color correction unit 309 may perform an interpolation based on these "nearest neighbor" correction vectors to determine the corrected color intensity vector for the non-grid pixel. Color correction unit 309 may transmit this final corrected color intensity vector to a display device.

It is noted that several consecutive non-grid pixels may share the same set of nearest neighbor grid pixels. Thus, in some embodiments, this observation may be used to minimize transfer bandwidth to the table memory 310.

In one collection of embodiments, the lookup tables store color difference vectors $\hat{\gamma}-\gamma$ as described above. Thus, color correction unit 309 may include an adder to add color difference vector $\hat{\gamma}-\gamma$ (or an interpolated average of such color difference vectors) to the color intensity vector $\gamma$ for pixel (I,J) to determine the corrected color intensity vector $\hat{\gamma}$.

Convolve subsystem 308 and/or color correction unit 309 may be realized by a processor (e.g. a DSP) executing under program control. Alternatively, convolve subsystem 308 and/or color correction unit 309 may comprise dedicated circuitry.

If pixel (I,J) is a grid pixel, color calibration correction unit 309 may read the corrected color intensity vector from the corresponding lookup table. In other words, the interpolation with respect to multiple grid pixels described above may be by-passed when the current pixel (I,J) is a grid pixel.

It is noted that the table memory 310 may be shared among multiple sample-to-pixel calculation units within one or more of the graphics boards GB(K). For example, each graphics board GB(K) may include an instance of table memory 310. Calibration processor 310 may load each table memory 310 with lookup tables for a corresponding subset of the grid pixels.

In one embodiment, a non-uniform grid is contemplated where the density of grid pixels in the general pixel array varies in accordance with the local rate of spatial variation of the color component power spectra. For example, a discolored spot on a projection screen or a degenerating portion of a color filter may be assigned a larger density of grid pixels than surrounding areas.

As mentioned above, graphics system 112 may drive multiple projection devices $PD_1$ through $PD_G$. The multiple projection devices may generate an integrated image IMG on screen SCR as suggested in FIG. 1. The color calibration described above in connection with one display device may be performed for the pixel array generated by each projection device on screen SCR. When the color component spectra of pixels corresponding to a given projection device are being measured, the pixels generated by other projection devices may be turned off, so as to offer minimal interference.

For each projection device, color calibration processor 111 may (a) measure color component power spectra on a pixel grid of the corresponding pixel array, (b) compute a field of parameter sets—one set per pixel in the pixel grid, and (c) transmit the field of parameters sets onto data bus 113. Each sample-to-pixel calculation unit in graphics system 112 may configured as described in the embodiment of FIG. 17A, may be assigned to one of the projection devices, and may read from data bus 113 at least a portion of the corresponding field of parameter sets. This portion of the corresponding field may be stored in color correction memory 303 of FIG. 17A. Each sample-to-pixel calculation unit may apply a color correction in real-time to computed pixel color values based on the parameter sets stored in its color correction memory 303. The pixel grids for different display devices may have different numbers of grid rows and/or grid columns.

In another set of embodiments, each sample-to-pixel calculation unit in graphics system 112 may be configured as described in the embodiment of FIG. 17B, and may be assigned to one of the projection devices. It is noted that multiple sample-to-pixel calculation units may be assigned to a single projection device to partition the labor of generating pixel data for the projection device. For each projection device, color calibration processor 111 may measure color component power spectra on a pixel grid of the corresponding pixel array, and generate one field of lookup tables, i.e. one lookup table per grid pixel. The color calibration processor 111 may transmit the lookup tables to the graphics boards GB(1) through GB(R-1) through data bus 113 and/or through system bus 104. The table memory 310 in each graphics board receives and stores the lookup tables to be used by the sample-to-pixel calculation units on that graphics board. Each sample-to-pixel calculation unit may apply a color correction in real-time to computed pixel color values by performing read accesses to lookup tables stored in the local table memory 310, and may transmit the resulting corrected pixel color values to the assigned projection device.

In one embodiment, color calibration may be performed in response to a user command. The user of computer system 80 may issue a color calibration command through a graphical user interface running on host CPU 102. Graphics system 112 and color calibration processor 111 may calibrate some or all of the display devices $DD_1$, through $DD_H$ in response to the color calibration command. The user may select which display devices are to be calibrated.

Color calibration processor 111 may be realized by any of a variety of processing devices including a general purpose processor, a DSP core, a programmable gate array, discrete logic, analog circuitry (e.g. operational amplifiers), etc., or any combination thereof. Color calibration processor 111 may be situated inside of graphics system 112. Alternatively, color calibration processor 111 may be identical to host CPU 102. In this alternative case, color calibration processor 111 may communicate with graphics system 112 through system bus 104.

In a second embodiment, color calibration processor 111 and graphics system 112 may be configured to perform color calibration periodically or intermittently. For example, graphics system 112 may repeatedly display red, blue and green calibration patterns subliminally. In other words, one video frame out of T video frames may be dedicated to displaying color calibration patterns. If T is large enough, the user never notices the presence of the calibration patterns. Thus, calibration may be performed on an on-going basis while graphics system 112 generates normal video output.

In one embodiment, a manufacturer of display devices (or projection screens) may perform color calibration for a display device (or projection screen) in anticipation that the display device (or projection screen) will be used with a graphics system similar to graphics system 112. In this case, color calibration processor 111 computes calibration information, i.e. a field of transformation parameter sets (e.g. lookup tables), for the display device (or projection device) at the manufacture site. The transformation parameter sets may be stored on a storage medium such as floppy disk, CD-ROM, etc., and shipped to a customer along with the display device (or projection screen). The customer may download the transformation parameter sets from the storage medium to an appropriate set of sample-to-pixel calculation units in a separate instance of graphics system 112. Thus, graphics system 112 may be conveniently configured to correct any errors in color presentation inherent in the display device (or projection screen).

As described above, a color calibration involves displaying and measuring multiple "single pixel" calibration patterns to characterize a display device. However, sophisticated spectrum sensing devices capable of grabbing a whole screen's worth of pixel spectra in a single shot are contemplated. In this case, graphics system 112 may generate a solid red calibration pattern, i.e. may drive all pixels of all display devices with the red intensity vector [1,0,0]. This solid red calibration pattern may be measured by spectrum sensing device SSD in a single shot, e.g., in a single video frame. Similarly, graphics system 112 may display solid green and blue calibration patterns which are each measured by spectrum sensing device SSD in a single shot.

Figure 18:
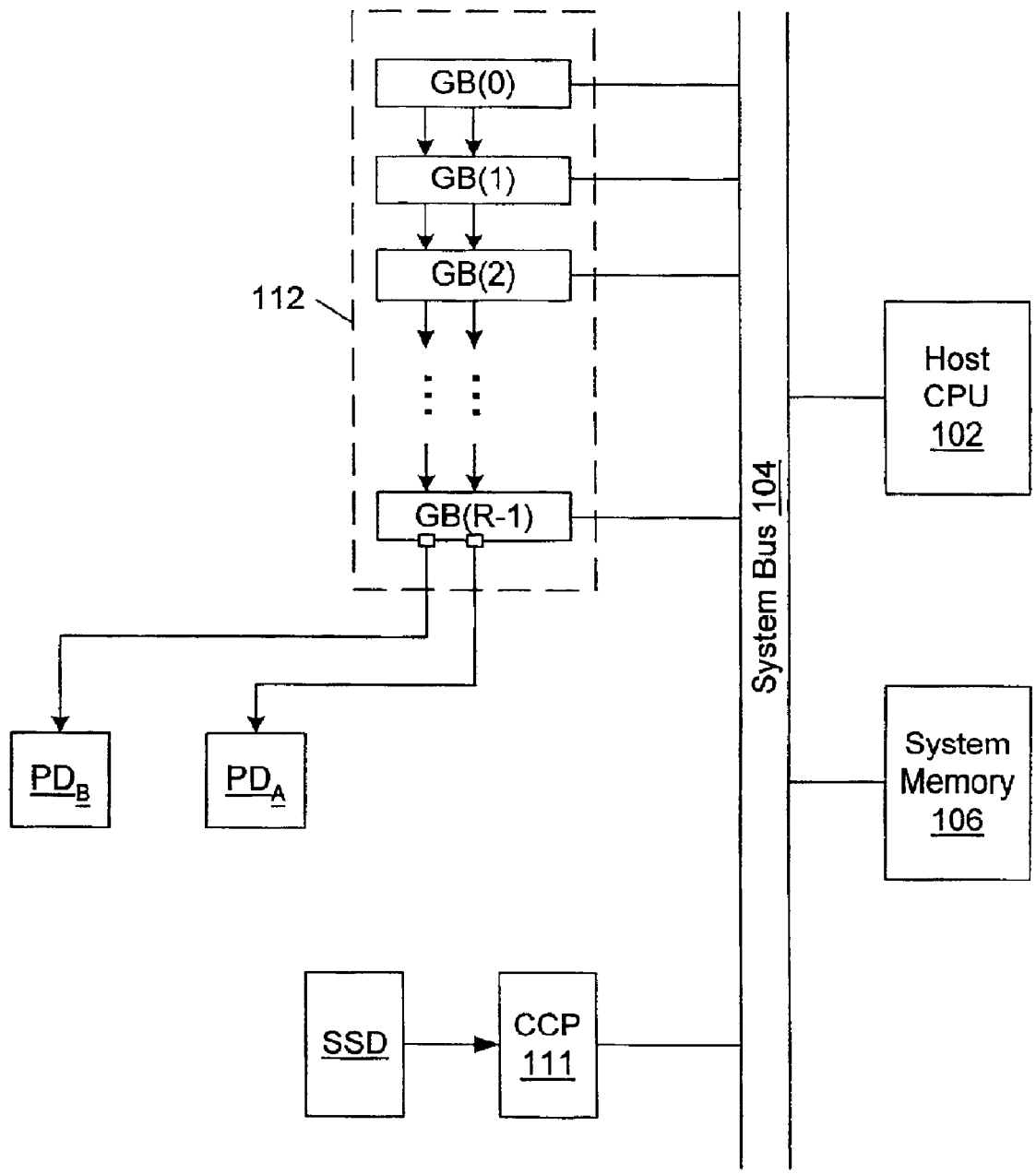
FIG. 18 illustrates an alternative embodiment for a color correction system where color correction processor 111 couples to system memory 104 and transfers transformation parameters to graphics system 112 through system bus 104.

FIG. 18 illustrates an embodiment where color calibration processor 111 couples to system bus 104, and transmits transformation parameters to graphics system 112 (i.e. to the sample-to-pixel calculation units comprised within one or more graphics boards) through system bus 104.

Figure 19:
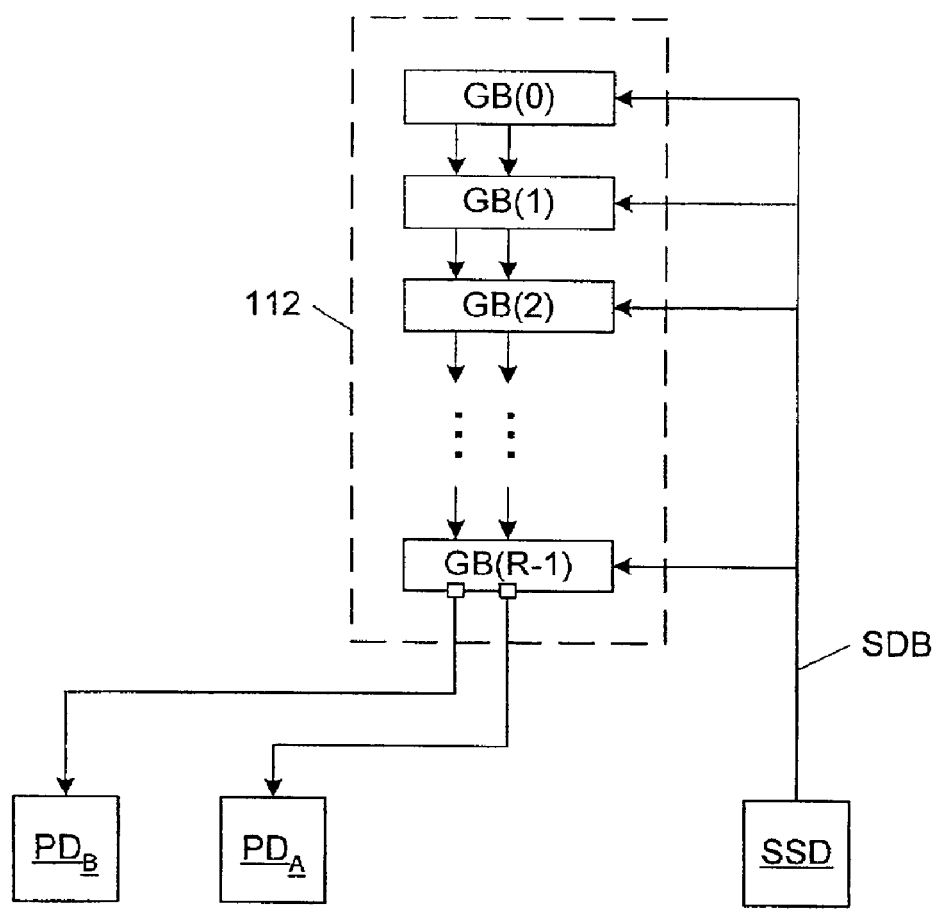
FIG. 19 illustrate another embodiment for a color correction system where the functions of color calibration processor 111 are distributed to each of the graphics boards comprising graphics system 112.

FIG. 19 illustrates an embodiment where the function of calibration processor 111 is distributed to each of the graphics boards comprising graphics system 112, e.g., graphics boards GB(0) through GB(R-1). Each graphics board may include a local calibration unit. Thus, spectrum sensing device SSD may couple to each graphics board through a sensor data bus SDB. Spectrum sensing device SSD transmits the color component spectral measurement vectors onto sensor data bus SDB. The local calibration unit in each graphics board captures and stores spectral measurement vectors for a subset of the measured pixels, and computes transformation parameter sets (e.g. lookup tables) for the measured pixels. The transformation parameter sets may be stored in a centralized memory available to all the sample-to-pixel calculation units resident within the graphics board. Alternatively, the transformation parameter sets may be stored in local memories within each of the sample-to-pixel calculation units.

Personalized Color Correction

In one embodiment, color calibration processor 111 is configured to use information specific to an individual observer to compute transformation parameter sets for graphics system 112. For example, an eye scanning device (not shown) may be used to determine spectral filtering properties of the observer's eye(s), e.g. retina(s), cornea(s), lens (lenses), etc., or any combination thereof. Color calibration processor 111 may compute parameters for a color correction transformation which compensates the non-ideal spectral filtering properties of an individual's eye. In a virtual reality environment, graphics system 112 may compute personalized color corrections for multiple observers.

Projection Screen with Distributed Spectrum Sensing Elements

In one alternative embodiment, an array of sensing elements may be incorporated as part of a projection screen. In a front-projection scenario (where the projection devices are on the same side of the projection screen as the observers), an array of spectrum sensing devices may be distributed on the back surface of the projection screen. These spectrum sensing device may detect light which is transmitted through the screen material at a grid of locations on the screen surface.

Color Correction for Non-Super-Sampled Graphics Systems

The principles of color correction discussed above in the context of a super-sampled graphics system may be applied to a non-super-sampled graphics system. A non-super-sampled graphics system may comprise one or more pixel calculation units configured to compute initial color values (e.g. RGB values) for an array of pixels in response to received graphics data. A color calibration processor may receive spectral measurements characterizing the color component spectra for each pixel in a subset (e.g. a grid) of the pixel array. The color calibration processor may compute a set of transformation parameters (e.g. a lookup table) for each pixel in the subset. The color calibration processor may transfer the transformation parameter sets to the one or more pixel calculation units, or to a memory accessible by the one or more pixel calculation units. Each pixel calculation unit may correct computed color values based on the transformation parameter sets (e.g. by performing read accesses to one or more lookup tables using addresses generated from the initial color values).

Decay Model for Color Filters

Color calibration processor 111 may store parameters which model the temporal decay of color filters. Thus, color calibration processor 111 may compute the color correction parameter sets in response to such decay models in addition to or instead of spectral measurements from spectrum sensing device SSD. In one embodiment, color calibration processor 111 may store the decay parameters for display devices $DD_1$ through $DD_H$ which are being used with graphics system 112. These parameters may be provided by a display manufacturer.

Color Correction on Samples

In one embodiment, one or more rendering units 150 may be configured to perform color correction on samples prior to storing the samples into sample buffer 162. A rendering unit, e.g. rendering unit 150A, may correct sample color values by reference to one or more lookup tables, each lookup table characterizing a color correction transformation for a known position in the virtual screen space. Alternatively, the rendering unit may correct sample color values by performing a transformation computation based on a compact set of parameters (e.g. a matrix). The rendering unit may interpolate a set of parameters for the current sample (or group of samples) based on one or more parameter sets corresponding to known positions (e.g. grid positions) in the virtual screen space. The lookup tables or parameter sets at the known positions may be computed as described in embodiments above, i.e. in response to measurements of pixel-component output spectra (e.g. red, green and blue output spectra) obtained by a spectrum sensing device. In this embodiment, sample-to-pixel calculation units CU may not perform color correction on pixel color values.

What is claimed is:

1. A color correction system comprising:
    a spectrum sensing device configured to measure a plurality of first power spectra for light energy emanating from one or more pixels generated by a display device on a display surface, wherein each of the first power spectra comprises a sequence of N spectral power measurements at N corresponding wavelengths, wherein N is greater than three, wherein the plurality of first power spectra comprises a red power spectrum, a green power spectrum and a blue power spectrum;
    a color calibration processor configured to receive the first power spectra from the spectrum sensing device, compute a first set of transformation parameters in response to the first power spectra, and to store the first set of transformation parameters in a first memory; and
    a calculation unit configured to (a) compute first color values for a first pixel, (b) compute second color values using the first color values and the first set of transformation parameters, and (c) transmit the second color values to the display device; wherein the calculation unit is configured to receive samples from a sample buffer and to compute the first color values for the first pixel by spatially filtering sample color values of the samples;
    wherein the spectrum sensing device is configured to measure the red power spectrum in response to the calculation unit driving the first pixel with a maximal red intensity value, a zero green intensity value and a zero blue intensity value;
    wherein the spectrum sensing device is configured to measure the green power spectrum in response to the calculation unit driving the first pixel with a zero red intensity value, a maximal green intensity value and a zero blue intensity value
    wherein the spectrum sensing device is configured to measure the blue power spectrum in response to the calculation unit driving the first pixel with a zero red intensity value, a zero green intensity value and a maximal blue intensity value.

2. The color correction system of claim 1, wherein the first set of transformation parameters comprises a lookup table, wherein the calculation unit is configured to perform (b) by:
    generating a read address for the lookup table using the first color values;
    reading the lookup table using the read address to obtain a table entry;
    wherein the table entry determines the second color values.

3. The color correction system of claim 2, wherein the table entry comprises difference values, wherein the calculation unit is further configured to add each of the difference values to a corresponding one of the first color values to obtain the second color values.

4. The color correction system of claim 1, wherein the spectrum sensing device comprises a spectroradiometer.

5. The color correction system of claim 1 wherein the color calibration unit is configured to multiply each of the first power spectra by each of three response curves in order to compute the first set of transformation parameters.

6. The color correction system of claim 5 wherein the three response curves comprise three color sensitivity curves for a human eye.

7. The color correction system of claim 1, wherein the first pixel is one of said one or more pixels.

8. A method for color correction comprising:
    computing first color values for a first pixel;
    measuring a plurality of first power spectra for light energy emanating from one or more pixels generated by a display device on a display surface, wherein each of the first power spectra comprises a sequence of N spectral power measurements at N corresponding wavelengths, wherein N is greater than three, wherein the plurality of first power spectra comprises a red power spectrum, a green power spectrum and a blue power spectrum, wherein said measuring comprises:

measuring the red power spectrum in response to commanding the display device to drive the first pixel with a maximal red intensity value, a zero green intensity value and a zero blue intensity value, measuring the green power spectrum in response to commanding the display device to drive the first pixel with a zero red intensity value, a maximal green intensity value and a zero blue intensity value, measuring the blue power spectrum in response to commanding the display device to drive the first pixel with a zero red intensity value, a zero green intensity value and a maximal blue intensity value;

computing a first set of transformation parameters in response to the first power spectra;

computing second color values using the first color values and the first set of transformation parameters;

transmitting the second color values to the display device;

wherein said computing the first color values for the first pixel comprises:
receiving a plurality of samples from a sample buffer; and
spatially filtering sample color values corresponding to the received samples.

9. The method of claim 8, wherein the first set of transformation parameters comprises a lookup table, wherein said computing the second color values comprises:

generating a read address for the lookup table using the first color values;

reading the lookup table using the read address to obtain a table entry;

wherein the table entry determines the second color values.

10. The method of claim 9, wherein the table entry comprises difference values, where said computing the second color values further comprises:

adding each of the difference values to a corresponding one of the first color values to obtain the second color values.

11. The method of claim 8 wherein said computing the first set of transformation parameters comprises multiplying the power spectra by three response curves respectively.

12. The method of claim 8, wherein the first pixel is one of said one or more pixels.

13. A color correction system comprising:

a spectrum sensing device configured to measure a plurality of power spectra for light energy emanating from each pixel in a first subset of a first pixel array generated by a first display device on a display surface, wherein each of the power spectra comprises a sequence of N spectral power measurements at N corresponding wavelengths, wherein N is greater than three, wherein the plurality of power spectra for each pixel in the first subset comprises a first power spectrum, a second power spectrum and a third power spectrum;

a color calibration processor configured to compute a transformation parameter set for each pixel in the first subset in response to the corresponding plurality of power spectra, and to store the transformation parameter set for each pixel in the first subset in a first memory; and a first calculation unit configured to (a) compute first color values for a first pixel of the first pixel array, (b) compute second color values for the first pixel using the first color values and one or more transformation parameter sets corresponding to one or more of the pixels of the first subset, and (c) transmit the second color values to the first display device;

wherein the first calculation unit is configured to receive samples from a sample buffer and to compute the first color values for the first pixel by spatially filtering sample color values of the samples;

wherein the first calculation unit is configured to transmit a red calibration pattern for a current pixel of the first subset to the first display device, wherein the red calibration pattern comprises a maximum red intensity value, a zero green intensity value and a zero blue intensity value, wherein the first display device is configured to drive the current pixel with the red calibration pattern, wherein the spectrum sensing device is configured to measure the first power spectrum for the current pixel while the first display device drives the current pixel with the red calibration pattern.

14. The color correction system of claim 13, wherein the transformation parameter set for each pixel of the first subset comprises a lookup table, wherein the first calculation unit is configured to perform (b) by:

determining one or more nearest pixels in the first subset to the first pixel;

reading a table entry from each of one or more lookup tables corresponding to the one or more nearest pixels, wherein read addresses for the one or more lookup tables are determined by the first color values;

performing an interpolation on the one or more table entries to determine the second color values.

15. The color correction system of claim 14, wherein the lookup table for each pixel of the first subset is configured to store color correction difference values, wherein said interpolation results in interpolated color difference values, wherein the first calculation unit comprises an adder which is configured to add each of the interpolated color difference values to corresponding ones of the first color values to determine the second color values.

16. The color correction system of claim 13, wherein the first calculation unit is configured to transmit the red calibration pattern for the current pixel to the first display device in response to a first control signal asserted by the color calibration processor, wherein the spectrum sensing device is configured to measure the first power spectrum for the current pixel in response to a second control signal asserted by the color calibration processor.

17. The color correction system of claim 13 wherein the first subset of the first pixel array comprises a rectangular grid.

18. The color correction system of claim 13, wherein the first subset of first pixel array comprises a non-uniform grid.

19. The color correction system of claim 13, wherein the first calculation unit is further configured to:

interpolate a first parameter set for the first pixel based on the transformation parameter sets of one or more pixels in the first subset which are nearest to the first pixel; and transform the first color values using the first parameter set to generate the second color values.

20. The color correction system of claim 13, wherein the spectrum sensing device is further configured to measure a plurality of power spectra for each pixel in a second subset of a second pixel array generated by a second display device, wherein the color calibration processor is further configured to compute a transformation parameter set for each pixel in the second subset in response to the corresponding plurality of power spectra.

21. The color correction system of claim 20 further comprising a second calculation unit configured to receive and store the transformation parameter set for each pixel in a second subset, wherein the second calculation unit is further configured to (e) compute third color values for a second pixel of the second pixel array, (f) compute fourth color values for the second pixel using the third color values and one or more transformation parameter sets corresponding to one or more of the pixels of the second subset, and (g) transmit the fourth color values to the second display device.

22. The color correction system of claim 21 wherein the first display device and second display device are projection devices, and the display surface is a projection screen.

23. The color correction system of claim 21, wherein the second calculation unit is configured to turn off all pixels of the second pixel array while the spectrum sensing device measures the plurality of power spectra for each pixel of the first subset of the first pixel array.

24. A method for color correction comprising:
(a) measuring a plurality of power spectra for light energy emanating from each pixel in a first subset of a first pixel array generated by a first display device on a display surface, wherein each of the power spectra comprises a sequence of N spectral power measurements at N corresponding wavelengths, wherein N is greater than three, wherein the plurality of power spectra for each pixel in the first subset comprises a first power spectrum, a second power spectrum and a third power spectrum for each pixel in the first subset, wherein (a) comprises measuring the first power spectrum for each pixel of the first subset in response to a first calculation unit driving the pixel with a red calibration pattern comprising a maximum red intensity value, a zero green intensity value and a zero blue intensity value;
(b) computing a transformation parameter set for each pixel in the first subset in response to the corresponding plurality of power spectra;
(c) computing first color values for a first pixel of the first pixel array;
(d) computing second color values for the first pixel using the first color values and one or more transformation parameter sets corresponding to one or more of the pixels of the first subset; and
(e) transmitting the second color values to the first display device;
wherein said computing the first color values for the first pixel comprises:
receiving a plurality of samples from a sample buffer; and
spatially filtering sample color values corresponding to the received samples.

25. The method of claim 24, wherein the transformation parameter set for each pixel of the first subset comprises a lookup table, wherein said computing second color values comprises:
determining one or more nearest pixels in the first subset to the first pixel;
reading a table entry from each of one or more lookup tables corresponding to the one or more nearest pixels, wherein read addresses for the one or more lookup tables are determined by the first color values;
performing an interpolation on the one or more table entries to determine the second color values.

26. The method of claim 25, wherein the lookup table for each pixel of the first subset is configured to store color correction difference values, wherein said interpolation results in interpolated color difference values, wherein said computing second color values further comprises:
adding each of the first color values to a corresponding one of the interpolated color difference values to determine the second color values.

27. The method of claim 24 wherein the first subset of the first pixel array comprises a rectangular grid.

28. The method of claim 24, wherein the first subset of the first pixel array comprises a non-uniform grid.

29. The method of claim 24, wherein (d) comprises:
interpolating a first parameter set based on the transformation parameter sets of one or more pixels in the first subset which are nearest to the first pixel; and
transforming the first color values using the first parameter set to generate the second color values.

30. The method of claim 24 further comprising:
measuring a plurality of power spectra for each pixel in a second subset of a second pixel array generated by a second display device;
computing a transformation parameter set for each pixel in the second subset in response to the corresponding plurality of power spectra.

31. The method of claim 30 further comprising:
computing third color values for a second pixel of the second pixel array;
computing fourth color values for the second pixel using the third color values and one or more transformation parameter sets corresponding to one or more of the pixels of the second subset;
transmitting the fourth color values to the second display device.

32. The method of claim 30 further comprising turning off pixels of the second pixel array, wherein said measuring the plurality of power spectra of each pixel in the first subset of the first pixel array is performed while said pixels of the second pixel array are turned off.

33. A graphical computing system comprising:
a color correction memory configured to store a plurality of first parameter sets, wherein each of the first parameter sets corresponds to one or more pixels in a subset of a pixel array;
an interpolation unit configured to interpolate a second parameter set from one or more of the first parameter sets stored in the color correction memory; and
a color correction unit configured to receive first color values for a first pixel in the pixel array, wherein the color correction unit is further configured to compute second color values for the first pixel in response to the first color values and the second parameter set, and to transmit the second color values to a display device;
a render unit configured to compute sample color values for a set of samples in response to received graphics primitives, and to store the sample color values in a sample buffer;
a convolution subsystem configured to receive the sample color values from the sample buffer, spatially filter the sample color values to determine the first color values of the first pixel, and transmit the first color values to the color correction unit;

a color calibration processor configured to compute the first parameter sets by receiving a plurality of color component spectra from a spectrum sensing device and operating on the plurality of color component spectra, wherein each of the color component spectra comprises a sequence of N spectral power measurements at N corresponding wavelengths, wherein N is greater than three;

wherein the spectrum sensing device is configured to measure the plurality of color component spectra, wherein the plurality of color component spectra comprises a red spectrum, a green spectrum and a blue spectrum;

wherein the spectrum sensing device is configured to measure the red spectrum while the convolution subsystem is driving the one or more pixels with a maximal red intensity value, a zero green intensity value and a zero blue intensity value;

wherein the spectrum sensing device is configured to measure the green spectrum while the convolution subsystem is driving the one or more pixels with a zero red intensity value, a maximal green intensity value and a zero blue intensity value;

wherein the spectrum sensing device is configured to measure the blue spectrum while the convolution subsystem is driving the one or more pixels with a zero red intensity value, a zero green intensity value and a maximal blue intensity value.

34. The graphical computing system of claim 33, wherein the second parameter set comprises a color correction matrix, wherein the color correction unit is configured to compute the second color values by multiplying the first color values by a color correction matrix.

35. A color correction system comprising:

a spectrum sensing device configured to measure a plurality of first power spectra for light energy emanating from one or more pixels generated by a display device on a display surface, wherein each of the first power spectra comprises a sequence of N spectral power measurements at N corresponding wavelengths, wherein N is greater than three, wherein the plurality of first power spectra comprises a red power spectrum, a green power spectrum and a blue power spectrum;

a color calibration processor configured to receive the first power spectra from the spectrum sensing device, compute a first set of transformation parameters in response to the first power spectra, and to store the first set of transformation parameters in a first memory; and a rendering unit configured to (a) compute first color values for a plurality of samples, (b) compute second color values for the plurality of samples using the first color values and the first set of transformation parameters;

a sample-to-pixel calculation unit configured to receive one or more of the second color values, and spatially filter the one or more of the second color values to determine third color values for a pixel, and to transmit the third color values to a display device;

wherein the spectrum sensing device is configured to measure the red power spectrum in response to the sample-to-pixel calculation unit driving the pixel with a maximal red intensity value, a zero green intensity value and a zero blue intensity value;

wherein the spectrum sensing device is configured to measure the green power spectrum in response to the sample-to-pixel calculation unit driving the pixel with a zero red intensity value, a maximal green intensity value and a zero blue intensity value;

wherein the spectrum sensing device is configured to measure the blue power spectrum in response to the sample-to-pixel calculation unit driving the pixel with a zero red intensity value, a zero green intensity value and a maximal blue intensity value.

36. The color correction system of claim 35, wherein the first memory comprises a color correction lookup table.

37. The color correction system of claim 36, wherein the first set of transformation parameters are stored in the color correction lookup table, wherein (b) comprises:

reading selected transformation parameters of the first set from the color correction lookup table using read addresses determined by the first color values; and interpolating said transformation parameters to determine resultant transformation parameters.

38. The color correction system of claim 37, wherein the transformation parameters of the first set comprise color correction difference values, wherein the rendering unit comprises an adder which is configured to add the resultant transformation parameters to corresponding ones of the first color values to determine the second color values.

39. The color correction system of claim 35, wherein the first power spectrum includes three power spectra for each pixel in a subset of the set of pixels generated by the display device.

40. The color correction system of claim 35, wherein the rendering unit is further configured to:

interpolate a second set of transformation parameters based on the transformation parameters of the first set; and transform the first color values using the transformation parameters of the second set to generate the second color values.

* * * * *